(12) United States Patent
Tom et al.

(10) Patent No.: US 9,522,773 B2
(45) Date of Patent: Dec. 20, 2016

(54) SUBSTANTIALLY RIGID COLLAPSIBLE LINER AND FLEXIBLE GUSSETED OR NON-GUSSETED LINERS AND METHODS OF MANUFACTURING THE SAME AND METHODS FOR LIMITING CHOKE-OFF IN LINERS

(75) Inventors: Glenn Tom, Bloomington, MN (US); Thomas H. Baum, New Fairfield, CT (US); Matthew Kusz, Bloomington, MN (US); Joseph Menning, Prior Lake, MN (US); Greg Nelson, Minneapolis, MN (US); Dongyun Lee, Tokyo (JP); Wei Liu, Eden Prairie, MN (US); Kanghyun Kim, Anseong (KR); Karl Boggs, Hopewell Junction, NY (US); Richard Chism, Round Rock, TX (US)

(73) Assignee: Entegris, Inc., Billerica, MA (US)

( * ) Notice: Subject to any disclaimer, the term of this patent is extended or adjusted under 35 U.S.C. 154(b) by 494 days.

(21) Appl. No.: 13/382,743

(22) PCT Filed: Jul. 9, 2010

(86) PCT No.: PCT/US2010/041629
§ 371 (c)(1),
(2), (4) Date: Jul. 9, 2012

(87) PCT Pub. No.: WO2011/006146
PCT Pub. Date: Jan. 13, 2011

(65) Prior Publication Data
US 2012/0267388 A1    Oct. 25, 2012

Related U.S. Application Data

(60) Provisional application No. 61/224,274, filed on Jul. 9, 2009, provisional application No. 61/236,295, filed
(Continued)

(51) Int. Cl.
*B65D 35/28* (2006.01)
*B65D 35/56* (2006.01)
(Continued)

(52) U.S. Cl.
CPC ........... *B65D 83/0055* (2013.01); *B05B 7/241* (2013.01); *B05B 11/0043* (2013.01); *B05B 11/30* (2013.01);
(Continued)

(58) Field of Classification Search
CPC ... B65D 77/065; B65D 77/06; B65D 83/0055; B65D 83/60; B65D 83/62; B65D 35/02; B65D 35/06; B65D 35/12; B65D 2231/008; B65D 2231/001; B65D 2231/004; B05B 11/0043; B05B 7/241; B05B 7/2408; B05B 11/3047; B05B 11/30; B29C 49/04; B29C 49/06; B29L 2023/006
(Continued)

(56) References Cited

U.S. PATENT DOCUMENTS 1,589,138 A    6/1926    Fisk
2,338,604 A    1/1944    Silveyra
(Continued)

FOREIGN PATENT DOCUMENTS

AT    352 609    9/1979
AT    352609    9/1979
(Continued)

OTHER PUBLICATIONS

Supplementary European Search Report and Opinion for related European Application 08860610.8, mailed Jan. 10, 2014 (11 pages).
(Continued)

*Primary Examiner* — Frederick C Nicolas

(57) ABSTRACT

The present disclosure relates to a blow-molded, rigid collapsible liner that can be suitable particularly for smaller
(Continued)

storage and dispensing systems. The rigid collapsible liner may be a stand-alone liner, e.g., used without an outer container, and may be dispensed from a fixed pressure dispensing can. Folds in the rigid collapsible liner may be substantially eliminated, thereby substantially reducing or eliminating the problems associated with pinholes, weld tears, and overflow. The present disclosure also relates to flexible gusseted or non-gusseted liners, which is scalable in size and may be used for storage of up to 200 L or more. The flexible gusseted liner may be foldable, such that the liner can be introduced into a dispensing can. The liner can be made of thicker materials, substantially reducing or eliminating the problems associated pinholes, and may include more robust welds, substantially reducing or eliminating the problems associated weld tears.

26 Claims, 44 Drawing Sheets

Related U.S. Application Data on Aug. 24, 2009, provisional application No. 61/251,870, filed on Oct. 15, 2009, provisional application No. 61/294,928, filed on Jan. 14, 2010.

(51) Int. Cl.
| | |
|---|---|
| *B65D 1/40* | (2006.01) |
| *B65D 83/00* | (2006.01) |
| *B05B 7/24* | (2006.01) |
| *B65D 35/02* | (2006.01) |
| *B65D 83/60* | (2006.01) |
| *B65D 77/06* | (2006.01) |
| *B05B 11/00* | (2006.01) |
| *B65D 83/62* | (2006.01) |
| *B29C 49/04* | (2006.01) |
| *B29C 49/06* | (2006.01) |
| *B29L 23/00* | (2006.01) |

(52) U.S. Cl.
CPC ............... *B29C 49/04* (2013.01); *B29C 49/06* (2013.01); *B29L 2023/006* (2013.01); *B65D 35/02* (2013.01); *B65D 77/06* (2013.01); *B65D 77/065* (2013.01); *B65D 83/60* (2013.01); *B65D 83/62* (2013.01); *B65D 2231/001* (2013.01); *B65D 2231/004* (2013.01); *B65D 2231/008* (2013.01)

(58) Field of Classification Search
USPC ........ 222/95, 105, 107, 386.5, 321.5, 321.9, 222/321.7, 464.7
See application file for complete search history.

(56) References Cited

U.S. PATENT DOCUMENTS

| | | |
|---|---|---|
| 2,608,320 A | 8/1952 | Harrison, Jr. |
| 2,804,995 A | 9/1957 | Fee |
| 2,816,691 A | 12/1957 | Ward |
| 2,889,078 A | 6/1959 | Thomas |
| 2,891,700 A | 6/1959 | Maynard |
| 3,158,296 A | 11/1964 | Cornelius |
| 3,270,920 A | 9/1966 | Nessler |
| 3,275,193 A | 9/1966 | Barr |
| 3,450,254 A | 6/1969 | Miles |
| 3,484,011 A | 12/1969 | Greenhalgh et al. |
| 3,496,597 A | 2/1970 | Ayres |
| 3,592,360 A | 7/1971 | Aleck |
| 3,631,654 A | 1/1972 | Riely et al. |
| 3,717,544 A | 2/1973 | Valyi |
| 3,731,854 A | 5/1973 | Casey |
| 3,802,470 A | 4/1974 | Coleman |
| 3,813,198 A | 5/1974 | Valyi |
| 3,838,794 A | 10/1974 | Cogley et al. |
| 3,900,635 A | 8/1975 | Fenderburk et al. |
| 3,905,517 A | 9/1975 | Friedrich et al. |
| 3,938,708 A | 2/1976 | Burger |
| 3,966,378 A | 6/1976 | Valyi |
| 3,981,415 A | 9/1976 | Fowler et al. |
| 3,994,649 A | 11/1976 | Valyi |
| 3,999,915 A | 12/1976 | Stepenske |
| 4,008,830 A * | 2/1977 | Meshberg ...................... 222/95 |
| 4,062,475 A | 12/1977 | Harris et al. |
| 4,065,246 A | 12/1977 | Marcus |
| 4,090,541 A | 5/1978 | Cammarata, III et al. |
| 4,098,434 A | 7/1978 | Uhlig |
| 4,138,036 A | 2/1979 | Bond |
| 4,148,416 A | 4/1979 | Gunn-Smith |
| 4,286,636 A | 9/1981 | Credle |
| 4,322,020 A * | 3/1982 | Stone ............................. 222/95 |
| 4,330,066 A | 5/1982 | Berliner |
| 4,340,054 A | 7/1982 | Michaels |
| 4,350,272 A | 9/1982 | Petterson |
| 4,387,833 A | 6/1983 | Venus, Jr. |
| 4,391,861 A | 7/1983 | Nilsson |
| 4,423,829 A | 1/1984 | Katz |
| 4,457,455 A * | 7/1984 | Meshberg ..................... 222/105 |
| 4,469,250 A | 9/1984 | Evezich |
| 4,476,272 A | 10/1984 | Pengilly |
| 4,484,697 A * | 11/1984 | Fry, Jr. .......................... 222/95 |
| 4,524,458 A | 6/1985 | Pongrass et al. |
| 4,560,069 A | 12/1985 | Simon |
| 4,578,295 A | 3/1986 | Jabarin |
| 4,601,410 A | 7/1986 | Bond |
| 4,615,925 A | 10/1986 | Nilsson |
| 4,641,765 A | 2/1987 | Diamond |
| 4,690,295 A | 9/1987 | Wills |
| 4,796,788 A | 1/1989 | Bond |
| 4,830,811 A | 5/1989 | Aoki |
| 4,842,165 A | 6/1989 | Van Coney |
| 4,846,359 A | 7/1989 | Baird et al. |
| 4,871,087 A | 10/1989 | Johnson |
| 4,881,666 A | 11/1989 | Tullman et al. |
| 4,892,230 A | 1/1990 | Lynn, Jr. |
| 4,893,731 A | 1/1990 | Richter |
| 4,909,416 A | 3/1990 | Evezich |
| 4,955,492 A | 9/1990 | Behm et al. |
| 4,964,540 A | 10/1990 | Katz |
| 4,966,207 A | 10/1990 | Howard et al. |
| 4,984,713 A | 1/1991 | Chambers et al. |
| 5,012,956 A | 5/1991 | Stoody |
| 5,027,952 A | 7/1991 | Kiplinger |
| 5,031,801 A | 7/1991 | Osgar et al. |
| 5,046,638 A | 9/1991 | Wolf |
| 5,085,904 A | 2/1992 | Deak et al. |
| 5,102,010 A | 4/1992 | Osgar et al. |
| 5,102,705 A | 4/1992 | Yammoto et al. |
| 5,108,007 A | 4/1992 | Smith et al. |
| 5,111,971 A | 5/1992 | Winer |
| RE33,969 E | 6/1992 | Richter |
| 5,143,294 A * | 9/1992 | Lintvedt ....................... 239/328 |
| 5,148,945 A | 9/1992 | Geatz |
| 5,186,361 A | 2/1993 | Williams |
| 5,199,609 A | 4/1993 | Ash, Jr. |
| 5,201,438 A | 4/1993 | Norwood |
| 5,217,053 A | 6/1993 | Foster et al. |
| 5,217,138 A | 6/1993 | Nichols |
| 5,228,589 A | 7/1993 | Della Riva |
| 5,232,126 A | 8/1993 | Winer |
| 5,232,129 A | 8/1993 | Guerra |
| 5,251,787 A | 10/1993 | Simson |
| 5,261,543 A | 11/1993 | Ugarelli |
| 5,294,695 A | 3/1994 | Lee et al. |
| 5,301,838 A | 4/1994 | Schmidt et al. |
| 5,303,834 A | 4/1994 | Krishnakumar et al. |
| 5,305,921 A * | 4/1994 | Kock et al. ..................... 222/95 |
| 5,332,121 A | 7/1994 | Schmidt et al. |
| 5,335,821 A | 8/1994 | Osgar |
| 5,343,901 A | 9/1994 | Meshberg |

(56) References Cited

U.S. PATENT DOCUMENTS

| | | |
|---|---|---|
| 5,344,045 A | 9/1994 | Richter et al. |
| 5,368,195 A | 11/1994 | Pleet et al. |
| 5,377,875 A * | 1/1995 | Kock et al. ............... 222/95 |
| 5,381,910 A | 1/1995 | Sugiura et al. |
| 5,383,574 A | 1/1995 | Raphael |
| 5,407,629 A | 4/1995 | Schmidt et al. |
| 5,419,936 A | 5/1995 | Tindale |
| 5,435,452 A | 7/1995 | Nishigami et al. |
| 5,443,766 A | 8/1995 | Slat et al. |
| 5,443,767 A | 8/1995 | Cahill |
| 5,447,678 A | 9/1995 | Kneer et al. |
| 5,454,486 A | 10/1995 | Mack et al. |
| 5,460,207 A | 10/1995 | Meshberg |
| 5,464,106 A | 11/1995 | Slat et al. |
| 5,472,105 A | 12/1995 | Krishnakumar et al. |
| 5,508,076 A | 4/1996 | Bright |
| 5,513,761 A | 5/1996 | Kobayashi et al. |
| 5,526,956 A | 6/1996 | Osgar |
| 5,529,196 A | 6/1996 | Lane |
| 5,529,744 A | 6/1996 | Tindale |
| 5,556,675 A | 9/1996 | Yamamoto et al. |
| 5,569,473 A | 10/1996 | Bright |
| 5,628,957 A | 5/1997 | Collette et al. |
| 5,645,183 A | 7/1997 | Slat et al. |
| 5,647,930 A | 7/1997 | Bright |
| 5,676,267 A | 10/1997 | Slat et al. |
| 5,680,966 A | 10/1997 | Johnson |
| 5,681,628 A | 10/1997 | Niederst et al. |
| 5,693,017 A | 12/1997 | Spears et al. |
| 5,704,503 A | 1/1998 | Krishnakumar et al. |
| 5,746,350 A * | 5/1998 | Nishigami et al. ............. 222/95 |
| 5,749,493 A | 5/1998 | Boone et al. |
| 5,749,500 A | 5/1998 | Kraus |
| 5,750,216 A | 5/1998 | Horino et al. |
| 5,759,653 A | 6/1998 | Collette et al. |
| 5,772,056 A | 6/1998 | Slat |
| 5,804,016 A | 9/1998 | Schmidt et al. |
| 5,804,305 A | 9/1998 | Slat et al. |
| 5,827,164 A | 10/1998 | Tomic |
| 5,873,478 A | 2/1999 | Sullivan et al. |
| 5,875,921 A | 3/1999 | Osgar et al. |
| 5,888,598 A | 3/1999 | Brewster et al. |
| 5,908,128 A | 6/1999 | Krishnakumar et al. |
| 5,915,596 A | 6/1999 | Credle, Jr. |
| 5,921,416 A | 7/1999 | Uehara |
| 5,925,710 A | 7/1999 | Wu et al. |
| 5,927,525 A | 7/1999 | Darr et al. |
| 5,934,457 A | 8/1999 | Ueda et al. |
| 5,941,421 A | 8/1999 | Overman et al. |
| 5,957,328 A | 9/1999 | Osgar |
| 5,968,014 A | 10/1999 | Neftel et al. |
| 5,971,184 A | 10/1999 | Krishnakumar et al. |
| 5,976,653 A | 11/1999 | Collette et al. |
| 5,988,422 A | 11/1999 | Vallot |
| 6,001,439 A | 12/1999 | Kawakami et al. |
| 6,015,068 A | 1/2000 | Osgar et al. |
| 6,016,932 A | 1/2000 | Gaydosh et al. |
| 6,027,438 A | 2/2000 | Frazier et al. |
| 6,034,167 A | 3/2000 | Tung et al. |
| 6,042,635 A | 3/2000 | Chung et al. |
| 6,045,006 A | 4/2000 | Frazier et al. |
| 6,051,295 A | 4/2000 | Schloss et al. |
| 6,065,638 A | 5/2000 | Terranova et al. |
| 6,068,900 A | 5/2000 | Kohn et al. |
| 6,073,807 A | 6/2000 | Wilford et al. |
| 6,083,450 A | 7/2000 | Safian |
| 6,089,027 A | 7/2000 | Wang et al. |
| 6,112,925 A | 9/2000 | Nahill et al. |
| 6,168,048 B1 | 1/2001 | Xu et al. |
| 6,179,142 B1 | 1/2001 | Hansen |
| 6,179,173 B1 | 1/2001 | Frazier et al. |
| 6,203,870 B1 | 3/2001 | Darr |
| 6,206,240 B1 | 3/2001 | Osgar et al. |
| 6,223,932 B1 | 5/2001 | Usui |
| 6,228,447 B1 | 5/2001 | Suzuki et al. |
| 6,237,809 B1 | 5/2001 | Kawai et al. |
| 6,238,201 B1 | 5/2001 | Safian |
| 6,244,454 B1 | 6/2001 | Yoshioka et al. |
| 6,253,936 B1 | 7/2001 | Kong |
| 6,254,820 B1 | 7/2001 | Cornell |
| 6,257,446 B1 | 7/2001 | Pike |
| 6,264,064 B1 | 7/2001 | Birtcher et al. |
| 6,267,132 B1 | 7/2001 | Guarneri |
| 6,296,803 B1 | 10/2001 | Darr |
| 6,305,577 B1 | 10/2001 | Fillmore et al. |
| 6,312,641 B1 | 11/2001 | Hutchinson |
| 6,345,739 B1 | 2/2002 | Mekata |
| 6,349,838 B1 | 2/2002 | Saito et al. |
| 6,360,546 B1 | 3/2002 | Wang et al. |
| 6,412,668 B1 | 7/2002 | Vlooswijk et al. |
| 6,439,413 B1 | 8/2002 | Prevot et al. |
| 6,439,430 B1 | 8/2002 | Gilroy, Sr. et al. |
| 6,453,925 B1 | 9/2002 | Kamo |
| 6,460,404 B1 | 10/2002 | Chan et al. |
| 6,460,730 B1 | 10/2002 | Liedtke |
| 6,467,652 B2 | 10/2002 | Wilcox et al. |
| 6,503,586 B1 | 1/2003 | Wu et al. |
| 6,510,965 B1 * | 1/2003 | Decottignies et al. .......... 222/95 |
| 6,513,669 B2 | 2/2003 | Ozawa et al. |
| 6,542,848 B1 | 4/2003 | Neeser et al. |
| 6,544,459 B2 | 4/2003 | Maruyama et al. |
| 6,562,279 B2 | 5/2003 | Slat |
| 6,607,097 B2 | 8/2003 | Savage et al. |
| 6,609,636 B1 | 8/2003 | Petriekis et al. |
| 6,627,279 B2 | 9/2003 | Hirota et al. |
| 6,641,881 B1 | 11/2003 | Darr |
| 6,645,421 B1 | 11/2003 | Sanderson et al. |
| 6,648,201 B1 | 11/2003 | Marinaro et al. |
| 6,649,121 B1 | 11/2003 | Hamamoto et al. |
| 6,651,847 B2 * | 11/2003 | Mekata et al. ................ 222/105 |
| 6,670,007 B1 | 12/2003 | Safian et al. |
| 6,672,479 B2 | 1/2004 | Shiraishi et al. |
| 6,679,439 B2 | 1/2004 | Duqueroie |
| 6,698,619 B2 | 3/2004 | Wertenberger |
| 6,702,978 B1 | 3/2004 | Kuehn |
| 6,715,644 B2 | 4/2004 | Wilford |
| 6,719,173 B2 | 4/2004 | Safian |
| 6,720,047 B2 | 4/2004 | Kikuchi et al. |
| 6,732,945 B2 | 5/2004 | Dolechek |
| 6,749,780 B2 | 6/2004 | Tobias |
| 6,749,785 B2 | 6/2004 | Subramanian et al. |
| 6,752,297 B1 | 6/2004 | Ische |
| 6,793,095 B1 | 9/2004 | Dulisse et al. |
| 6,808,820 B2 | 10/2004 | Lee et al. |
| 6,851,579 B2 | 2/2005 | Savage et al. |
| 6,879,876 B2 | 4/2005 | O'Dougherty et al. |
| 6,889,873 B1 | 5/2005 | Leboucher |
| 6,920,992 B2 | 7/2005 | Lane et al. |
| 6,926,859 B2 | 8/2005 | Collette et al. |
| 6,932,230 B2 | 8/2005 | Pedmo et al. |
| 6,938,788 B2 | 9/2005 | White |
| 6,939,591 B2 | 9/2005 | Hutchinson et al. |
| 6,942,123 B2 | 9/2005 | Wertenberger |
| 6,942,127 B2 | 9/2005 | Raats |
| 6,945,428 B2 | 9/2005 | Shimizu et al. |
| 6,974,047 B2 | 12/2005 | Kelley et al. |
| 6,984,278 B2 | 1/2006 | Anderson et al. |
| 7,004,209 B2 | 2/2006 | Davis et al. |
| 7,017,781 B2 | 3/2006 | Provenza |
| 7,021,488 B2 | 4/2006 | Thompson |
| 7,022,058 B2 | 4/2006 | Lee |
| 7,025,234 B2 | 4/2006 | Priebe et al. |
| 7,029,752 B2 | 4/2006 | Hama et al. |
| 7,051,890 B2 | 5/2006 | Onoda et al. |
| 7,051,907 B2 * | 5/2006 | Brincat ..................... 222/568 |
| 7,094,863 B2 | 8/2006 | Moore et al. |
| 7,111,763 B2 * | 9/2006 | Masuda ................... 222/386.5 |
| 7,172,087 B1 | 2/2007 | Axe et al. |
| 7,172,096 B2 | 2/2007 | O'Dougherty |
| 7,188,644 B2 | 3/2007 | Kelly et al. |
| 7,191,910 B2 | 3/2007 | Deemer et al. |
| 7,195,129 B2 | 3/2007 | Klemm |
| 7,198,165 B2 | 4/2007 | Zhang |
| 7,201,291 B2 | 4/2007 | Vigny et al. |

(56) References Cited

U.S. PATENT DOCUMENTS

| | | | |
|---|---|---|---|
| 7,204,950 B2 | 4/2007 | Farha et al. |
| 7,261,551 B2 | 8/2007 | Hutchinson et al. |
| 7,296,702 B2 | 11/2007 | Tanaka et al. |
| 7,296,703 B2 | 11/2007 | Lane |
| 7,308,991 B2 * | 12/2007 | Alberg .................... 222/105 |
| 7,316,329 B2 | 1/2008 | Wertenberger |
| 7,332,204 B2 | 2/2008 | Hutchinson et al. |
| 7,357,276 B2 | 4/2008 | Savage et al. |
| 7,364,046 B2 | 4/2008 | Joshi et al. |
| 7,371,455 B2 | 5/2008 | Shirane et al. |
| 7,374,055 B2 | 5/2008 | Hatcher et al. |
| 7,377,399 B2 | 5/2008 | Lane et al. |
| 7,438,196 B2 | 10/2008 | Yourist |
| 7,455,189 B2 | 11/2008 | Lane et al. |
| 7,459,119 B2 | 12/2008 | Ota et al. |
| 7,481,336 B2 * | 1/2009 | Arghyris et al. .......... 222/321.7 |
| 7,531,226 B2 | 5/2009 | Lee et al. |
| 7,544,405 B2 | 6/2009 | Lepage |
| 7,568,588 B2 | 8/2009 | Yourist |
| 7,588,808 B2 | 9/2009 | Hutchinson et al. |
| 7,607,823 B2 | 10/2009 | Kent |
| 7,645,135 B2 | 1/2010 | Hutchinson et al. |
| 7,681,783 B2 | 3/2010 | Stephenson |
| 7,702,418 B2 | 4/2010 | O'Dougherty et al. |
| 7,713,464 B2 | 5/2010 | Nakajima et al. |
| 7,747,344 B2 | 6/2010 | O'Dougherty et al. |
| 7,810,664 B2 | 10/2010 | Trude |
| 7,810,679 B2 | 10/2010 | Wauters et al. |
| 7,833,466 B2 | 11/2010 | Hirota et al. |
| 7,857,157 B2 | 12/2010 | Lane et al. |
| 7,867,434 B2 | 1/2011 | Iwahashi et al. |
| 7,874,442 B2 | 1/2011 | Nievierowski et al. |
| 7,882,971 B2 | 2/2011 | Kelley et al. |
| 7,887,238 B2 | 2/2011 | Turvey et al. |
| 7,984,845 B2 | 7/2011 | Kelly |
| 7,988,897 B2 | 8/2011 | Yamamoto et al. |
| 7,997,460 B2 | 8/2011 | Pardes et al. |
| 8,017,063 B2 | 9/2011 | Hutchinson et al. |
| 8,038,039 B2 | 10/2011 | Kelly et al. |
| 8,052,012 B2 | 11/2011 | Kelly et al. |
| 8,074,839 B2 * | 12/2011 | Ronsin et al. ................ 222/94 |
| 8,322,571 B2 | 12/2012 | Hovinen et al. |
| 8,336,734 B2 * | 12/2012 | Ware et al. .................. 222/105 |
| 8,899,445 B2 * | 12/2014 | Rasmussen .................. 222/105 |
| 2001/0054597 A1 | 12/2001 | Ozawa et al. |
| 2002/0014275 A1 | 2/2002 | Blatt et al. |
| 2002/0022099 A1 | 2/2002 | Schmidt et al. |
| 2002/0048642 A1 | 4/2002 | Beck |
| 2002/0050496 A1 | 5/2002 | Van Der Meer et al. |
| 2002/0088767 A1 | 7/2002 | Saito et al. |
| 2002/0184945 A1 | 12/2002 | Chase et al. |
| 2003/0059130 A1 | 3/2003 | Yoneyama et al. |
| 2003/0075566 A1 | 4/2003 | Priebe et al. |
| 2003/0102335 A1 | 6/2003 | Barnett |
| 2003/0178445 A1 | 9/2003 | Safian |
| 2003/0205285 A1 | 11/2003 | Kelly et al. |
| 2003/0205581 A1 | 11/2003 | Wertenberger |
| 2003/0211256 A1 | 11/2003 | Tobias |
| 2003/0218021 A1 | 11/2003 | Shimizu et al. |
| 2003/0222047 A1 | 12/2003 | McRae |
| 2004/0007589 A1 | 1/2004 | Leveen |
| 2004/0035880 A1 | 2/2004 | Coleman et al. |
| 2004/0058453 A1 | 3/2004 | Free et al. |
| 2004/0069347 A1 | 4/2004 | Graves et al. |
| 2004/0099687 A1 | 5/2004 | Magermans et al. |
| 2004/0149348 A1 | 8/2004 | Wertenberger |
| 2004/0155008 A1 | 8/2004 | Lane et al. |
| 2004/0164047 A1 | 8/2004 | White |
| 2004/0188449 A1 | 9/2004 | Thompson |
| 2004/0217126 A1 | 11/2004 | Lee |
| 2004/0222238 A1 | 11/2004 | Vigny et al. |
| 2004/0226967 A1 | 11/2004 | Van Der Klaauuw et al. |
| 2005/0035083 A1 | 2/2005 | Pedmo et al. |
| 2005/0040181 A1 | 2/2005 | Kurosawa |
| 2005/0067432 A1 | 3/2005 | Bonneyrat |
| 2005/0087237 A1 | 4/2005 | O'Dougherty et al. |
| 2005/0103802 A1 | 5/2005 | Alberg |
| 2005/0121408 A1 | 6/2005 | Deemer et al. |
| 2005/0129888 A1 | 6/2005 | Kwon |
| 2005/0140036 A1 | 6/2005 | Hirota et al. |
| 2005/0141788 A1 | 6/2005 | Ikeda et al. |
| 2005/0167433 A1 | 8/2005 | Kuehn et al. |
| 2005/0230418 A1 | 10/2005 | Campbell et al. |
| 2005/0247664 A1 | 11/2005 | Lane et al. |
| 2005/0279207 A1 | 12/2005 | O'Dougherty et al. |
| 2006/0030652 A1 | 2/2006 | Adams et al. |
| 2006/0054634 A1 | 3/2006 | Mekata |
| 2006/0110555 A1 | 5/2006 | Asai et al. |
| 2006/0113319 A1 | 6/2006 | Smith |
| 2006/0131258 A1 | 6/2006 | Yourist |
| 2006/0131259 A1 | 6/2006 | Hatcher et al. |
| 2006/0146103 A1 | 7/2006 | Nakamura |
| 2006/0151425 A1 | 7/2006 | Kelley et al. |
| 2006/0163292 A1 | 7/2006 | Wauters et al. |
| 2006/0180568 A1 | 8/2006 | Lane |
| 2006/0182911 A1 | 8/2006 | Tammaji et al. |
| 2006/0186083 A1 | 8/2006 | Joshi et al. |
| 2006/0207961 A1 | 9/2006 | Kurtz |
| 2006/0210746 A1 | 9/2006 | Shi et al. |
| 2007/0007234 A1 | 1/2007 | Tanaka et al. |
| 2007/0007307 A1 | 1/2007 | Bohnisch et al. |
| 2007/0039917 A1 | 2/2007 | Yourist |
| 2007/0039918 A1 | 2/2007 | Lane et al. |
| 2007/0062907 A1 | 3/2007 | Heisner |
| 2007/0075032 A1 | 4/2007 | Kelley et al. |
| 2007/0090083 A1 | 4/2007 | Trude |
| 2007/0104907 A1 | 5/2007 | Nishioka et al. |
| 2007/0108228 A1 | 5/2007 | Kleyne |
| 2007/0108668 A1 | 5/2007 | Hutchinson et al. |
| 2007/0170144 A1 | 7/2007 | Lane et al. |
| 2007/0272323 A1 | 11/2007 | Verhaeghe |
| 2008/0009574 A1 | 1/2008 | Huenefeld et al. |
| 2008/0010949 A1 | 1/2008 | Lane et al. |
| 2008/0023887 A1 | 1/2008 | Vollenberg et al. |
| 2008/0035519 A1 | 2/2008 | Swartz et al. |
| 2008/0083696 A1 | 4/2008 | Nievierowski et al. |
| 2008/0087628 A1 | 4/2008 | Bangi et al. |
| 2008/0241447 A1 | 10/2008 | Shi |
| 2008/0257846 A1 | 10/2008 | Van Hove et al. |
| 2008/0258356 A1 | 10/2008 | Van Hove et al. |
| 2008/0260978 A1 | 10/2008 | Van Hove et al. |
| 2008/0272145 A1 | 11/2008 | Nimmo et al. |
| 2008/0272154 A1 | 11/2008 | Maas et al. |
| 2008/0298727 A1 | 12/2008 | Edgington et al. |
| 2008/0302757 A1 | 12/2008 | Furusawa et al. |
| 2008/0310776 A1 | 12/2008 | Turvey et al. |
| 2009/0001019 A1 | 1/2009 | Frometa et al. |
| 2009/0020176 A1 | 1/2009 | Hasegawa et al. |
| 2009/0030094 A1 | 1/2009 | Yamane et al. |
| 2009/0045222 A1 | 2/2009 | Nimmo et al. |
| 2009/0057347 A1 | 3/2009 | Leys et al. |
| 2009/0095701 A1 | 4/2009 | Forsthovel |
| 2009/0127153 A1 | 5/2009 | Kim |
| 2009/0212071 A1 | 8/2009 | Tom et al. |
| 2009/0246428 A1 | 10/2009 | Shimizu et al. |
| 2009/0261097 A1 | 10/2009 | Yamamoto et al. |
| 2009/0283541 A1 | 11/2009 | Compton et al. |
| 2009/0297769 A1 | 12/2009 | Yan et al. |
| 2009/0314798 A1 | 12/2009 | Hovinen et al. |
| 2010/0025430 A1 | 2/2010 | Cisewski et al. |
| 2010/0025895 A1 | 2/2010 | Yamamoto et al. |
| 2010/0072166 A1 | 3/2010 | Dickie |
| 2010/0072167 A1 | 3/2010 | Dickie |
| 2010/0089488 A1 | 4/2010 | Veenendaal et al. |
| 2010/0112815 A1 | 5/2010 | O'Dougherty et al. |
| 2010/0116707 A1 | 5/2010 | Sasai et al. |
| 2010/0133292 A1 | 6/2010 | Ware et al. |
| 2010/0133295 A1 | 6/2010 | Chan et al. |
| 2010/0147884 A1 | 6/2010 | Compton et al. |
| 2010/0163514 A1 | 7/2010 | Human |
| 2010/0181280 A1 | 7/2010 | Howell et al. |
| 2010/0200586 A1 | 8/2010 | Furusawa |
| 2010/0206762 A1 | 8/2010 | Sasai et al. |
| 2010/0227089 A1 | 9/2010 | Van Hove et al. |

(56) References Cited

U.S. PATENT DOCUMENTS

| | | |
|---|---|---|
| 2010/0239799 A1 | 9/2010 | Van Hove et al. |
| 2010/0264140 A1 | 10/2010 | Apps |
| 2010/0330313 A1 | 12/2010 | Van Hove et al. |
| 2011/0024450 A1 | 2/2011 | Maas et al. |
| 2011/0076432 A1 | 3/2011 | Sakaguchi et al. |
| 2011/0108574 A1 | 5/2011 | Nimmo et al. |
| 2011/0147406 A1 | 6/2011 | Grill |
| 2011/0187028 A1 | 8/2011 | Menning et al. |
| 2011/0210148 A1 | 9/2011 | Nelson et al. |
| 2011/0226806 A1 | 9/2011 | O'Dougherty et al. |
| 2012/0267388 A1 | 10/2012 | Tom et al. |
| 2014/0001205 A1 | 1/2014 | Hodges et al. |
| 2014/0374416 A1 | 12/2014 | Tom et al. |

FOREIGN PATENT DOCUMENTS

| | | |
|---|---|---|
| AU | 632548 B2 | 1/1993 |
| CN | 2558598 | 7/2003 |
| CN | 2558598 Y | 7/2003 |
| CN | 101384492 | 3/2009 |
| CN | 101663144 | 3/2010 |
| CN | 101970311 | 2/2011 |
| CN | 102007050 | 4/2011 |
| DE | 2135746 A1 | 2/1972 |
| DE | 2 103 447 | 8/1972 |
| DE | 10321339 | 12/2004 |
| EP | 0105537 A2 | 4/1984 |
| EP | 179538 | 4/1986 |
| EP | 189750 | 8/1986 |
| EP | 0 196 344 A1 | 10/1986 |
| EP | 225677 | 6/1987 |
| EP | 0 251 812 A2 | 1/1988 |
| EP | 0 276 994 A2 | 8/1988 |
| EP | 0276994 A2 | 8/1988 |
| EP | 0 484 771 A1 | 5/1992 |
| EP | 583953 | 2/1994 |
| EP | 633122 | 1/1995 |
| EP | 0 718 213 A1 | 6/1996 |
| EP | 609348 | 1/1997 |
| EP | 957030 | 11/1999 |
| EP | 1097899 | 5/2001 |
| EP | 1 240 932 | 9/2002 |
| EP | 1 277 666 A1 | 1/2003 |
| EP | 1277666 A1 | 1/2003 |
| EP | 1626925 | 2/2006 |
| EP | 1 803 657 A1 | 7/2007 |
| EP | 2152494 | 5/2011 |
| EP | 2366529 | 9/2011 |
| EP | 2388233 | 11/2011 |
| ES | 2293791 | 3/2008 |
| FR | 2 126 610 | 10/1972 |
| FR | 2676958 | 12/1992 |
| FR | 2895735 | 7/2007 |
| FR | 2902083 | 12/2007 |
| FR | 2905116 | 2/2008 |
| GB | 1560952 | 2/1980 |
| GB | 1 601 424 | 10/1981 |
| GB | 2353266 | 2/2001 |
| JP | 56-013399 | 2/1981 |
| JP | 57-125146 | 8/1982 |
| JP | 57174221 | 10/1982 |
| JP | 60021415 | 2/1985 |
| JP | 60070561 | 5/1985 |
| JP | 60-099858 | 6/1985 |
| JP | 61-187271 | 11/1986 |
| JP | 63049371 | 4/1988 |
| JP | 63-076653 | 5/1988 |
| JP | 02-208332 | 8/1990 |
| JP | 4045275 | 4/1992 |
| JP | 04-110593 | 9/1992 |
| JP | 5031791 | 2/1993 |
| JP | 05-103921 | 4/1993 |
| JP | 5213373 | 8/1993 |
| JP | 05319500 | 12/1993 |
| JP | 5330535 | 12/1993 |
| JP | 6039906 | 2/1994 |
| JP | 06-64073 | 3/1994 |
| JP | 06-247499 A | 9/1994 |
| JP | 06-286778 | 10/1994 |
| JP | 7067792 | 3/1995 |
| JP | 7257540 | 10/1995 |
| JP | 8001761 | 1/1996 |
| JP | 8192455 | 7/1996 |
| JP | 8268470 | 10/1996 |
| JP | 2586294 | 2/1997 |
| JP | 09-066228 | 3/1997 |
| JP | 9208688 | 8/1997 |
| JP | 10081354 | 3/1998 |
| JP | 10095903 | 4/1998 |
| JP | 10167243 | 6/1998 |
| JP | 10180853 | 7/1998 |
| JP | 10230919 | 9/1998 |
| JP | 10287365 | 10/1998 |
| JP | 11011484 | 1/1999 |
| JP | 11042697 | 2/1999 |
| JP | 11153510 | 6/1999 |
| JP | 11268771 | 10/1999 |
| JP | 2000/015082 | 1/2000 |
| JP | 2000062745 | 2/2000 |
| JP | 2001062963 | 3/2001 |
| JP | 2011/126601 | 6/2001 |
| JP | 2002-2795 | 1/2002 |
| JP | 2002145233 | 5/2002 |
| JP | 2002264944 | 9/2002 |
| JP | 2003040231 | 2/2003 |
| JP | 2003/137197 | 5/2003 |
| JP | 2003192031 | 7/2003 |
| JP | 2003/252376 | 9/2003 |
| JP | 2003341681 | 12/2003 |
| JP | 2004/51224 | 2/2004 |
| JP | 2005047172 | 2/2005 |
| JP | 2005088979 | 4/2005 |
| JP | 2005178390 | 7/2005 |
| JP | 2005/524584 | 8/2005 |
| JP | 3845908 | 11/2006 |
| JP | 2007/204102 | 8/2007 |
| JP | 2007/258367 | 10/2007 |
| JP | 2007261607 | 10/2007 |
| JP | 2007261608 | 10/2007 |
| JP | 2007/537948 | 12/2007 |
| JP | 4525922 | 8/2010 |
| JP | 2010/235197 | 10/2010 |
| KR | 10/0385555 | 5/2003 |
| KR | 10/0438101 | 6/2004 |
| KR | 200446283 | 10/2009 |
| TW | 197995 B | 1/1993 |
| TW | 556662 | 10/2003 |
| TW | 272216 | 2/2007 |
| WO | 9108099 | 6/1991 |
| WO | 9108100 | 6/1991 |
| WO | WO 91/10604 | 7/1991 |
| WO | WO 91/13003 | 9/1991 |
| WO | 9314987 | 8/1993 |
| WO | 9324392 | 12/1993 |
| WO | WO 95/03245 | 2/1995 |
| WO | WO 96/01226 | 1/1996 |
| WO | 9943571 | 9/1999 |
| WO | 0034023 | 6/2000 |
| WO | WO 00/54724 | 9/2000 |
| WO | WO 01/83323 | 11/2001 |
| WO | 0247988 | 6/2002 |
| WO | WO 03/093109 A1 | 11/2003 |
| WO | WO 03/093141 A1 | 11/2003 |
| WO | WO 2004/050537 A2 | 6/2004 |
| WO | 2005023660 | 3/2005 |
| WO | 2005100203 | 10/2005 |
| WO | 2006116428 | 11/2006 |
| WO | WO 2006/116572 A2 | 11/2006 |
| WO | WO 2006/133026 A2 | 12/2006 |
| WO | WO 2007/019853 A2 | 2/2007 |
| WO | WO 2007/061967 A2 | 5/2007 |
| WO | WO 2007/088661 A1 | 8/2007 |
| WO | WO 2007/146892 A2 | 12/2007 |
| WO | WO 2008/000574 A1 | 1/2008 |

(56) References Cited

FOREIGN PATENT DOCUMENTS

| WO | 2008022605 | 2/2008 |
|---|---|---|
| WO | 2008077468 | 7/2008 |
| WO | WO 2008/095024 A1 | 8/2008 |
| WO | 2009041809 | 4/2009 |
| WO | 2009076101 | 6/2009 |
| WO | WO 2009/076276 A2 | 6/2009 |
| WO | WO 2009/088285 A1 | 7/2009 |
| WO | 2009154446 | 12/2009 |
| WO | 2010031764 | 3/2010 |
| WO | 2010044659 | 4/2010 |
| WO | 2010064749 | 6/2010 |
| WO | 2011002294 | 1/2011 |
| WO | WO 2012/051496 A2 | 4/2012 |
| WO | 2012051093 | 7/2012 |
| WO | 2012118527 | 9/2012 |
| WO | 2012135266 | 10/2012 |

OTHER PUBLICATIONS

Extended European Search Report and Opinion for related European Application No. 13176646.1, mailed Nov. 5, 2013 (6 pages).
"Burple". Retroland, Inc., 2003-2011. Retrieved from Internet Nov. 27, 2012 URL: <http://www.retroland.com/burple/> (3 pp.).
Cascio, S.J. et al. "Low Pressure Liquid Dispense System", IBM Technical Disclosure Bulletin, vol. 20, No. 1, Jun. 1977 (pp. 126-127).
"Cheertainer Bag in Box". CDF Corporation, 2012. Retrieved from Internet Dec. 4, 2012 URL:<http://www.cdf1.com/cheertainer.php> (2 pp.).
Ophir, A. et al "Hot Fillable Containers Containing PET/Pen Copolymers and Blends", 2004. Retrieved from Internet Dec. 4, 2012. URL: <http://www.isplrc.co.il/images/calc/HighTempPET.doc> (20 pp.).
Hudson, Benjamin S. "The effect of liquid hot filling temperature on blow-molded HDPE bottle properties", Dec. 2008. Retrieved from Internet Dec. 4, 2012 URL: <http://contentdm.lib.byu.edu/cdm/ref/collection/ETD/id/1628> (154 pp.).
International Search Report and Written Opinion for related PCT Application PCT/US2012/070866 mailed Apr. 22, 2013 (15 pages).
Notification Concerning Transmittal of International Preliminary Report on Patentability (Chapter 1 of the Patent Cooperation Treaty) corresponding to International Patent Application No. PCT/US2008/052506 dated Aug. 13, 2009.
Notification of Transmittal of International Search Report and the Written Opinion of the International Searching Authority corresponding to International Patent Application No. PCT/US2008/052506 dated Jul. 26, 2008.
Notification of Transmittal of the International Search Report and the Written Opinion of the International Searching Authority for the International Application No. PCT/US2011/020236 dated Jan. 2, 2012.
Official Action corresponding to U.S. Appl. No. 12/525,128 dated Jun. 1, 2012.
Official Action corresponding to the U.S. Appl. No. 12/525,128 dated Mar. 14, 2012.
International Search Report and Written Opinion for related PCT Application No. PCT/US2013/024324 dated May 13, 2013 (7 pages).
Mykrolis "Fluorogard AT and ATX Disposable Filters" (2004).

* cited by examiner

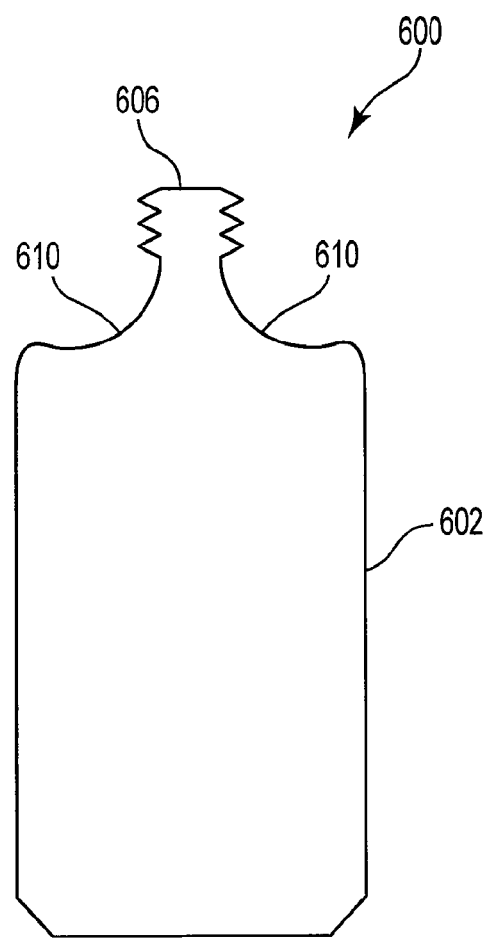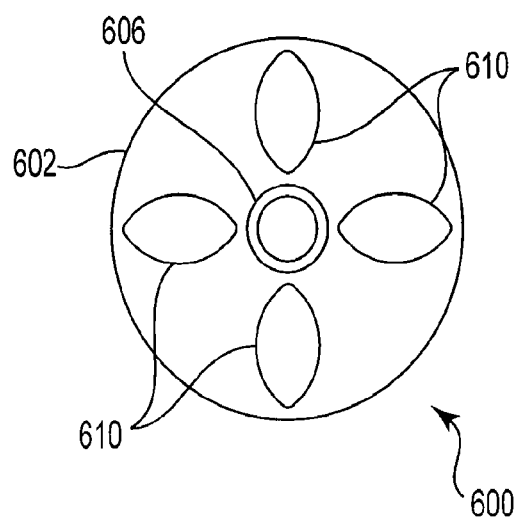
Fig. 6

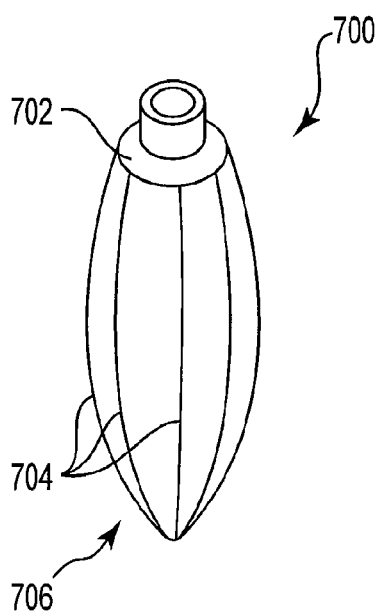
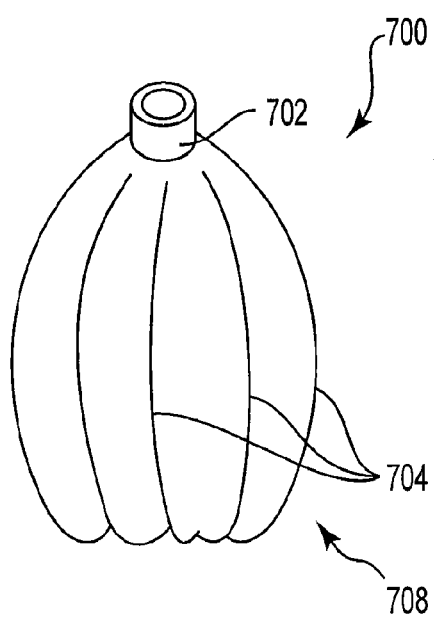
Fig. 7A  Fig. 7B
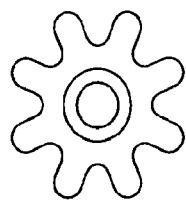
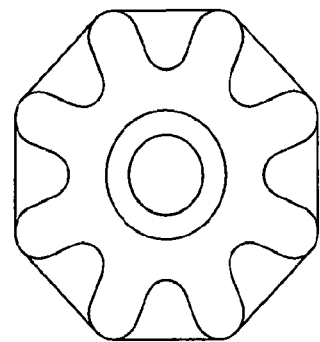
Fig. 7C  Fig. 7D
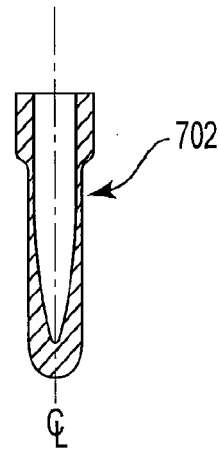
Fig. 7E

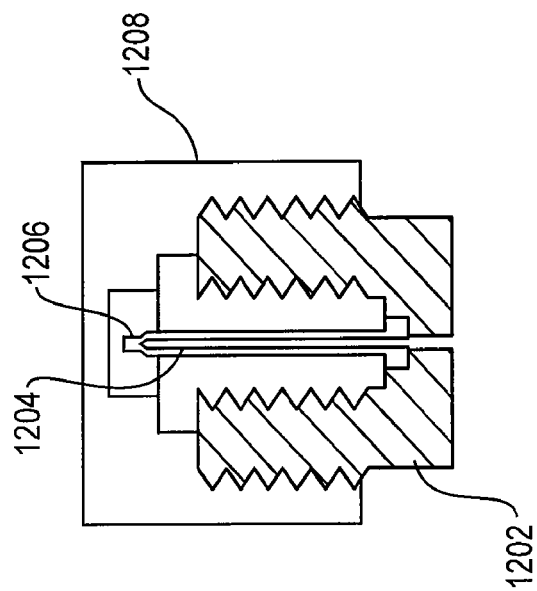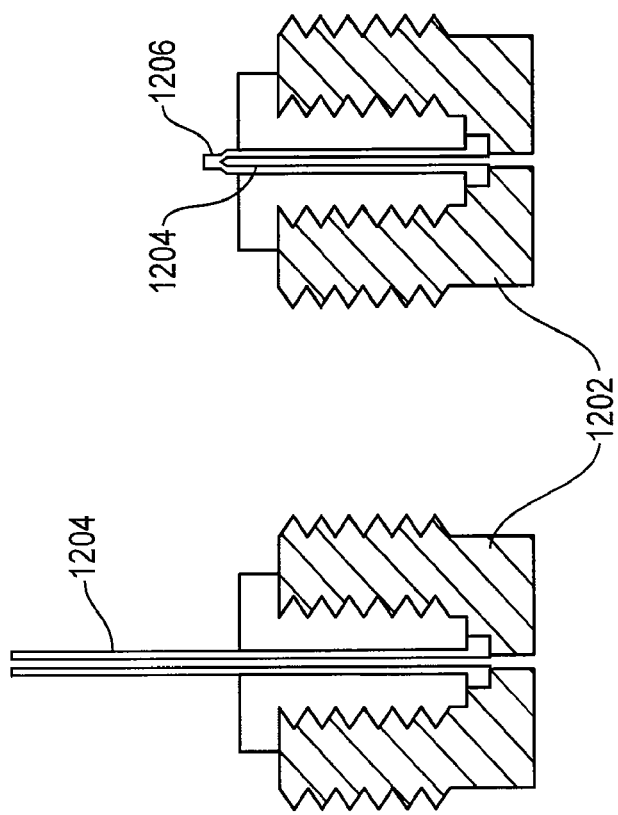

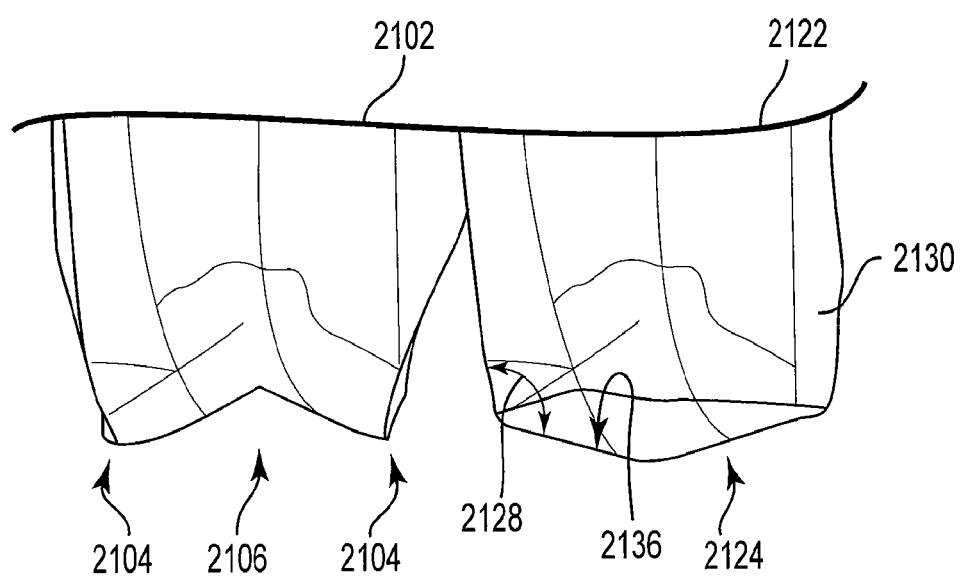

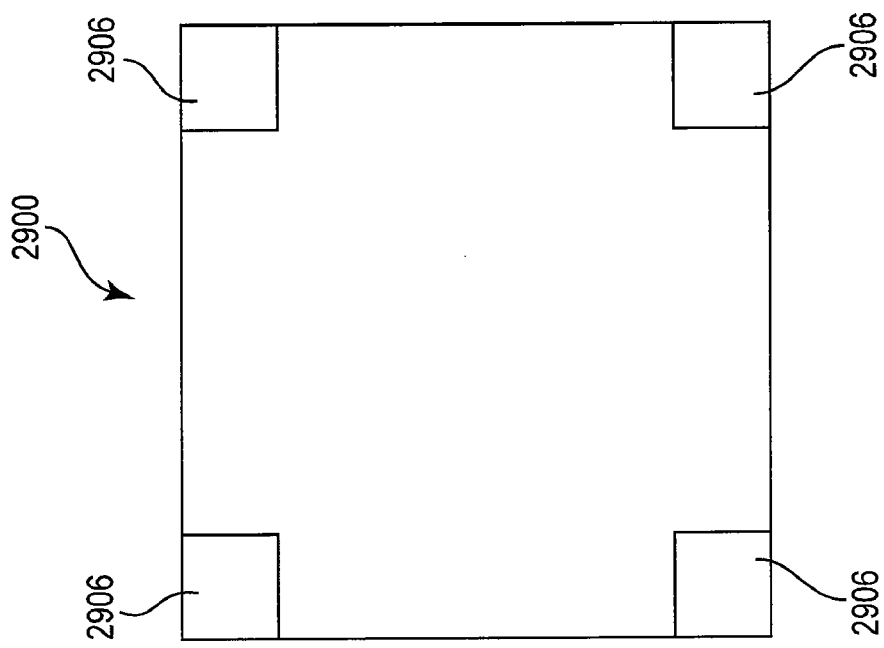
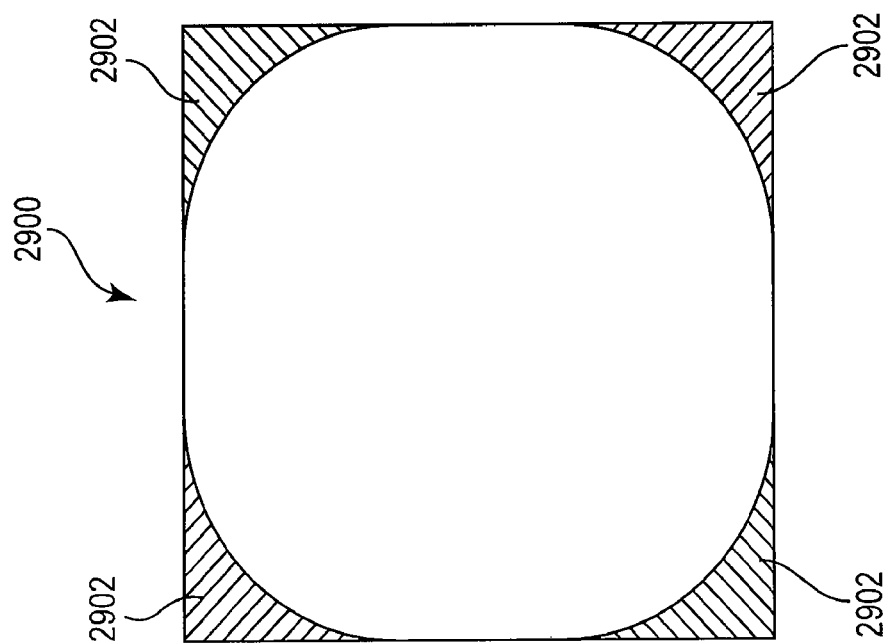

SUBSTANTIALLY RIGID COLLAPSIBLE LINER AND FLEXIBLE GUSSETED OR NON-GUSSETED LINERS AND METHODS OF MANUFACTURING THE SAME AND METHODS FOR LIMITING CHOKE-OFF IN LINERS

CROSS-REFERENCE TO RELATED APPLICATIONS

This application is a national stage application under 35 U.S.C. 371 of PCT Patent Application No. PCT/US2010/041629, filed Jul. 9, 2010, entitled "Substantially Rigid Collapsible Liner and Flexible Gusseted or Non-gusseted Liners and Methods of Manufacturing the Same and Methods for Limiting Choke-Off in Liners," which claims benefit under 35 U.S.C. §119(e) of priority to U.S. Provisional Application No. 61/224,274 filed Jul. 9, 2009, U.S. Provisional Application No. 61/236,295 filed Aug. 24, 2009, U.S. Provisional Application No. 61/251,870 filed Oct. 15, 2009, and U.S. Provisional Application No. 61/294,928 filed Jan. 14, 2010, the contents of all of which are hereby incorporated in their entirety by reference.

FIELD OF THE INVENTION

The present disclosure relates to liner-based storage and dispensing systems. More particularly, the present disclosure relates to substantially rigid containers, collapsible liners, and flexible gusseted or non-gusseted liners and methods for manufacturing the same. The present disclosure also relates to methods for limiting choke-off in liners.

BACKGROUND OF THE INVENTION

Numerous manufacturing processes require the use of ultrapure liquids, such as acids, solvents, bases, photoresists, slurries, cleaning formulations, dopants, inorganic, organic, metalorganic and biological solutions, pharmaceuticals, and radioactive chemicals. Such applications require that the number and size of particles in the ultrapure liquids be minimized. In particular, because ultrapure liquids are used in many aspects of the microelectronic manufacturing process, semiconductor manufacturers have established strict particle concentration specifications for process chemicals and chemical-handling equipment. Such specifications are needed because, should the liquids used during the manufacturing process contain high levels of particles or bubbles, the particles or bubbles may be deposited on solid surfaces of the silicon. This can, in turn, lead to product failure and reduced quality and reliability.

Accordingly, storage, transportation, and dispensing of such ultrapure liquids require containers capable of providing adequate protection for the retained liquids. Two types of containers typically used in the industries are simple rigid-wall containers made of glass or plastic and collapsible liner-based containers. Rigid-wall containers are conventionally used because of their physical strengths, thick walls, inexpensive cost, and ease of manufacture. Such containers, however, can introduce air-liquid interfaces when pressure-dispensing the liquid. This increase in pressure can cause gas to dissolve into the retained liquid, such as photoresist, in the container and can lead to undesired particle and bubble generation in the liquids in the dispense train.

Alternatively, collapsible liner-based containers, such as the NOWPak® dispense system marketed by ATMI, Inc., are capable of reducing such air-liquid interfaces by pressurizing, with gas, onto the liner, as opposed to directly onto the liquid in the container, while dispensing. However, known liners may be unable to provide adequate protection against environmental conditions. For example, current liner-based containers may fail to protect the retained liquid against pinhole punctures and tears in the welds sometimes caused by elastic deformation from vibrations, such as those brought on by transportation of the container. The vibrations from transportation can elastically deform or flex a liner many times (e.g., thousands to millions of times) between the source and final destinations. The greater the vibration, the more probable that pinholes and weld tears will be produced. Other causes of pinholes and weld tears include shock effect, drops, or large amplitude movements of the container. Gas may be introduced through the pinholes or weld tears, thereby contaminating the retained liquids over time, as the gas will be permitted to go into the solution and come out onto the wafer as bubbles.

Additionally, collapsible liners are configured to be filled with a specified amount of liquid. However, the liners do not fit cleanly within their respective outer containers because folds are created in the liners as they are fit inside the containers. The folds may preclude liquid from filling the liners in the space taken up by the folds. Accordingly, when the container is filled with the specified amount of liquid, the liquid tends to overflow the container resulting in loss of liquid. As stated previously, such liquids are typically ultra-pure liquids, such as acids, solvents, bases, photoresists, dopants, inorganic, organic, and biological solutions, pharmaceuticals, and radioactive chemicals, which can be very expensive, for example about $2,500/L or more. Thus, even a small amount of overflow is undesirable.

Thus, there exists a need in the art for better liner systems for ultrapure liquids that do not include the disadvantages presented by prior rigid-wall and collapsible liner-based containers. There is a need in the art for substantially rigid collapsible liners and flexible gusseted or non-gusseted liners. There is a need in the art for a liner-based storage and dispensing system that addresses the problems associated with pinholes, weld tears, gas pressure saturation, and overflow. There is a need in the art for liner-based storage and dispensing systems that addresses the problems associated with excess folds in the liner that can result in additional trapped gas within the liner. There is also a need in the art for liners that are comprised such that choke-off is limited or eliminated.

BRIEF SUMMARY OF THE INVENTION

The present disclosure, in one embodiment, relates to a liner-based storage system that includes an overpack and a liner. The liner may be provided within the overpack. The liner may have a substantially rigid liner wall forming an interior cavity of the liner, the rigid liner wall having a thickness such that the liner is substantially self-supporting in an expanded state but collapsible at a pressureless than about 20 psi to dispense fluid from within the interior cavity.

The present disclosure in another embodiment, relates to a liner that has a liner wall forming an interior cavity of the liner and a sump area generally at the bottom of the liner to increase dispensability.

In another embodiment, the present disclosure relates to a method of delivering a high purity material to a semiconductor process that includes providing a substantially rigid, free-standing container having the high purity material stored in an interior thereof. The container has a container wall comprising polyethylene naphthalate (PEN) and a dip tube in the interior for dispensing the high purity material therefrom. The dip tube is coupled to a downstream semiconductor process. The method also includes dispensing the high purity material from the container via the dip tube and delivering the high purity material to the downstream semiconductor process.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

FIG. 6 is a side, cross-sectional view and a top view of a substantially rigid collapsible liner in accordance with a further embodiment of the present disclosure.

FIG. 7A is a perspective view of a liner in accordance with one embodiment of the present disclosure.

FIG. 7B is a perspective view of the liner of FIG. 7A shown in an expanded state.

FIG. 7C is a top view of the liner shown in FIG. 7A.

FIG. 7D is top view of the liner shown in FIG. 7B.

FIG. 7E shows the neck of a liner in an injection blow molding process, according to one embodiment of the present disclosure.

FIG. 12A is a cut-away view of a connector for a liner according to one embodiment of the present disclosure.

FIG. 12B shows the embodiment of FIG. 12A wherein the tube has been welded shut after filling, according to one embodiment of the present disclosure.

FIG. 12C shows the embodiment of FIG. 12B including a protective overcap that has been secured to the connector, according to one embodiment of the present disclosure.

FIG. 21A is a perspective view of a bottom of a liner that has not fully expanded, according to some embodiments of the present disclosure.

FIG. 21B is a perspective view of a bottom of a liner that has fully expanded, according to some embodiments of the present disclosure.

FIG. 29A shows a liner with the corners removed, in accordance with some embodiments of the present disclosure.

FIG. 29B shows weld lines on a liner in accordance with some embodiments of the present disclosure.

DETAILED DESCRIPTION

Figure 1:
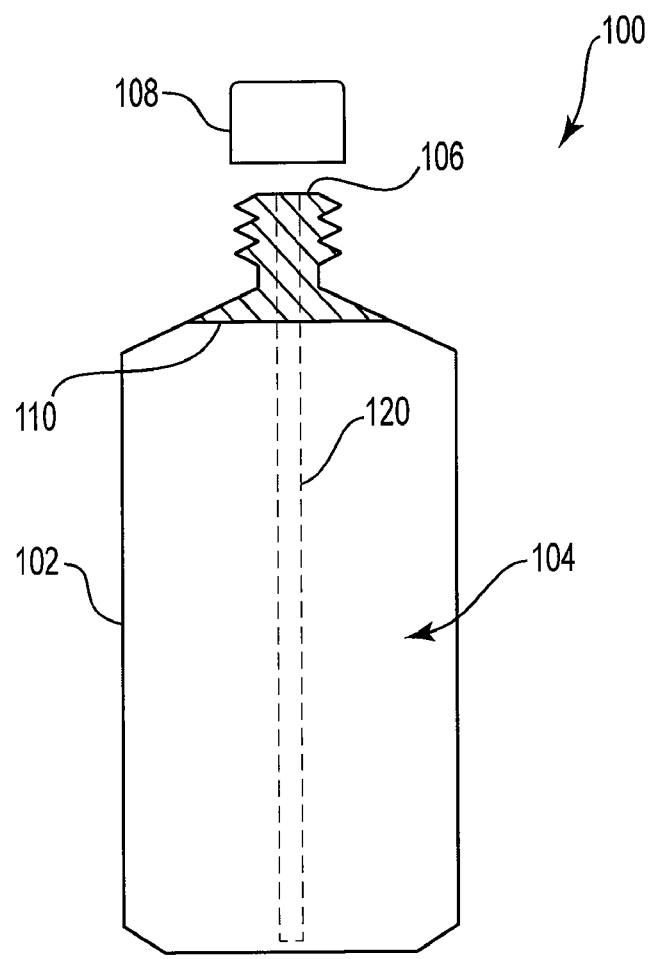
FIG. 1 is a side, cross-sectional view of a substantially, rigid collapsible liner in accordance with an embodiment of the present disclosure.

The present disclosure relates to novel and advantageous liner-based storage and dispensing systems. More particularly, the present disclosure relates to novel and advantageous substantially rigid collapsible liners and flexible liners including gusseted or non-gusseted liners and methods for manufacturing such liners. The present disclosure also relates to methods for preventing or eliminating choke-off in liners. More particularly, the present disclosure relates to a blow-molded, substantially rigid collapsible liner that can be suitable particularly for smaller storage and dispensing systems, such as storage of about 2000 L or less of liquid, and more desirably about 200 L or less of liquid. The substantially rigid collapsible liner can be formed from materials with inert properties. Furthermore, the substantially rigid collapsible liner may be a stand-alone liner, e.g., used without an outer container, and may be dispensed from using a pump or a pressurized fluid. Unlike certain prior art liners that are formed by welding films together with resultant folds or seams, folds in the substantially rigid collapsible liner may be substantially eliminated, thereby substantially reducing or eliminating the problems associated with pinholes, weld tears, and overflow.

The present disclosure also relates to a flexible gusseted or non-gusseted liner, which is scalable in size and may be used for storage of up to 200 L or more. The flexible liner may be foldable, such that the liner can be introduced into a dispensing container, for example but not limited to, a pressure vessel, can, bottle, or drum. However, unlike certain prior art liners, among other things, the flexible liner of the present disclosure can be made of thicker materials, substantially reducing or eliminating the problems associated with pinholes, and may include more robust welds, substantially reducing or eliminating the problems associated with weld tears. The flexible liner can further be configured such that the number of folds is substantially reduced.

Example uses of such liners may include, but are not limited to, transporting and dispensing acids, solvents, bases, photoresists, slurries, cleaning formulations, dopants, inorganic, organic, metalorganics, TEOS, and biological solutions, pharmaceuticals, and radioactive chemicals.

However, such liners may further be used in other industries and for transporting and dispensing other products such as, but not limited to, paints, soft drinks, cooking oils, agrochemicals, health and oral hygiene products, and toiletry products, etc. Those skilled in the art will recognize the benefits of such liners and the process of manufacturing the liners, and therefore will recognize the suitability of the liners to various industries and for the transportation and dispense of various products.

The present disclosure also relates to methods for limiting or eliminating choke-off in liners. Generally speaking, choke-off may be described as what occurs when a liner necks and ultimately collapses on itself, or a structure internal to the liner, to form a choke point disposed above a substantial amount of liquid. When a choke-off occurs, it may preclude complete utilization of the liquid disposed within the liner, which is a significant problem, as specialty chemical reagents utilized in industrial processes such as the manufacture of microelectronic device products can be extraordinarily expensive. A variety of ways of preventing or handling choke-off are described in PCT Application Number PCT/US08/52506, entitled, "Prevention Of Liner Choke-off In Liner-based Pressure Dispensation System," with an international filing date of Jan. 30, 2008, which is hereby incorporated herein by reference in its entirety.

Substantially Rigid Collapsible Liners

As stated above, the present disclosure relates to various embodiments of a blow-molded, substantially rigid collapsible liner that may be suitable particularly for smaller storage and dispensing systems, such as storage of about 2000 L or less of liquid, and more desirably about 200 L or less of liquid. Accordingly, the substantially rigid collapsible liners may be suitable for storage of high purity liquids, which can be very expensive (e.g., about $2,500/L or more), that are used in the integrated circuit or flat panel display industries, for example.

As used herein, the terms "rigid" or "substantially rigid," in addition to any standard dictionary definitions, are meant to also include the characteristic of an object or material to substantially hold its shape and/or volume when in an environment of a first pressure, but wherein the shape and/or volume may be altered in an environment of increased or decreased pressure. The amount of increased or decreased pressure needed to alter the shape and/or volume of the object or material may depend on the application desired for the material or object and may vary from application to application.

FIG. 1 illustrates a cross-sectional view of one embodiment of a substantially rigid collapsible liner 100 of the present disclosure. Liner 100 may include a substantially rigid liner wall 102, an interior cavity 104, and a mouth 106.

Liner wall 102 may generally be thicker than the liners in conventional collapsible liner-based systems. The increased thickness of liner wall 102 increases the rigidity and strength of liner 100. Because of the rigidity, in one embodiment, as shown in FIG. 1, liner 100 may be free-standing and used similar to conventional rigid-wall containers, for example glass bottles. In another embodiment, the liner 100 may be free-standing during filling, transportation, and storage. That is, an outer container is not necessary for support of the liner as with liners in conventional collapsible liner-based systems. In one embodiment, a pressure vessel may be used when pressure dispensing liquid from liner 100 during chemical delivery. In a further embodiment, liner 100 may be a free-standing container system. Such embodiments can reduce the overall cost of the container system by substantially eliminating the cost associated with the outer containers. Additionally, in conventional collapsible liner-based systems, the liner and outer container are both typically non-reusable and need to be disposed. In various embodiments of the present disclosure, since an outer container is not necessary, waste can be substantially reduced or minimized because only the liner would be disposed. In one embodiment, liner wall 102 may be from about 0.05 mm to about 3 mm thick, desirably from about 0.2 mm to about 1 mm thick. However, the thickness may vary depending on the volume of the liner. Generally, liner 100 can be thick and rigid enough to substantially reduce or eliminate the occurrence of pinholes.

While the thickness of liner wall 102 can provide rigidity to liner 100, the thickness is selected so that, when a specified amount of pressure or vacuum is applied to liner 100, liner wall 102 is collapsible to dispense liquid from within interior cavity 104. In one embodiment, the dispensability of liner 100 may be controlled based on the thickness selected for liner wall 102. That is, the thicker liner wall 102 is, the more pressure that will need to be applied to fully dispense the liquid from within interior cavity 104. In further embodiments, the liner 100 may be initially shipped in a collapsed or folded state to save shipping space, and allow more liners 100 to be shipped td a recipient, for example a chemical supplier, in one shipment. The liner 100 could subsequently be filled with any of the various liquids or products previously mentioned.

Liner mouth 106 may be generally rigid, and in some embodiments, more rigid than liner wall 102. Mouth 106 may be threaded or include a threaded fitment port, such that mouth 106 may receive a cap 108 that has been complimentarily threaded. It is recognized that any other suitable connection mechanism, such as bayonet, snap-fit, etc., may be used in place of, or in addition to, threads. In some embodiments, because the liner mouth 106 may be more rigid than liner wall 102, the area near the liner mouth may not collapse as much as liner wall 102 when pressure is applied during dispensing. Thus, in some embodiments, during pressure dispense of the contents within the liner, liquid may be entrapped in a dead space where the area near the liner mouth has not fully collapsed. Accordingly, in some embodiments, a connector 110 or connecting means, for connecting with a corresponding connector of a pressure dispensing system and output line, may substantially penetrate or fill the generally rigid area of the liner near the mouth. That is, the connector 110 may substantially fill the dead space so that liquid is not entrapped during pressure dispense, thereby reducing or eliminating dead space waste. The connector 110, in some embodiments, may be manufactured of a substantially rigid material, such as plastic.

In further embodiments, liner 100 may be equipped with an internal hollow dip tube 120 (illustrated in broken line in FIG. 1) having an aperture at the lower or distal end thereof serving as a point of fluid egress from liner 100. The hollow dip tube 120 may be integral with, or separate from, connector 110. In this regard, the contents within liner 100 may be received directly from liner 100 via the dip tube 120. Although FIG. 1 illustrates a liner that may be equipped with an optional dip tube 120, liner 100 according to various embodiments described herein is, in many cases, preferably devoid of any dip tube. In some embodiments of a liner 100 that includes the use of a dip tube 120, the dip tube 120 may also be used to pump dispense the contents within the liner 100.

Liner 100 may have a relatively simplistic design with a generally smooth outer surface, or liner 100 may have a relatively complicated design, including, for example and not limited to, indentations and protrusions. In one embodiment, for example, liner 100 may be textured to prevent choke-off, which along with other embodiments, will be discussed herein. That is, liner 100 may be textured to prevent the liner from collapsing in on itself in a manner that would trap liquid within the liner and preclude the liquid from being dispensed properly.

In some embodiments, liner 100 may be manufactured using one or more polymers, including plastics, nylons, EVOH, polyolefins, or other natural or synthetic polymers. In further embodiments, liner 100 may be manufactured using polyethylene terephthalate (PET), polyethylene naphthalate (PEN), poly(butylene 2,6-naphthalate) (PBN), polyethylene (PE), linear low-density polyethylene (LLDPE), low-density polyethylene (LDPE), medium-density polyethylene (MDPE), high-density polyethylene (HDPE), and/or polypropylene (PP). Liners made using PEN, for example, may have lower permeability, and thus, allow less gas from outside the liner 100 to infiltrate the liner wall 102 and contaminate the liquid stored within the liner 100. Liners made using PE, LLDPE, LDPE, MDPE, HDPE, and/or PP may also be suitable for larger storage and dispensing systems, such as storage of about 2000 L or less of liquid.

In addition to the substantially rigid collapsible liners discussed under this heading, in an alternative embodiment, PEN, PET, or PBN, and optionally any suitable mixtures or mixtures of copolymers may be used to make generally rigid liners, similar to rigid-wall containers described above, so that such rigid liners may be introduced to, for example, the semi-conductor industry, and used with high purity liquids. Such liners comprising PEN, PET, or PBN improve chemical compatibility compared to other plastic containers and are safer to use compared to glass bottles, thereby allowing them to be used in industries typically reserved for conventional rigid wall containers. PEN liners of the present disclosure in some embodiments, for example, may be designed for a single use. Such liners may be an advantageous alternative to prior art glass bottles because they may have an overall cost lower than that of glass bottles when all factors are considered, including the cost of ownership, shipping, sanitizing, etc. that may be associated with glass bottles. Further, a PEN liner may be more advantageous than glass because, as is well known, glass may break, which may result not only in contamination or loss of the material in the bottle, but also may create safety concerns. In contrast, the PEN liners of the present disclosure may be break-proof. In some embodiments, the PEN liner may be a stand-alone liner that may not use an overpack. In other embodiments, an overpack may be used with the liner. In some embodiments, the PEN liner may include a sump to help increase the dispensability of the contents of the liner, the sump is described in detail below and would be used in a substantially similar manner in a PEN embodiment. The dispense of the PEN liners in some embodiments may include both pump dispense or pressure dispense. However, in some embodiments, because the PEN liner may be generally non-collapsible the pressure dispense may apply pressure directly on the contents of the liner as opposed to on the exterior walls of the liner as may be the case for other embodiments described herein. In some embodiments, the PEN liner may have reduced carbon dioxide emissions. The PEN liner embodiments may be used in substantially the same way as other liners described in the present disclosure.

In alternative embodiments, liner 100 may be manufactured using a fluoropolymer, such as but not limited to, polychlorotrifluoroethylene (PCTFE), polytetrafluoroethylene (PTFE), fluorinated ethylene propylene (FEP), and perfluoroalkoxy (PFA). In some embodiments, liner 100 may comprise multiple layers. For example, in certain embodiments, liner 100 may include an internal surface layer, a core layer, and an outer layer, or any other suitable number of layers. The multiple layers may comprise one or more different polymers or other suitable materials. For example, the internal surface layer may be manufactured using a fluoropolymer (e.g., PCTFE, PTFE, FEP, PFA, etc.) and the core layer may be a gas barrier layer manufactured using such materials as nylon, EVOH, polyethylene naphthalate (PEN), PCTFE, etc. The outer layer may also be manufactured using any variety of suitable materials and may depend on the materials selected for the internal surface layer and core layer. It is recognized that the various embodiments of substantially rigid liners described herein may be manufactured from any suitable combination of materials disclosed herein.

In still alternative embodiments, the polymeric liner of the present disclosure may be manufactured using a metal outer layer, for example, but not limited to AL (aluminum), steel, coated steels, stainless steels, Ni (nickel), Cu (copper), Mo (molybdenum, W (tungsten), chromium-copper bi-layer, titanium-copper bi-layer, or any other suitable metal material or combination of materials. In some embodiments, metal coated liners may be overcoated with a protective dielectric, for example, $SiO_2$ from TEOS (tetraethylorthosilicate), or $SiCl_4$ (silicon tetrachloride), MO (metal organics), $TiO_2$ from $TiCl_4$ (titanium tetrachloride), or other suitable metal oxide material, or any other suitable metal, or some combination thereof. Metal liners may be advantageous for storing and shipping substances, including ultrapure substances because a metal liner may be substantially impermeable to gases, thus reducing oxidation and/or hydrolysis of the contents and maintaining the purity of the substance contained in the liner. Because of the impermeability of the metal, a liner of this embodiment may be substantially free of pinholes or weld tears and may be very robust and have a consistent fill volume.

In still another embodiment, the liner of the present disclosure may be manufactured using a metal container, for example, but not limited to aluminum, nickel, stainless steel, thin-walled steel, or any other suitable metal material or combination of materials. In some embodiments, these metal containers are coated on the internal surface with inert films to reduce interaction of the high purity chemical with the metal walls. The films may be inert metals, metal oxides, metal nitrides or metal carbides chosen specifically to reduce the chemical interactions and degradation of the chemical inside the metal container. Because of the rigidity of the metal, a liner of this embodiment may be substantially free of pinholes or weld tears and may be very robust and have a consistent fill volume.

Traditionally, however, metal cans have been expensive to use. For instance, the cost of a metal container may often times be greater than the cost of the substance stored in the container. Accordingly, in order to be cost-effective, such a metal container generally is used repeatedly, which in turn requires that the container be shipped back for reuse and appropriately cleaned prior to refilling. Shipping the containers back and cleaning the containers for reuse may be both time consuming and expensive. In some embodiments of the present disclosure, however, a rigid collapsible metal container may be manufactured for a cost effective single use by, for instance, manufacturing the walls of the metal liner to be relatively thin as compared to prior art metal containers. For example, in some embodiments, the liner walls may be from 0.5 to 3.0 mm thick. More preferably, the walls may be from 0.6 to 2 mm thick, in some embodiments. The thickness of the walls may allow a metal liner of the present disclosure to be substantially rigid but collapsible under pressure. Metal liners may be sized for holding generally large volumes, for example, up to approximately 2000 L in some embodiments, while in other embodiments metal liners may be sized to hold approximately 200 L or less. In some embodiments, metal may be applied by vapor deposition, such as but not limited to chemical vapor deposition.

In another embodiment, a plastic liner may be provided that may be coated with a metal. For example, a liner may be formed of a polymer such as PP, PE, PET, PEN, HDPE or any other suitable polymer, or combination of polymers as described above. The outside of the liner may be metalized with, such as but not limited to aluminum. It will be recognized that any suitable metal may be used to metalize the outside of a polymer liner according to this embodiment. The liner may be metalized by any suitable method, such as, for example, plating, electro-plating, spraying, etc. Metalizing the outside of the liner may substantially decrease or eliminate the effects of gas permeability. Because of the impermeability provided by the metal coating, a liner of this embodiment may be substantially free of pinholes or weld tears and may be very robust and have a consistent fill volume. Similar to the liners described above, metal coated liners of this type may also be sized to hold up to approximately 2000 L in some embodiments, while other embodiments may be sized to hold approximately 200 L or less. The metal liners and metal coated liners described herein may include folds, pleats, handles, sumps, and/or any other liner configuration and/or feature described herein with reference to other embodiments.

In some embodiments, the liner of the present disclosure may be coated with a barrier-enhancing coating, such as, for instance, an epoxy amine coating. However, it is recognized that other suitable coating polymers or mixtures of polymers may be used as a barrier-enhancing coating. The coating may be particularly advantageous where the liner is comprised of PET, or other polymeric materials, however the coating may be applied to any of the liners contemplated in the present disclosure. The application of an epoxy amine coating may reduce gas permeability bi-directionally, that is, the coating may reduce the amount of gas that may get into the liner, as well as the amount of gas that may leave the liner. Applying the coating may also increase the shelf-life of the liner and its contents. Further, application of the barrier-enhancing coating may reduce oxygen or moisture permeability and may enable a broader array of materials to be stored in the liner, for example but not limited to, liquids that display air sensitivity, such as gallic acid cleaning formulations and/or CVD precursor materials.

The coating may be sprayed onto the bag prior to folding, or after the liner is completely assembled. It will be understood that the coating may be applied to the interior and/or exterior of the liner, or in embodiments with multiple layers, the coating may be applied to one or both sides of one or all layers of the liner. The coating may be applied in variable thicknesses dependent upon the shelf-life desired, e.g., the thicker the coating, the longer the shelf-life. However, it will be recognized that the barrier-enhancing coating may be applied in any suitable thickness, and cured over varying amounts of time depending on the desired application. Further, the crosslink density of the barrier film and the surface adhesion of the barrier film may vary depending on the degree of barrier protection desired. Generally, the surface of the liner may be chemically, physically, electrochemically, or electrostatically modified, such as by application of a coating, to enhance the barrier qualities of the liner. In some embodiments the barrier enhancing material may be generally applied to a liner in the manner illustrated in the flow diagram of FIG. 2. In one step 202, a fan may be used to blow ionized air onto the liner in order to clean the surface in preparation for receiving the coating material. In one embodiment, as shown in step 204, an electrical charge may then be applied. The barrier enhancing material may then be applied to the liner, for example but not limited to, using electrostatic spray guns 206. Chucks may spin the liners as they proceed through the coatings application area, ensuring a uniform coating is applied. Any overspray may be collected and disposed of. The coated-liner may then be cured in a curing oven 208.

In another embodiment, the coating barrier may be provided in another liner layer as opposed to a coating.

Figure 3:
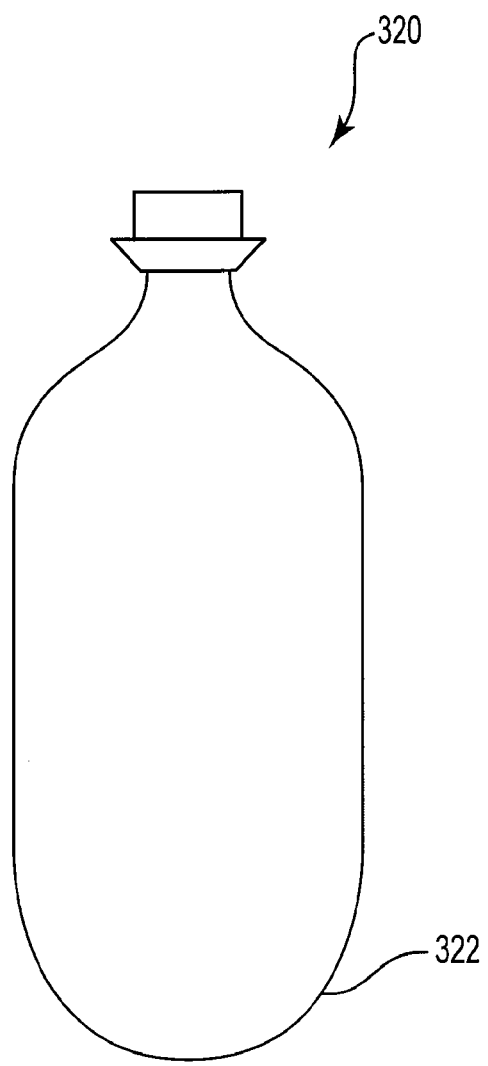
FIG. 3 is a side, cross-sectional view of a substantially rigid collapsible liner in accordance with another embodiment of the present disclosure.

Liners of the present disclosure may take a number of advantageous shapes. As can be seen in FIG. 3, in one embodiment, a rigid collapsible liner 320 may be configured such that the bottom of the liner is rounded or bowl-shaped 322. In such embodiments, the degree of rounding may vary. The rounding of the bottom surface may be such that the liner 320 may still be free-standing in some embodiments. In still other embodiments, the rounding may be to such a degree that the liner may optimally be used in conjunction with an outer container an overpack, or a sleeve. Embodiments of liners with rounded bottoms may help improve chemical utilization in, for instance, a pump dispense application as the rounding of the bottom surface may help properly direct a dip tube to the bottom of the liner, for example. Such an embodiment may be particularly useful with liners that are opaque, for instance, which may also help improve chemical utilization and dip tube alignment.

Figure 4:
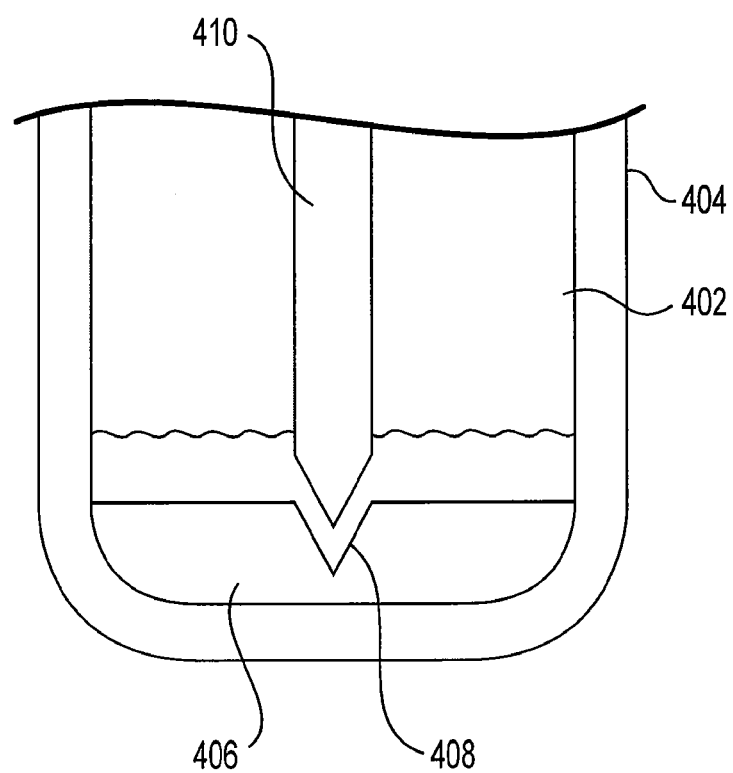
FIG. 4 is a cut-away view showing a liner with a sump, in accordance with one embodiment of the present disclosure.

As shown in FIG. 4, in another embodiment of a liner, a rigid collapsible liner 402 may include a sump 406 that may help improve dispensability. In some embodiments, the liner 402 may be placed in an overpack 404. The sump 406 may be an area of generally rigid material at the bottom of the liner defining a divot or cup 408 forming the sump 406. As seen in FIG. 4, the divot area 408 may funnel the liquid in the liner 402 to the divot area 408. A dip tube 410 that may be inserted into the liner 402 may then be used to dispense substantially all of the liquid in the liner, thus allowing a greater amount of the liquid to be dispensed than in prior art liners without a directing sump 406. The sump may be made of the same material as the liner in some embodiments, or the sump may be made of another suitable material such as another type of plastic, for example. The use of a liner with a sump may be particularly advantageous in use with liners that may not collapse, or may not fully collapse.

Figure 5:
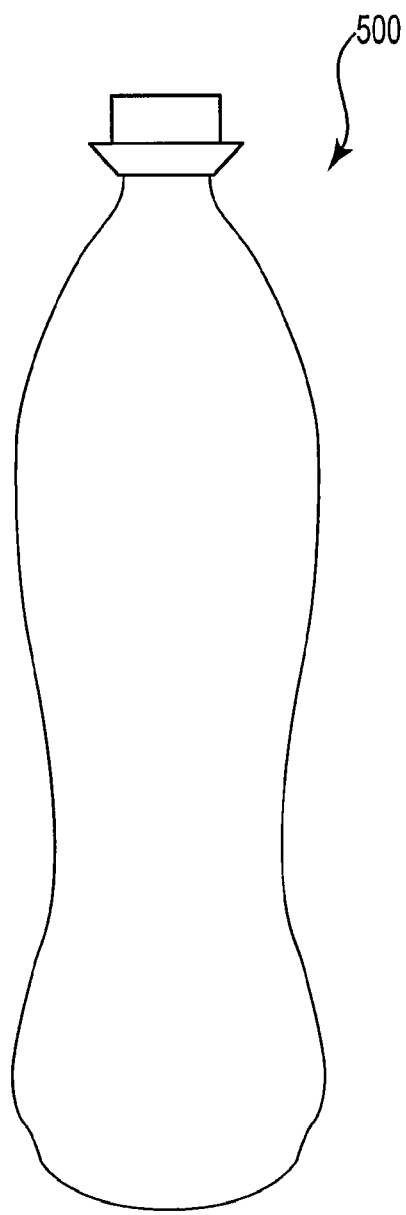
FIG. 5 is a side, cross-sectional view of a substantially rigid collapsible liner in accordance with another embodiment of the present disclosure.

Because liner 100, as shown in FIG. 1, may have a relatively simplistic design, the liner wall may comprise few or substantially no folds in substantially rigid liner wall 102 in some embodiments. In one embodiment, shown in FIG. 5, for instance, the liner 500 may be shaped similar to a conventional water or soda bottle. Therefore, an additional advantage of the various embodiments of the present disclosure includes a fixed fill volume. That is, liner 100 can be designed for a specific volume, and because there can be few or substantially no folds in substantially rigid liner wall 102, when liner 100 is filled with the specific volume, substantially no overflow should occur. As stated previously, liquids stored in such liners 100 can typically be very expensive, for example about \$2,500/L or more. Thus, even a small reduction of the amount of overflow can be desirable. Additionally, trapped gas volume within the liner may be minimized if the liner is substantially rigid and generally no undercuts or folds exist to provide a trap location for gases within the liner prior to filling.

Further, the liner may be shaped to assist in dispensability of the liquid from within the interior cavity. In one embodiment, illustrated in FIG. 6, liner 600 may include folds or indentations 610 that can limit rigid areas of the liner 600, for example areas near the transition from liner wall 602 to mouth 606. Folds 610 may be molded into the liner or added subsequent the molding process. Folds 610 may be designed to control the collapsing or folding pattern of liner 600. In one embodiment, liner 600 may include two or four folds near mouth 606. However, it is recognized that folds 610 may be positioned at any suitable location of liner wall 602, and may be suitably configured to control the collapsing or folding pattern of liner 600 and reduce or minimize the number of particles that may be shed from the liner 600 during collapse. The folds 610 may be configured such that they reduce or minimize the resulting number of fold lines and/or gas trap locations within the liner upon complete or near complete collapse of the liner 600.

In another embodiment, illustrated in FIGS. 7A-7D, a substantially rigid collapsible liner 700 may generally include a plurality of pleats 704 that extend a vertical distance of the liner 700, and in some cases extend substantially the entire vertical distance of the liner 700, from the neck 702 to the bottom of the liner 700. More particularly, as may be seen in FIGS. 7A and 7C, in a deflated or collapsed state 706, the pleated liner 700 may comprise a plurality of generally parallel or patterned pleats 704 positioned about the circumference of the liner 700. As shown in FIGS. 7B and 7D, in an inflated or expanded state 708, the pleats 704 of the liner 700 may be generally opened such that the liner expands to a circumference, or diameter, that is greater than the circumference, or diameter, of the liner when in the deflated state 706. In some embodiments, the liner 700 may be generally compact in the deflated state 706, and the generally compact size of the liner when in the deflated state may make it relatively easier to position the liner inside of a rigid outer container. The vertical pleats 704 may allow for the ready expansion of the liner during filling and ready deflation during dispense. In some embodiments, as shown in FIG. 7E, the neck 702 may be thinner than the necks of prior art liners. Because the material comprising the neck may be generally thin, the neck area may be more flexible than would otherwise be the case, which may allow for relatively easier insertion into a rigid outer container, more complete filling, and/or more complete discharge of the liner. Due to the way the liner collapses as a result of the pleats and/or due to the relatively thin material that comprises the neck of the liner, this embodiment may also prevent choke-off.

Figure 8A:
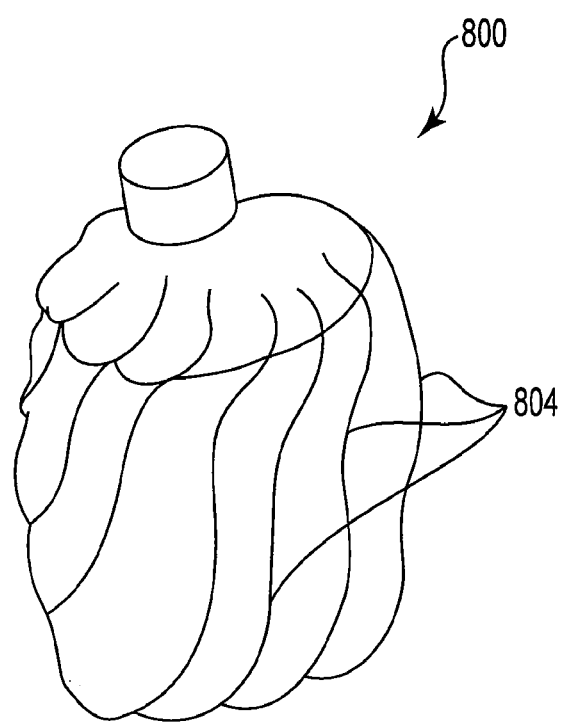
FIG. 8A is a perspective view of a liner in an expanded state, according to another embodiment of the present disclosure.
Figure 8B:
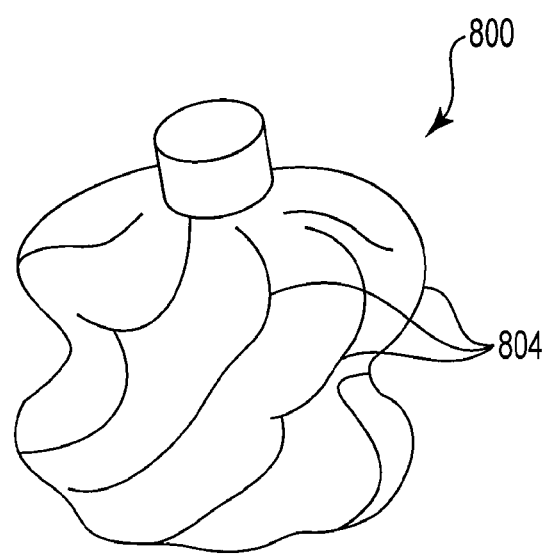
FIG. 8B is a perspective view of the liner of FIG. 11A shown in a collapsing state.

In a further embodiment, illustrated in FIGS. 8A and 8B, a substantially rigid collapsible liner 800 may comprise a plurality of non-vertical or spiral pleats 804 that may extend a vertical distance of the liner 800, and in some cases extend substantially the entire vertical distance of the liner, from the neck to the bottom of the liner. More particularly, as may be seen in FIG. 8A, which shows the liner in an expanded state, each of the plurality of pleats 804 are generally not a substantially straight line from the top of the liner 800 to the bottom of the liner, but instead each pleat may generally slant, wind, curve, etc., in the lateral direction of the liner as the pleat extends from the top of the liner to the bottom of the liner. Each of the plurality of pleats 804 may have a substantially uniform degree of slant, wind, curve, etc. about the vertical distance of the liner 800. However, in other embodiments, each of the plurality of pleats 804 may slant, wind, curve, etc. about the liner at any suitable degree, uniformly or non-uniformly with the other pleats. As may be appreciated, when the liner 800 begins to collapse upon discharge or dispense of its contents, as shown in FIG. 8B, the plurality of spiral pleats 804 will generally cause the liner bottom to twist relative to the top of the liner. This twisting motion may allow for more efficient collapse and/or more complete discharge of the contents of the liner as the twisting of the liner squeezes the liner contents from the bottom of the liner to the top of the liner. As a result of the spiral pleats and the resulting twisting motion that occurs during collapse, this embodiment may also prevent choke-off.

Figure 9:
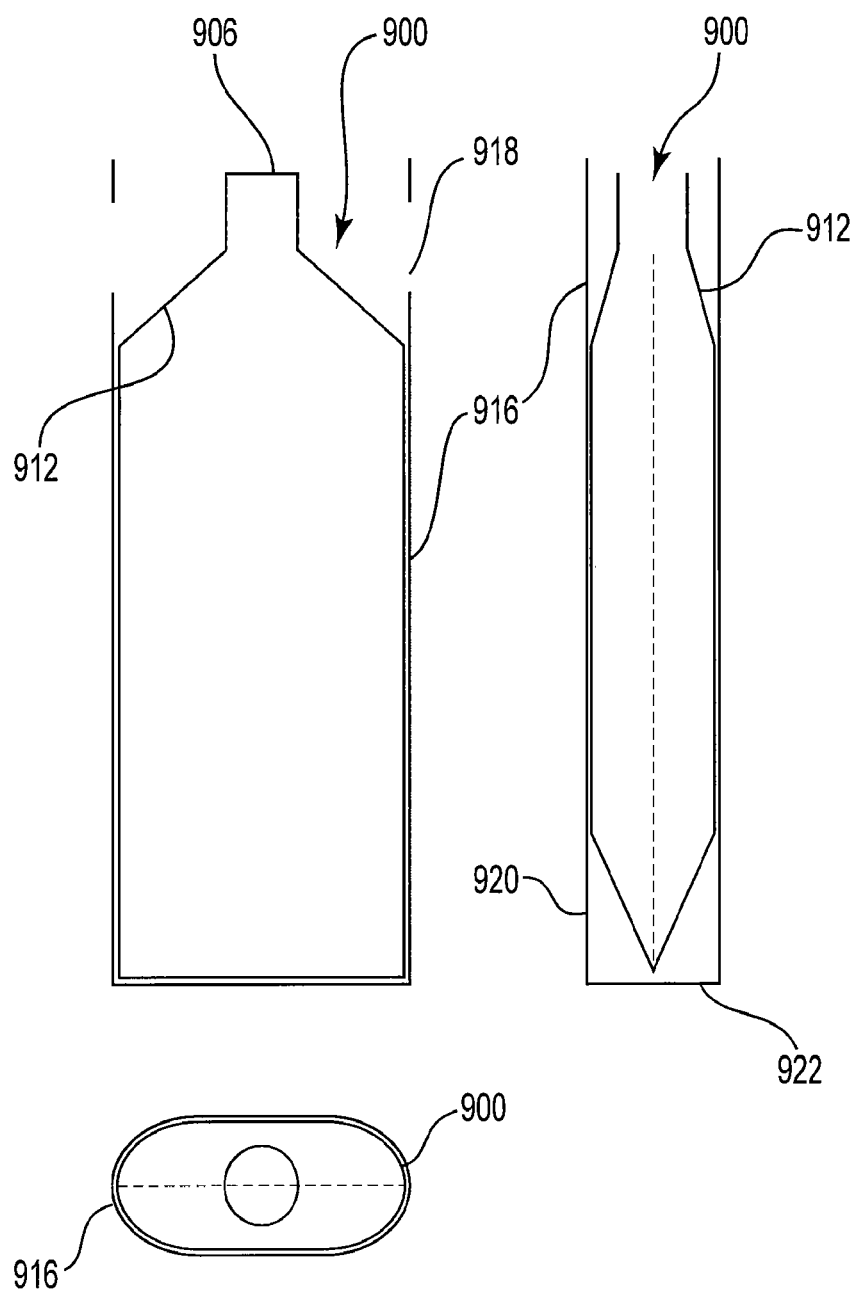
FIG. 9 is a front, cross-sectional view, side, cross-sectional view, and top view of a substantially rigid collapsible liner in accordance with yet another embodiment of the present disclosure.

In a further embodiment, illustrated in FIG. 9, a substantially rigid collapsible liner 900 may be shaped in a similar manner to a toothpaste tube and may be configured to generally collapse flat. Such a configuration can help reduce or minimize the quantity of liquid trapped in hard-to-collapse regions and can reduce the amount of pressure or vacuum required to fully collapse the liner. The shape of liner 900 may also reduce creasing of liner 900 during collapse, which could otherwise give rise to particle generation at the crease lines, thereby contaminating the liquid within the liner. Similarly, as with many embodiments of the substantially rigid collapsible liner of the present disclosure, the configuration of liner 900 can reduce or minimize the number of trapping points for bubbles. Such substantially rigid collapsible liners may also include a slanted portion, such as slanted portion 912 near mouth 906, illustrated for example in FIG. 9, which may assist in the smooth removal of headspace gas at the beginning of dispense. In another embodiment, a liner according to one embodiment of the present disclosure may have a substantially round bottom, as illustrated in FIG. 3, rather than a bottom that is squared-off.

A liner according to further embodiments of the present disclosure may not be free standing, and in yet further embodiments, a sleeve 916 may be provided for support for liner. Sleeve 916 may include side walls 920 and a bottom 922. Sleeve 916 may be substantially free of the liner 900. That is, liner 900 may be removable or removably attached to the interior of sleeve 916. Liner 900 need not be adhesively bonded, or otherwise bonded, to sleeve 916. However, in some embodiments, liner 900 can be adhesively bonded to sleeve 916 without departing from the spirit and scope of the present disclosure. In one embodiment, sleeve 916 may be generally considered a sacrificial overpack or outer container. Sleeve 916 can be any suitable height, and in some embodiments, the sleeve 916 could be substantially the same height as liner 900 or taller. In embodiments where sleeve 916 is of such height, a handle 918 may be provided to assist the transportation of sleeve 916 and liner 900. Sleeve 916 may be made using one or more polymers, including plastics, nylons, EVOH, polyolefins, or other natural or synthetic polymers, and may be disposable. In other embodiments, sleeve 916 may be reusable.

Figure 10A:
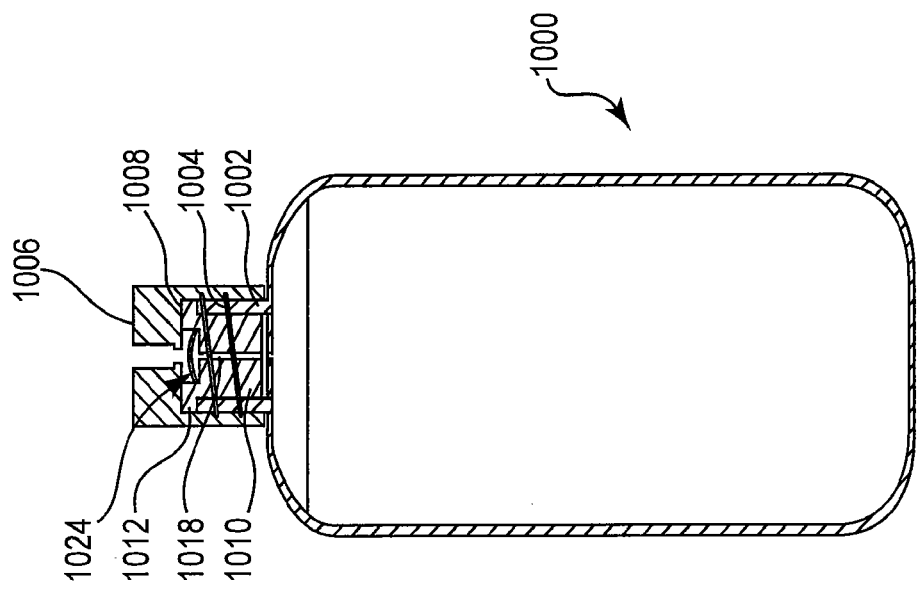
FIG. 10A is a cut-away view of a connector for a liner according to one embodiment of the present disclosure.

2 In some embodiments, connectors as shown in FIGS. 10A-14C may be used with a rigid or rigid collapsible liner to facilitate filling and dispense, as well as to secure the contents of the liner from air and other contaminants during storage. As can be seen in FIGS. 10A and 10B, the liner 1000 may include a neck 1002 that may be integral to the liner 1000 or that may be fixedly connected to the liner. The neck 1002 may have threads 1004 on the outside surface in order to couple with complimentary threads on the inside surface of a protective overcap 1006. It will be recognized, however, that any suitable method of removably attaching a cap to the neck of the liner and/or the connector may be used, such as friction-fit, snap-fit, etc. A connector 1008 may include a base section 1010 that may be configured to fit inside the neck 1002 of the liner 1000. The connector 1008 may also comprise a shoulder section or ledge 1012 such that when the base section 1010 of the connector 1008 is positioned in the neck 1002 of the liner, the shoulder section 1012 generally abuts the top edge of the neck 1002 of the liner, thereby creating a seal between the connector 1008 and the liner 1000. In some embodiments the protective cap 1006 may be integral with the connector 1008. However, in other embodiments, the protective cap 1006 and connector 1008 may be separate components, which may further be detachably secured to each other for storage and/or dispense procedures.

As shown in FIG. 10A, in one embodiment, a septum 1016 may be positioned in or adjacent the connector 1008 that may seal the bottle 1000 thereby securely containing any substance within the bottle 1000. The connector 1008 may also include a hollow tube or area 1018 extending from the septum 1016 through the entire vertical distance of the base 1010 to allow the contents of the liner 1000 to pass through the connector 1008 upon dispense. In order to dispense the contents of the liner, a needle or cannula 1020 may be introduced through an opening in the connector 1008 and/or protective cap 1006, such that the needle or cannula 1020 may make contact with and puncture the septum 1016 that seals the liner 1000.

Figure 10B:
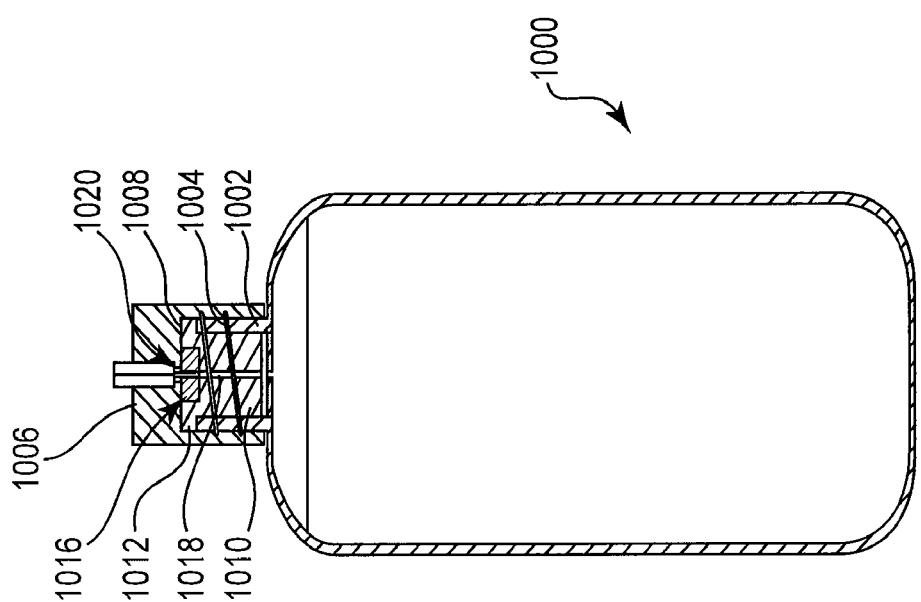
FIG. 10B is a cut-away view of a connector for a liner according to another embodiment of the present disclosure.

In another embodiment shown in FIG. 10B, a frangible disk 1024 may be positioned in or adjacent the base of the connector 1008 that may seal the bottle 1000 securely containing any substance within the liner. The connector 1008 may also include a hollow tube or area 1018 extending from the frangible disk 1024 through the entire vertical distance of the base 1010 to allow the contents of the liner to pass through the connector 1008 upon dispense. A cap 1006 may be secured to the connector, preferably the base of the connector 1008. The contents of the bottle 1000 may be pressure dispensed, such that when the bottle is pressurized sufficiently, the frangible disk 1024 will rupture and the contents of the liner 1000 may begin to be dispensed.

Figure 11:
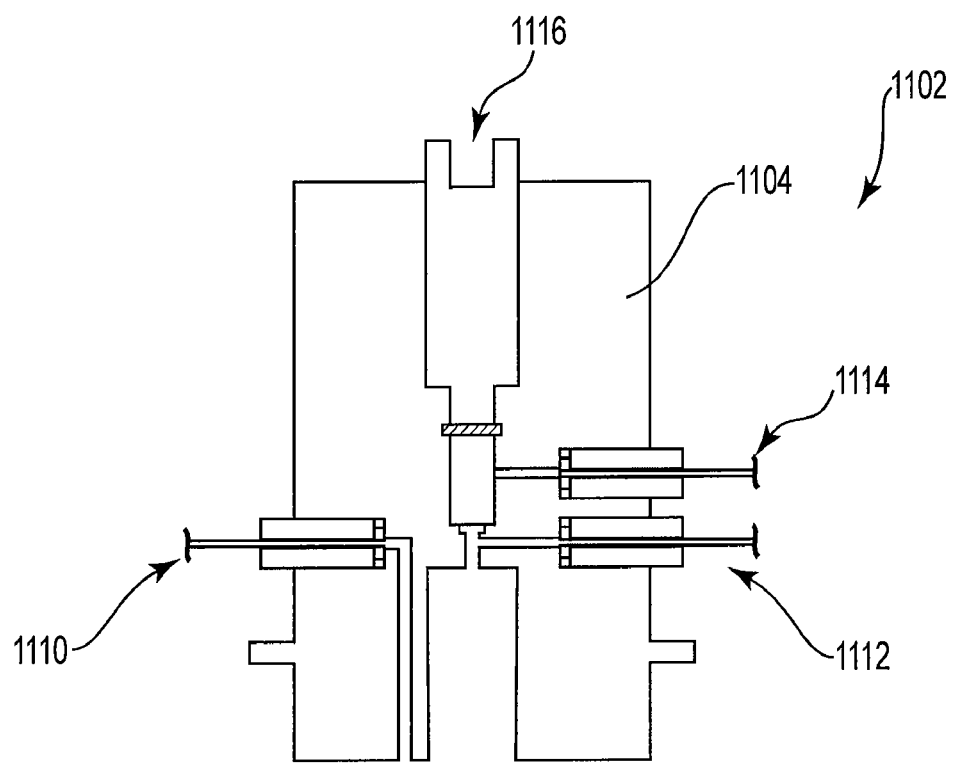
FIG. 11 is a cut-away view of a connector for a liner according to one embodiment of the present disclosure.

FIG. 11 shows another embodiment of a connector 1102, which may include ports 1110-1116 molded into the connector body 1104. The ports may include, for example: a liquid/gas inlet port 1110 to allow a liquid or gas to enter the liner; a vent outlet 1112; a liquid outlet 1114; and/or a dispense port 1116 to permit the contents of the liner to be removed.

FIGS. 12A-12C show another embodiment of how a connector may be sealed after filling the container with a substance. As shown in FIG. 12A, a tube 1204 may be vertically fitted into the body of a connector 1202. The tube 1204 may be comprised of any suitable material, such as a thermoplastic or glass. The liner may be filled with contents via the tube 1204. After the liner has been filled, the tube 1204 may be welded shut 1206, or otherwise sealed, as shown in FIG. 12B. A protective cap 1208 may then be detachably secured to the connector 1202 as shown in FIG. 12C. The connector assembly of this embodiment may provide a substantially leak-tight closing mechanism for a liner. Additionally, the seal of this embodiment may be used in conjunction with the sealing embodiments described above.

Figure 13:
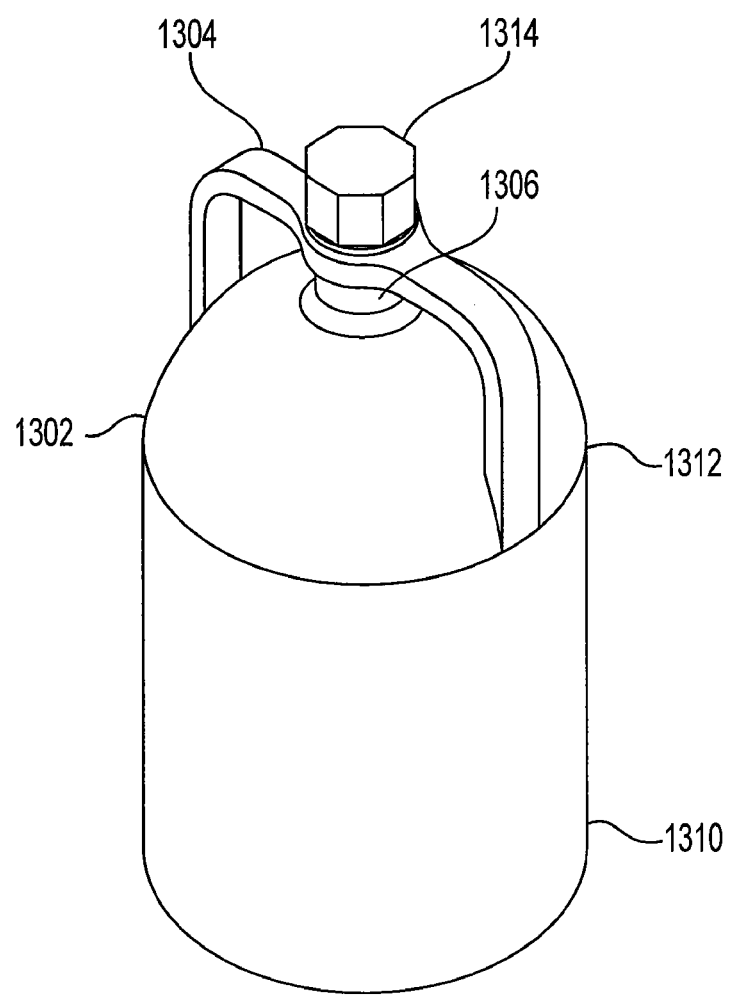
FIG. 13 is a perspective view of a liner with a handle, according to some embodiments of the present disclosure.

In one embodiment, a handle may be included with a rigid collapsible liner and overpack system. As shown in FIG. 13 a rigid collapsible liner 1302 may have a handle 1304 secured to the neck 1306 of the liner 1302. The liner 1302 may be inserted into an overpack 1310 that has an edge or chime 1312 that encircles the overpack 1310 at substantially the same height as the two free ends of the handle 1304 that is connected to the liner 1302 at the liner neck 1306. The ends of the handle may attach to the chime 1312 of the overpack 1310 via tongue and groove, snap-fit, or any other means of detachably securing the ends of the handle to the chime. In such an embodiment, any downward forces that are applied to the top of the liner 1302 including the liner opening 1314 may generally be transferred to the handle and then to the chime 1312 and overpack 1310, thus reducing stress on the liner 1302. In another embodiment, the two ends of the handle 1304 may also be attached to the liner 1302.

Figure 14B:
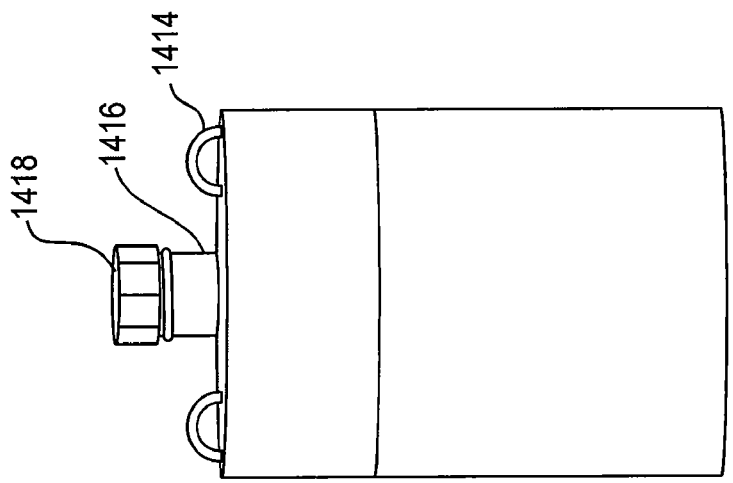
FIG. 14B is a perspective view of a liner with the overpack of 14A connected, according to some embodiments of the present disclosure.
Figure 14A:
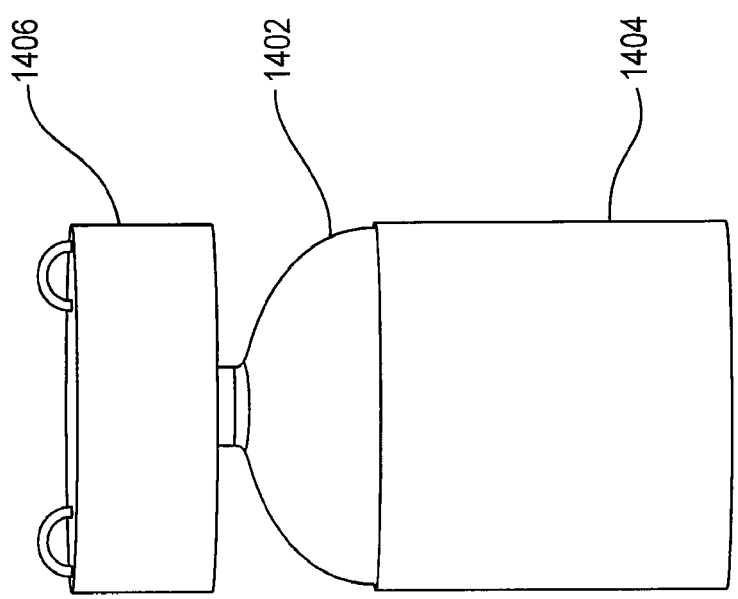
FIG. 14A is a perspective view of a liner with an overpack in two parts, in accordance with some embodiments of the present disclosure.

As shown in FIGS. 14A and 14B, in another embodiment, a rigid collapsible liner 1402 may be used with an overpack that is formed from two parts comprising a lower overpack 1404 and a top overpack 1406. As can be seen in FIG. 14A, the liner 1402 may be inserted into the lower overpack 1404 first. The top overpack 1406 may then be placed over the top of the liner 1402 and pushed down such that the top overpack 1406 is connected to the lower overpack 1404 as can be seen in FIG. 14B. The top overpack 1406 may attach to the lower overpack 1404 by any suitable means, such as but not limited to, snap fit or screw fit. In some embodiments, the top overpack 1406 may be sealed to the lower overpack 1404 such that pressurization may be used to collapse the liner 1402 upon dispense. The seal may be achieved by any known means. The top overpack 1406 may attach to the liner 1402 at the neck of the liner 1416. The top overpack 1406 may include one or more handles 1414 to make it easier to transport or move the system. In this embodiment, downward forces that may be applied to the top of the liner 1402 including the closure 1418 of the liner may be generally transferred to the top overpack 1406 and then to the bottom overpack 1404, thereby minimizing or reducing stress on the liner itself.

Figure 15:
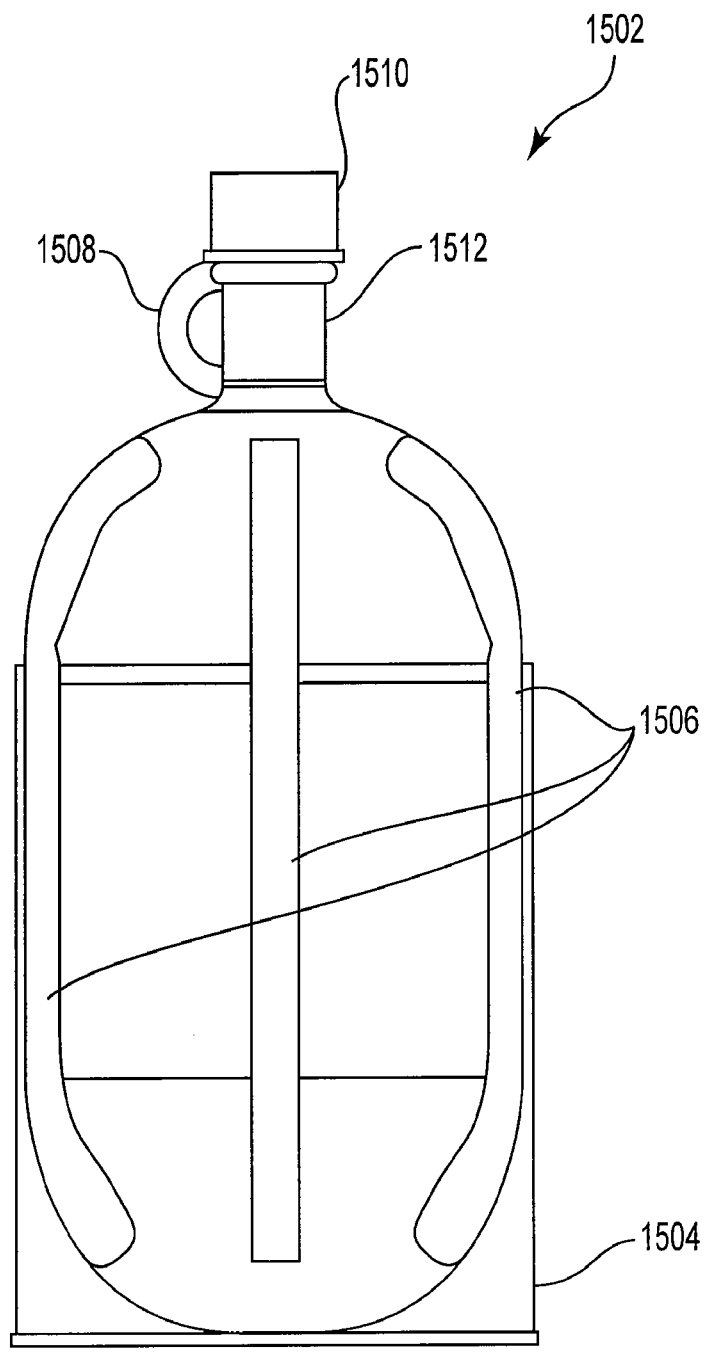
FIG. 15 is a cut-away view of a liner, according to one embodiment of the present disclosure.

In another embodiment, a rigid collapsible liner 1502 may be positioned in an overpack 1504 as shown in FIG. 15. The liner neck 1512 of the liner 1502, in some embodiments, may include one or more handles 1508 to make moving the liner easier. The handle 1508 may be integrally comprised with the neck 1512 of the liner, or it may be fixedly secured to the liner by any known means, for instance the handle may be blow molded with the liner. The walls of the liner 1502 may have some sections 1506 that are thicker than others. These thicker walls sections 1506 may provide increased vertical thickness and yet not interfere with the ability of the liner 1502 to collapse upon dispense. The thickness of these thicker sections 1506 may be, for example, from about two to about ten times thicker than other liner wall sections, in some embodiments. Though, it will be recognized that the thicker wall sections may have any degree of additional thickness, in other embodiments. There may be one or more sections of the liner wall with increased thickness, for example, in some embodiments there may be one, two, three, or four or more such sections. In such an embodiment, any downward forces on the top of the liner 1502, including the closure 1510 of the liner 1502 may generally be transferred to the thicker wall sections 1506 of the liner 1502 and then to the overpack 1504 and thereby reducing stress on the liner 1502.

In some embodiments of the present disclosure, a substantially rigid collapsible liner may obtain above 90% dispensability, desirably above 97% dispensability, and more desirably up to 99.9% dispensability depending on the thickness of the liner wall, the material used for the liner, and the design of folds.

Figure 16:
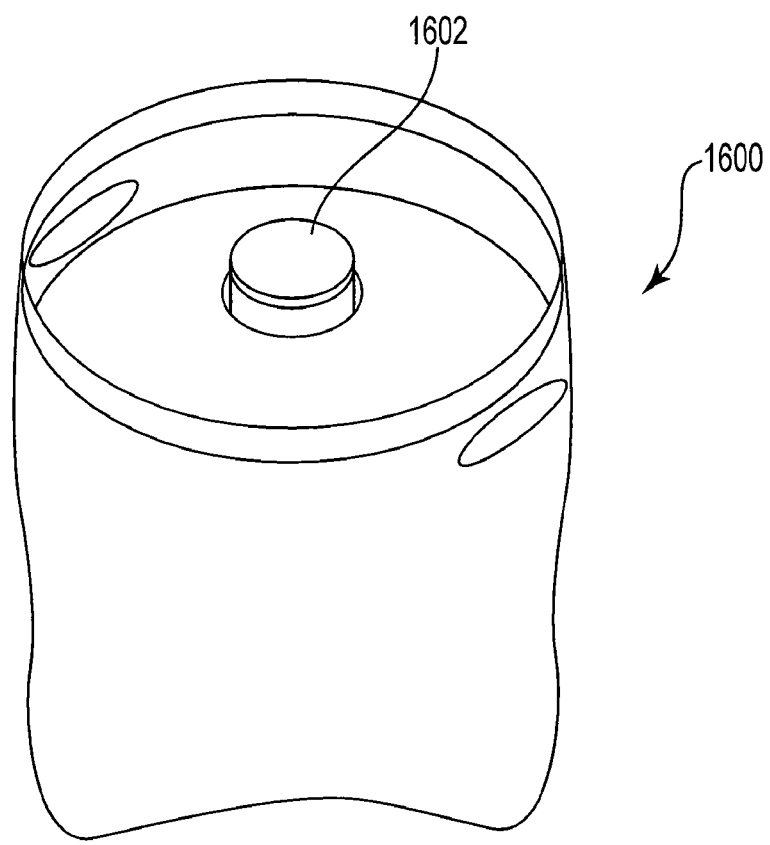
FIG. 16 is a perspective view of an overpack that may be used with certain embodiments of the present disclosure.

In some embodiments, a rigid collapsible liner may be configured to include folding patterns that may include one or more "hard folds" and/or one or more "pre-folds" or "secondary folds" in the rigid collapsible liner. Such liners may be formed, in some embodiments, so as to allow them to substantially uniformly collapse into a relatively small circumferential area that may permit the liners to be inserted into, or removed from, for example, an overpack that may have an opening with a relatively small diameter as compared to the diameter of the overpack itself. As can be seen in FIG. 16, an overpack 1600, which may generally resemble known overpacks already being used in the industry, may have a small opening 1602 relative to the greater diameter of the overpack 1600. Using a rigid collapsible liner of the present embodiments may be advantageous over using traditional flexible liners for several reasons. For instance, traditional flexible liners may be prone to pin holes or weld tears forming as the liner moves about during shipping. As the truck, train, or other transportation means moves, the traditional flexible liner within the overpack may also move. The more the liner is subjected to movement, the greater the risk that tiny holes will be created in the liner. The use of a rigid collapsible liner that is made of sturdier material than traditional flexible liners may greatly reduce the risk that weld tears or pin holes may develop during shipping. Traditional flexible liners may also have the disadvantage of forming creases when filled that may limit the amount of material that can be held in the liner or increase the volume of trapped gas within the liner and may also make complete dispense difficult or impossible. Such creases in a traditional flexible liner may also contribute to the likelihood that weld tears and/or pin holes may develop as the stress that is placed on the creases during shipping may be increased relative to non-creased areas, which may result in tiny tears in the liner at the crease points. Rigid collapsible liners of some embodiments of the present disclosure may not develop such creases, but instead may expand to a predetermined volume along the fold lines of the liner, thus allowing for a greater, more consistent interior volume to store a material. The lack of creases may also eliminate high-stress areas in the liner. Yet another advantage of various embodiments of the present disclosure over traditional flexible liners when used with an overpack 1600 may be that the rigid collapsible liner may be easier to remove from the overpack 1600 than traditional flexible liners. When a traditional flexible liner is removed from the overpack 1600 through the overpack opening 1602, a significant amount of the undispensed contents may accumulate at the bottom of the liner as the top of the liner is pulled through the opening 1602 making it difficult to get the bottom of the liner, which may also contain a significant portion of the liner material, out of the relatively small opening 1602 of the overpack 1600. The present embodiments, however, may collapse into a predefined shape determined by the liner fold lines (described in greater detail below) which along with the increased dispensability may substantially reduce or eliminate the accumulation of excess material at the bottom of the liner as the liner is pulled through the opening 1602. Accordingly, it may be substantially easier to remove an empty liner from the overpack 1600.

Figure 17A:
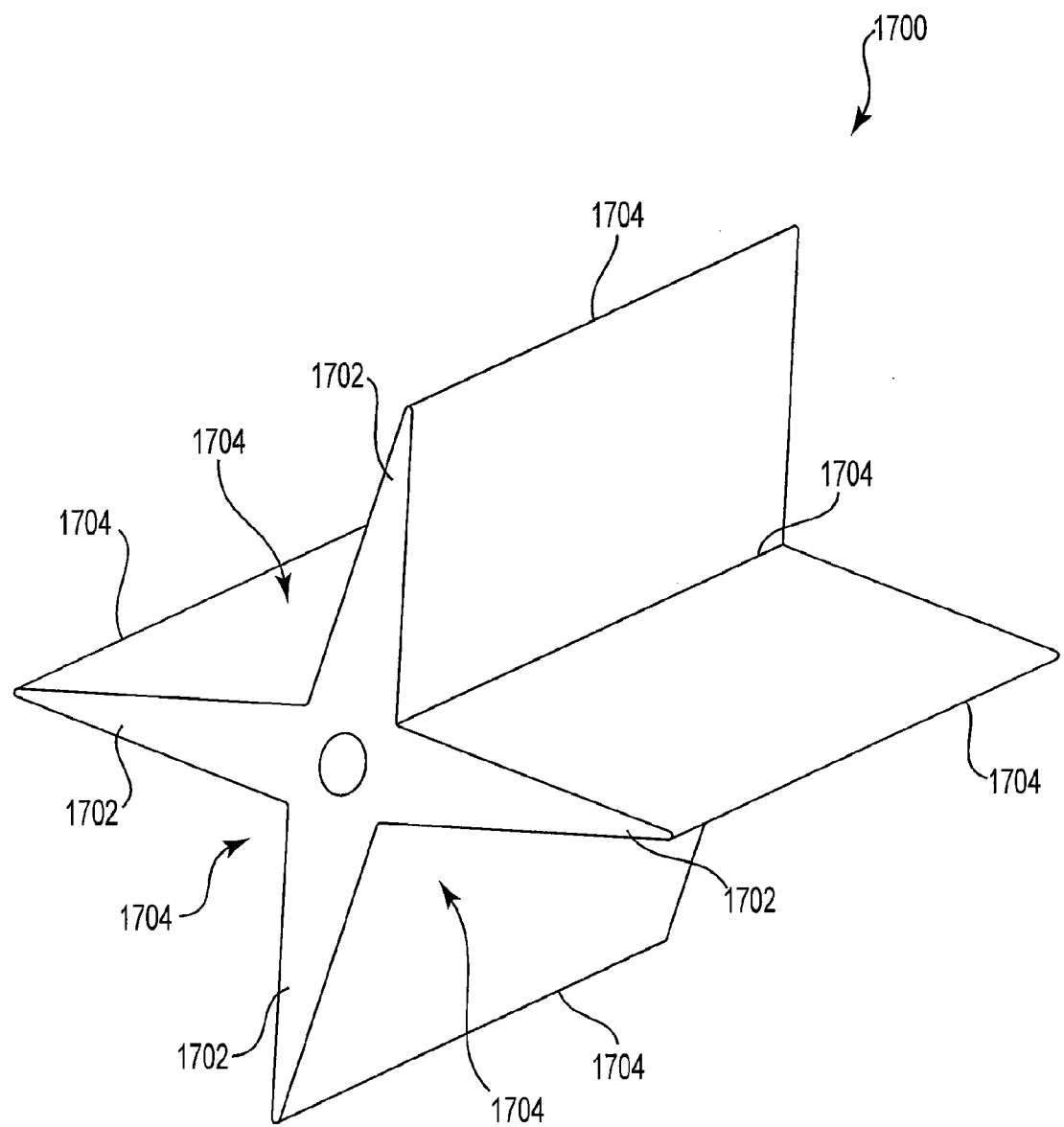
FIG. 17A is an end view of a liner in a collapsed state, according to some embodiments of the present disclosure.
Figure 17B:
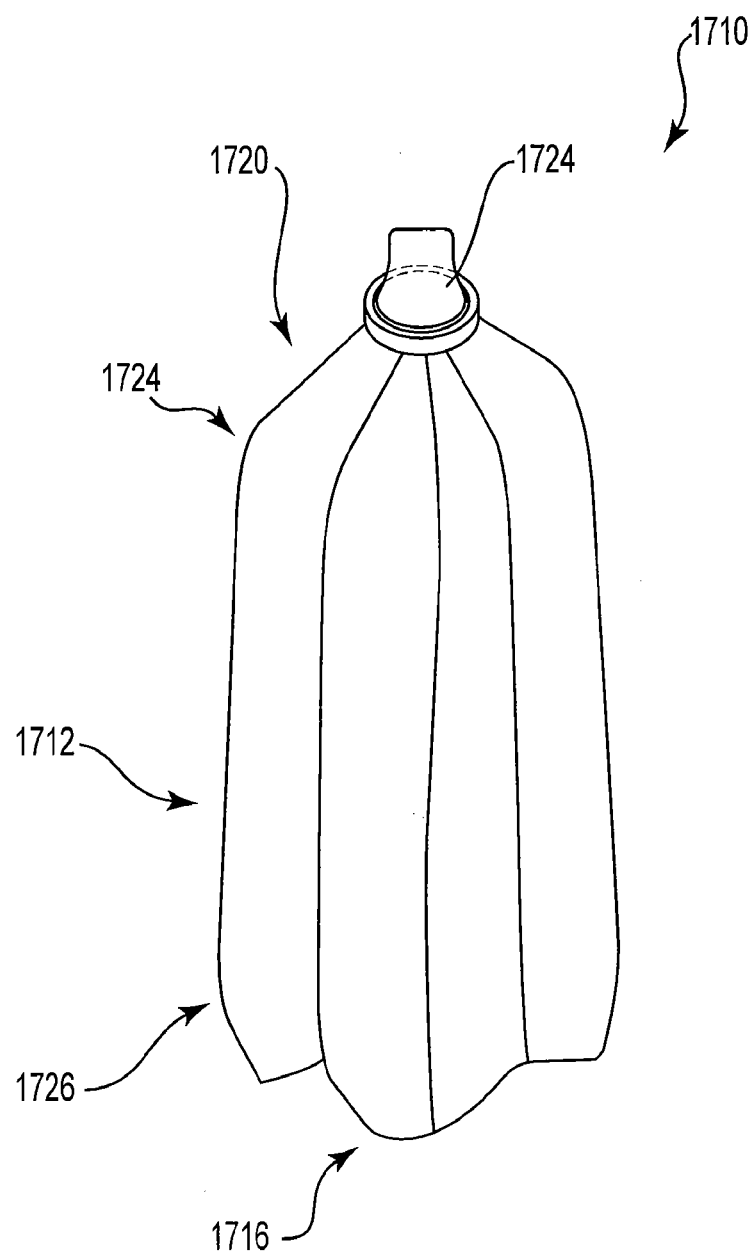
FIG. 17B is a perspective view of an inflated liner, according to one embodiment of the present disclosure.

FIG. 17A shows an end view of one embodiment of a liner 1700 with predetermined folds, when the liner 1700 is in a collapsed state. In this embodiment, the liner 1700 has a 4-arm design, which means that in the collapsed state when viewed from the end, the liner 1700 has 4 arms 1702. Each arm 1702 may have generally the same proportions and dimensions in some embodiments. In other embodiments, the arms could have different or varying dimensions. The liner of the present embodiment may be used without a dip tube. In other embodiments, the liner may include a dip tube. As can be seen in FIG. 17B, the liner 1710 may have a body 1712, a fitment end 1720 that includes the fitment 1724, a resting end 1716 that contacts the bottom of the overpack container when the liner is inserted in the overpack, a transition area 1724 that connects the body nearest the fitment end to the fitment end 1720, and a transition area 1726 that connects the body near the resting end to the resting end 1716. As may be seen, all folds may be substantially vertically oriented when the liner 1710 itself is vertically oriented. The vertical fold lines may more easily allow for any bubbles that may exist in the contents of the liner to escape or be removed, as bubbles may tend to travel vertically along the fold lines up to the top of the liner 1710.

The body of a liner with a 4-arm design may generally be created with eight folds. As can best be seen with reference back to FIG. 17A, eight vertical folds 1704 may run from one end of the liner to the other end of the liner to generally form a four-armed star-like-shape when viewed from the end of the liner when the liner is in a collapsed state. While this embodiment is described and shown with reference to a 4-arm design, it should be understood that the present disclosure also includes embodiments of liners with a 3-arm, 5-arm, 6-arm, and any other number of arm designs.

With reference back to FIG. 17B, the fitment 1724 located on the fitment end 1720 may be integral with the liner 1710. In some embodiments, the fitment 1724 may be comprised of a thicker and in some embodiments a stronger material than the material comprising the rest of the liner. The fitment may be configured to couple with the opening 1602 in the overpack 1600 such that a connector and/or cap may be attached to the liner/overpack for closure and/or dispensing as described in detail in other portions of this disclosure.

The resting end 1716 of the liner 1710 may generally expand when the liner is filled in order to hold as much contents as possible and avoid wasting space. Similarly, the resting end 1716 of the liner 1710 may generally collapse substantially precisely along its fold lines upon collapse of the liner to ensure easy removal of the liner from the overpack and also to ensure that nearly all of the material may be dispensed from the liner 1710.

Figure 18:
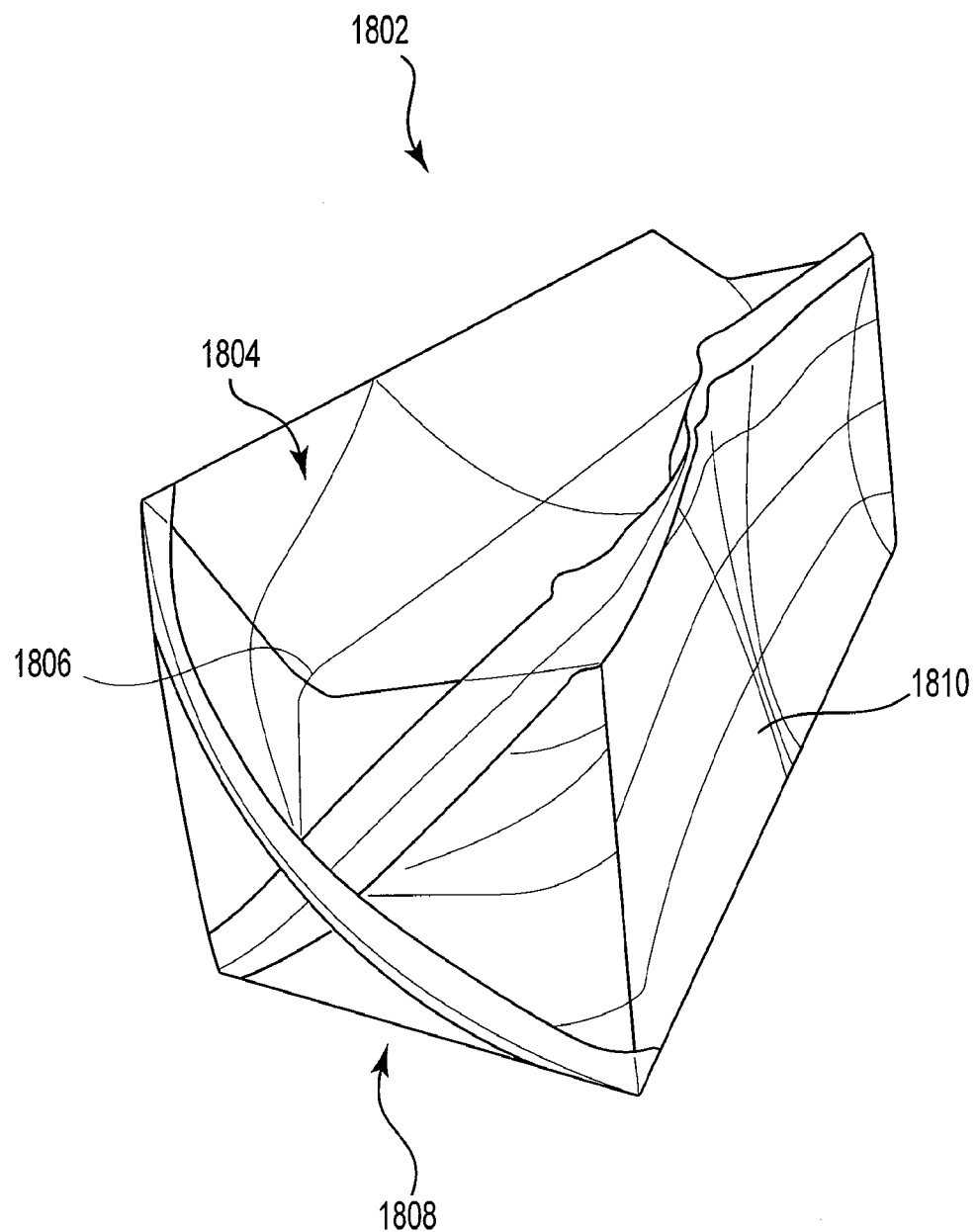
FIG. 18 is a view of an inflated liner with an inversion point.

As may be seen in FIG. 18, in some embodiments of a liner 1802 with folds, one or more inversion points 1806 may be created around the transition area 1804 between the body 1810 of the liner and the resting end 1808 of the liner. Inversion points 1806 may be undesirable because these may be areas that buckle outward in a manner that makes dispense and/or collapse of the liner difficult, or that buckle inward in a manner that makes it difficult to substantially fully expand the liner in order to fill the liner completely with material.

Figure 19A:
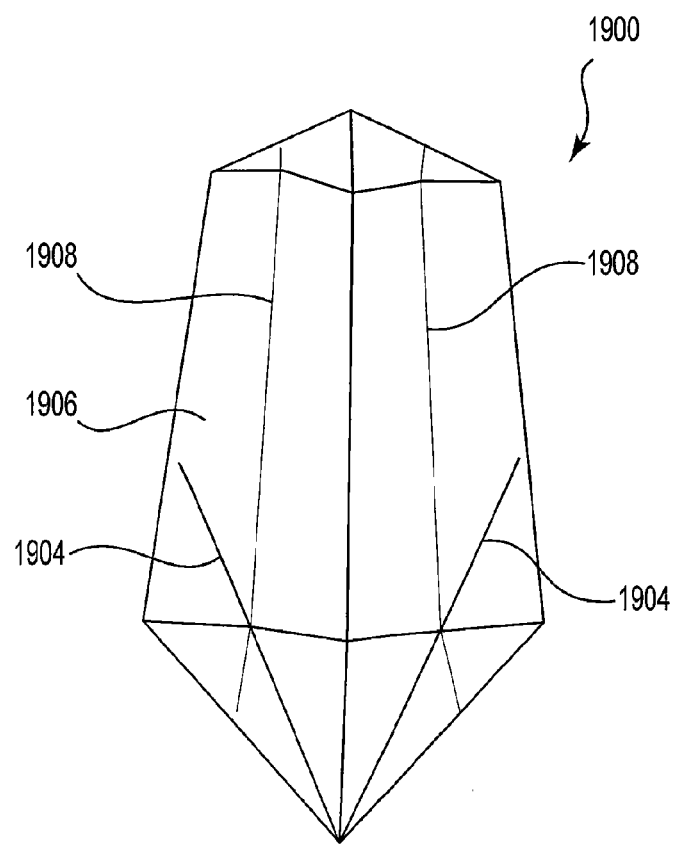
FIG. 19A is a perspective view of a collapsed liner showing secondary fold lines, in accordance with some embodiments of the present disclosure.
Figure 19B:
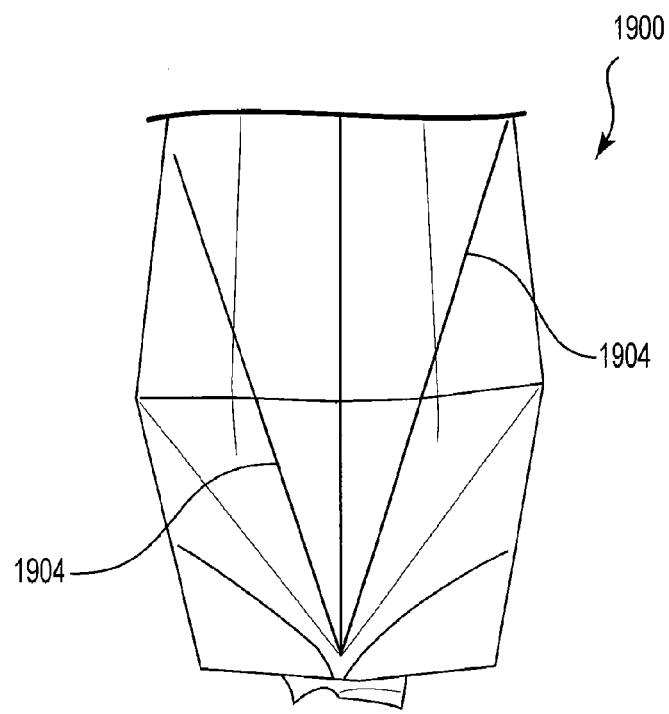
FIG. 19B is a perspective view of an expanded liner of FIG. 19A, in accordance with some embodiments of the present disclosure.

In some embodiments, inversion points may be limited or generally eliminated by including secondary folds at appropriate places in the liner. For example, as shown in FIGS. 19A and 19B, a secondary fold or pre-fold 1904 may be included in the liner that may extend as shown from the body of the liner 1906 through the transition area of the liner and to the apex 1908 of the resting end of the liner 1900. These secondary folds or pre-folds 1904 may help to avoid the inversion points such as that shown in FIG. 18. As can best be seen in FIG. 19B, the tendency of the liner to expand and collapse in a manner that is guided by the secondary folds 1904 or pre-folds may keep inversion points from forming.

Figure 20:
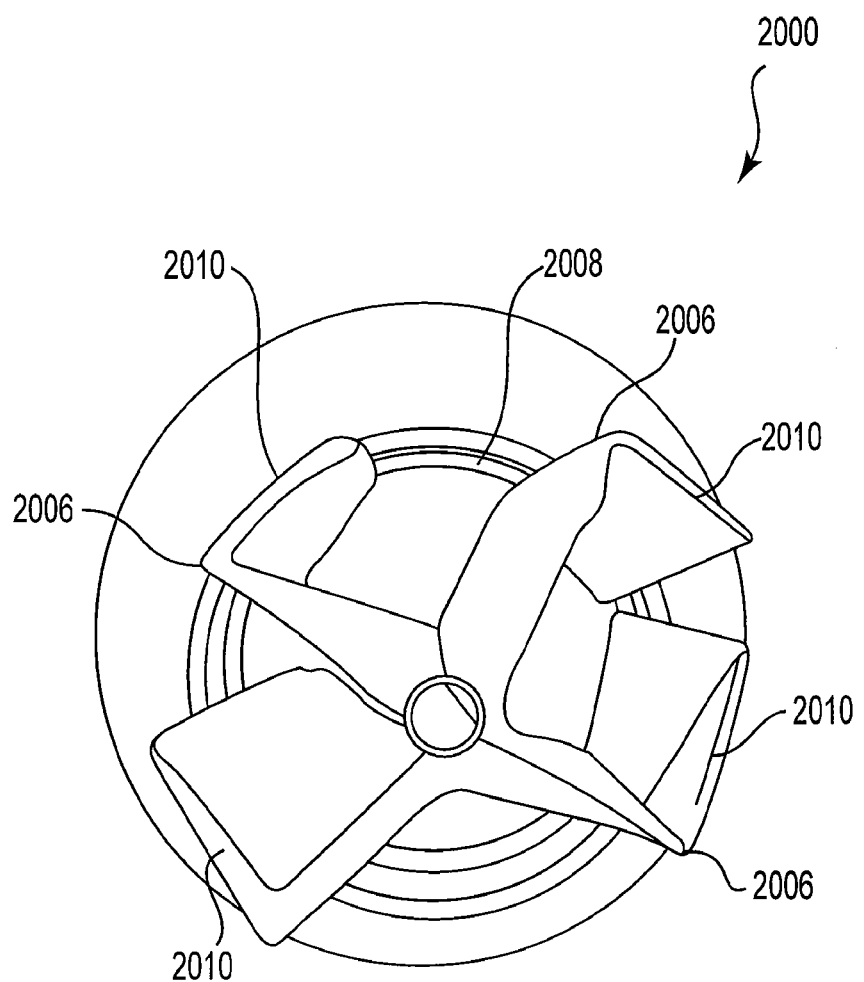
FIG. 20 is a perspective view of a liner half-way inside of an overpack, in accordance with some embodiments of the present disclosure.

Similarly, additional vertical secondary fold lines may be included in the liner that may further reduce the circumferential area of the liner when it is collapsed and inserted into and pulled out of the opening in the overpack. This may be seen in FIG. 20, which shows a liner 2000 being inserted into or being pulled out of an opening 2008. In the embodiment shown, the secondary folds 2006 are positioned about half way on the arms 2010, which allows the arms 2010 of the liner 2000 to take up less circumferential area than they would without the secondary folds 2006. It will be recognized, however, that the secondary folds 2006 may be positioned at any suitable position on the arms 2010.

In some embodiments, as shown in FIG. 21A, the corners 2104 of the liner 2102 that are created by folds formed in the resting end 2106 of the liner 2102 may not be able to expand fully, thus limiting the amount of material that may be contained in the liner 2102. As discussed above, it may be preferable to have the resting end expand as much as possible so the liner may hold as much liquid as it can. As can be seen in FIG. 21B, the resting end 2124 of the liner 2122 of this embodiment may expand more fully. This may be achieved in one embodiment, for example, when the transition angle 2128 is between 35° and 55°, for example, preferably about 45°. The transition angle 2128 may be the angle formed between the substantially vertical lines and folds of the body 2130 of the liner 2122 and the apex 2136 of the resting end 2124. A transition angle of preferably about 45° in one embodiment may be a somewhat "magic" angle in that at that angle the resting end 2124 may expand more fully as shown in FIG. 21B. It will be recognized, however, that transition angles of greater or less than preferably about 45° are within the spirit and scope of the present disclosure.

Figure 22B:
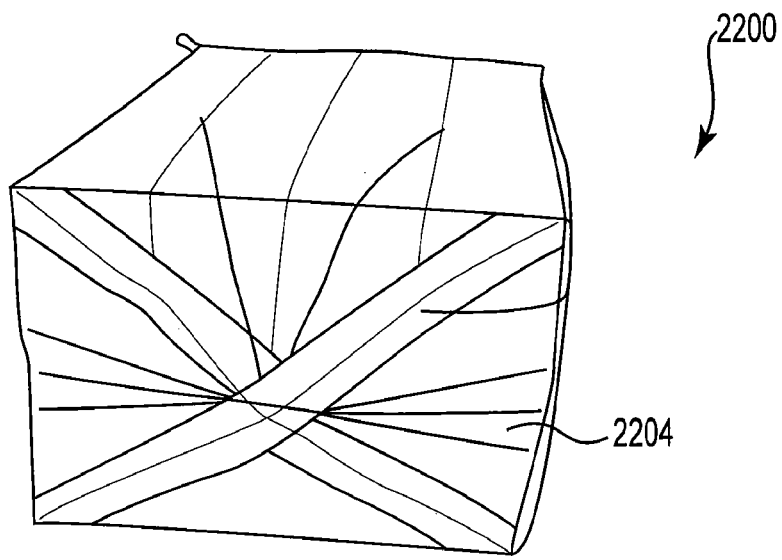
FIG. 22B is a perspective view of the bottom of a liner in a collapsed state, in accordance with some embodiments of the present disclosure.
Figure 22A:
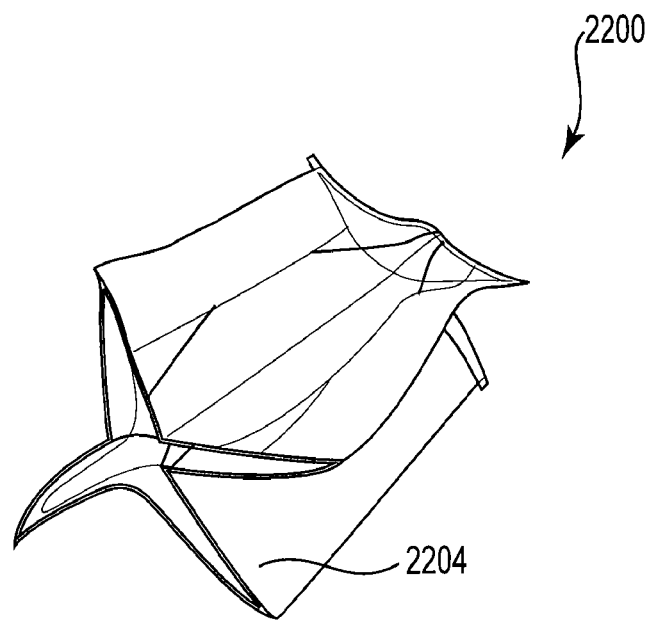
FIG. 22A is a perspective view of the bottom of a liner in an expanded view, in accordance with some embodiments of the present disclosure.

In some embodiments, the resting end 2204 of the liner 2200 in a collapsed state may collapse inside of the body of the liner 2200, as shown in FIG. 22A. The resting end 2204 may tend to do this when the height between the end of the body of the liner and the apex of the resting end of the liner is relatively short. Such a liner may advantageously reduce the height of the liner 2200 when the liner is being filled. As may be seen in FIG. 22B, a liner 2200 in accordance with this embodiment may have a resting end 2204 that generally expands fully in an expanded state.

In use with an overpack, the liner may be inserted into an overpack through the overpack opening when the liner is in a collapsed state. Once the liner is inside of the overpack the liner may be filled with a desired substance through the liner fitment that may remain outside of the overpack and may couple with the overpack opening. When the liner is expanded upon filling, it may generally approximate a cylinder that may substantially conform to the interior shape of the overpack. After the contents of the liner have been removed, the liner may be relatively easily removed through the opening in the overpack by pulling the liner out through by the fitment of the liner. The pressure applied to the liner as it is pulled through the opening of the overpack may generally make the liner revert to its collapsed state along the liner fold lines. Stiff liners such as the liners of these embodiments may remember their folding patterns and tend to collapse along their fold lines as they are collapsed, similar to a bellows.

The embodiments of a liner including folds may be made by blow molding, welding or any other suitable method. The folds in the liner may act like hinges that allow the liner to deflate at very low pressures, for example at pressures down to approximately 3 psi in some cases. In some embodiments, these liners may achieve up to about 99.95% dispensability.

The liner of the present disclosure may be manufactured as a unitary component, thereby eliminating welds and seams in the liner and issues associated with welds and seams. For example, welds and seams may complicate the manufacturing process and weaken the liner. In addition, certain materials, which are otherwise preferable for use in certain liners, are not amenable to welding.

The liner can be manufactured using any suitable manufacturing process, such as extrusion blow molding, injection blow molding, injection stretch blow molding, etc. A manufacturing process utilizing injection blow molding or injection stretch blow molding can allow for liners to have more accurate shapes than other manufacturing processes. One example embodiment for manufacturing the liner using injection stretch blow molding is illustrated in FIGS. 23A-23E. It is recognized that not all steps of the exemplary embodiment for manufacturing the liner are required, and some steps may be eliminated or additional steps may be added without departing from the spirit and scope of the present disclosure. The method may include forming a liner preform by injecting a molten form 2350 of a polymer into an injection cavity 2352 of a preform mold die 2354, as illustrated in FIG. 23A. The mold temperature and the length of time in the mold may depend on the material or materials selected for manufacturing the liner preform. In some embodiments, multiple injection techniques may be used to form a preform having multiple layers. The injection cavity 2352 may have a shape that corresponds to a liner preform 2356 (FIG. 23B) with integral fitment port 2358. The polymer may solidify, and the resultant liner preform 2356 may be removed from the preform mold die 2354. In alternative embodiments, a pre-manufactured preform, including a multilayer preform, can be used for the preform 2356 of the present disclosure.

Figure 23C:
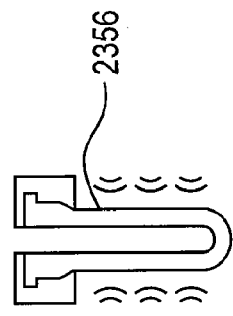
FIG. 23C is a side, cross-sectional view of a preform conditioning step of a process of injection blow molding a liner in accordance with an embodiment of the present disclosure.
Figure 23B:
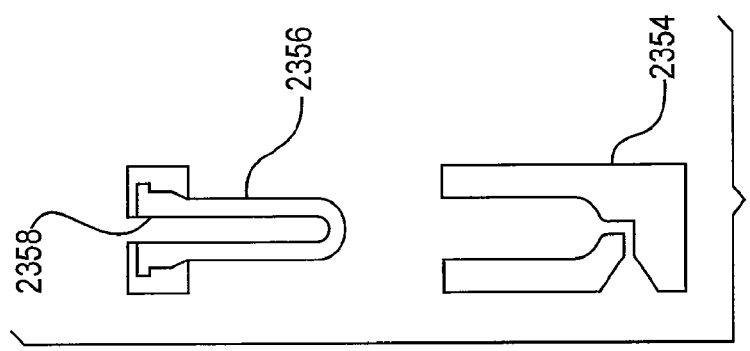
FIG. 23B is a side, cross-sectional view of an injection step of a process of injection blow molding a liner in accordance with an embodiment of the present disclosure, wherein a liner preform is removed from a preform mold.
Figure 23A:
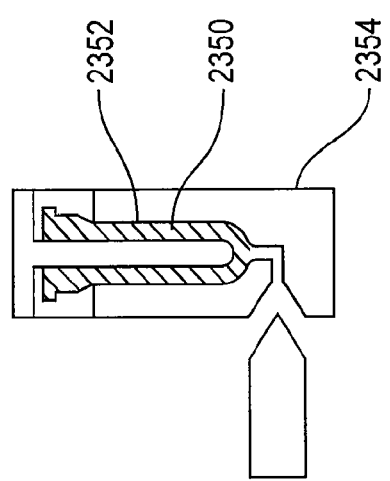
FIG. 23A is a side, cross-sectional view of an injection step of a process of injection blow molding a liner, wherein a liner preform is fabricated in accordance with an embodiment of the present disclosure.
Figure 23D:
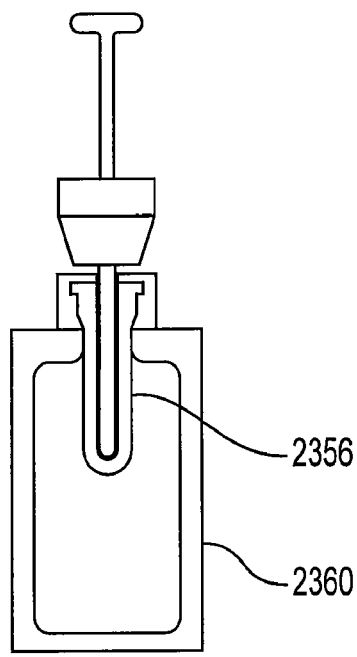
FIG. 23D is a side, cross-sectional view of a blow molding step of a process of injection blow molding a liner in accordance with an embodiment of the present disclosure.
Figure 23E:
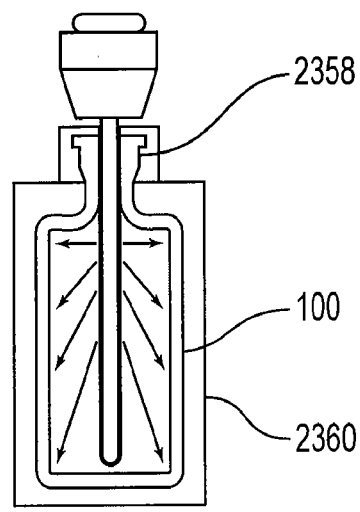
FIG. 23E is a side, cross-sectional view of another blow molding step of a process of injection blow molding a liner in accordance with an embodiment of the present disclosure, wherein a liner preform is blown to the dimensions of a liner mold.

In some embodiments, the liner preform 2356 may be cleaned and heated to condition the liner preform 2356 prior to stretch blow molding, as illustrated in FIG. 23C. The liner preform 2356, as illustrated in FIG. 23D, may then be inserted into a liner mold 2360 having substantially a negative image of the desired completed liner. The liner preform 2356 may then be blown, or stretched and blown, to the image of the liner mold 2360, as illustrated in FIG. 23E, to form the liner having an integral fitment port 2358. The blow molding air speed, as well as the blow molding temperature and pressure, may depend on the material selected for manufacturing the liner preform 2356.

Once blown or stretch blown to the image of the liner mold 2360, the liner may solidify and be removed from the liner mold 2360. The liner may be removed from the liner mold 2360 by any suitable method.

In use, the liner may be filled with, or contain, an ultrapure liquid, such as an acid, solvent, base, photoresist, dopant, inorganic, organic, or biological solution, pharmaceutical, or radioactive chemical. It is also recognized that the liner may be filled with other products, such as but not limited to, soft drinks, cooking oils, agrochemicals, health and oral hygiene products, and toiletry products, etc. The contents may be sealed under pressure, if desired. When it is desired to dispense the contents of the liner, the contents may be removed through the mouth of the liner. Each of the embodiments of the present disclosure may be dispensed by pressure dispense or by pump dispense. In both pressure dispense and pump dispense applications, the liner may collapse upon emptying of the contents. Embodiments of liners of the present disclosure, in some cases, may be dispensed at pressures less than about 100 psi, or more preferably at pressures less than about 50 psi, and still more preferably at pressures less than about 20 psi, in some cases, the contents of the liners of some embodiments may be dispensed at significantly lower pressures, as described in this disclosure. Each embodiment of a potentially self-supporting liner described herein, may be shipped without an overpack, in some embodiments, and then placed in a pressurizing vessel at the receiving facility in order to dispense the contents of the liner. To aid in dispense, any of the liners of the present disclosure may include an embodiment that has a dip tube. In other embodiments, the liners of the present disclosure may not have a dip tube.

Figure 24A:
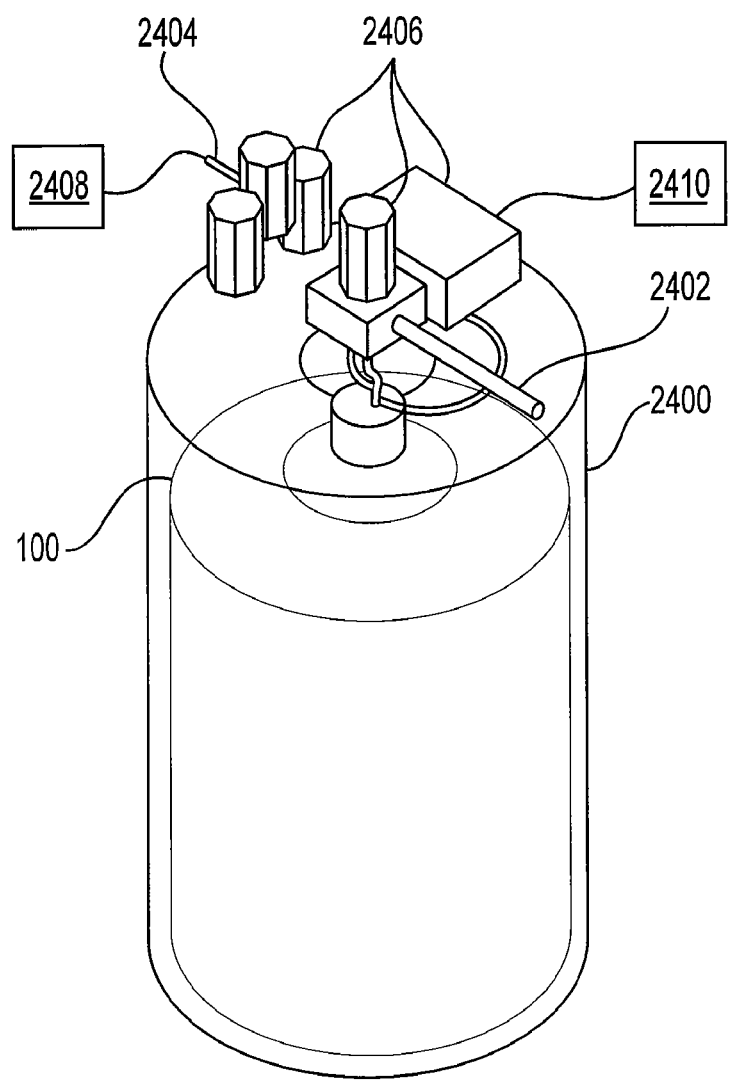
FIG. 24A is perspective, wire-frame view of a dispensing canister for dispensing liquid stored in a liner in accordance with an embodiment of the present disclosure.

In one embodiment, to dispense liquid stored in the liner, the liner of the present disclosure may be placed in a dispensing canister, for example a pressurizing vessel, such as the canister 2400 illustrated in FIG. 24A. Particularly, a gas inlet 2404 can be operably coupled to a gas source 2408 to introduce gas into the canister to collapse the liner and pressure dispense the liquid stored within the liner inside canister 2400 through a liquid outlet 2402. Canister 2400 may also include the control components 2406 to control the incoming gas and outgoing liquid. A controller 2410 can be operably coupled to control components 2406 to control the dispense of the liquid from the liner.

Generally, the outlet liquid pressure may be a function of the inlet gas pressure. Typically, if the inlet gas pressure remains constant, the outlet liquid pressure may also be generally constant in the dispensing process but decreases near the end of dispense as the container nears empty. Means for controlling such dispense of fluid from the liner are described for example in U.S. Pat. No. 7,172,096, entitled "Liquid Dispensing System," issued Feb. 6, 2007 and PCT Application Number PCT/US07/70911, entitled "Liquid Dispensing Systems Encompassing Gas Removal," with an international filing date of Jun. 11, 2007, each of which is hereby incorporated herein by reference in its entirety.

In embodiments where inlet gas pressure is held generally constant, as further described in detail in PCT Application Number PCT/US07/70911, the outlet liquid pressure can be monitored. As the container or liner nears empty, the outlet liquid pressure decreases, or droops. Detecting or sensing such decrease or droop in outlet liquid pressure can be used as an indication that the container is near empty, thereby providing what may be referred to as droop empty detect.

In some embodiments, however, it can be desirable to control the outlet liquid pressure such that it is substantially constant throughout the entire dispensing process. In some embodiments, in order to hold the outlet liquid pressure substantially constant, the inlet gas pressure and outlet liquid pressures may be monitored, and the inlet gas pressure may be controlled and/or vented in order to hold the liquid outlet pressure constant. For instance, relatively low inlet gas pressure may be required during the dispensing process due to the relatively full nature of the liner, except when the liner is near empty. As the liner empties, higher inlet gas pressure may generally be required to further dispense the liquid at a constant outlet pressure. Accordingly, the outlet liquid dispensing pressure may be held substantially constant throughout the dispensing process by controlling the inlet gas pressure, as can be seen in FIG. 24B, which shows the inlet gas pressure increasing as the liner nears complete dispense.

Figure 24B:
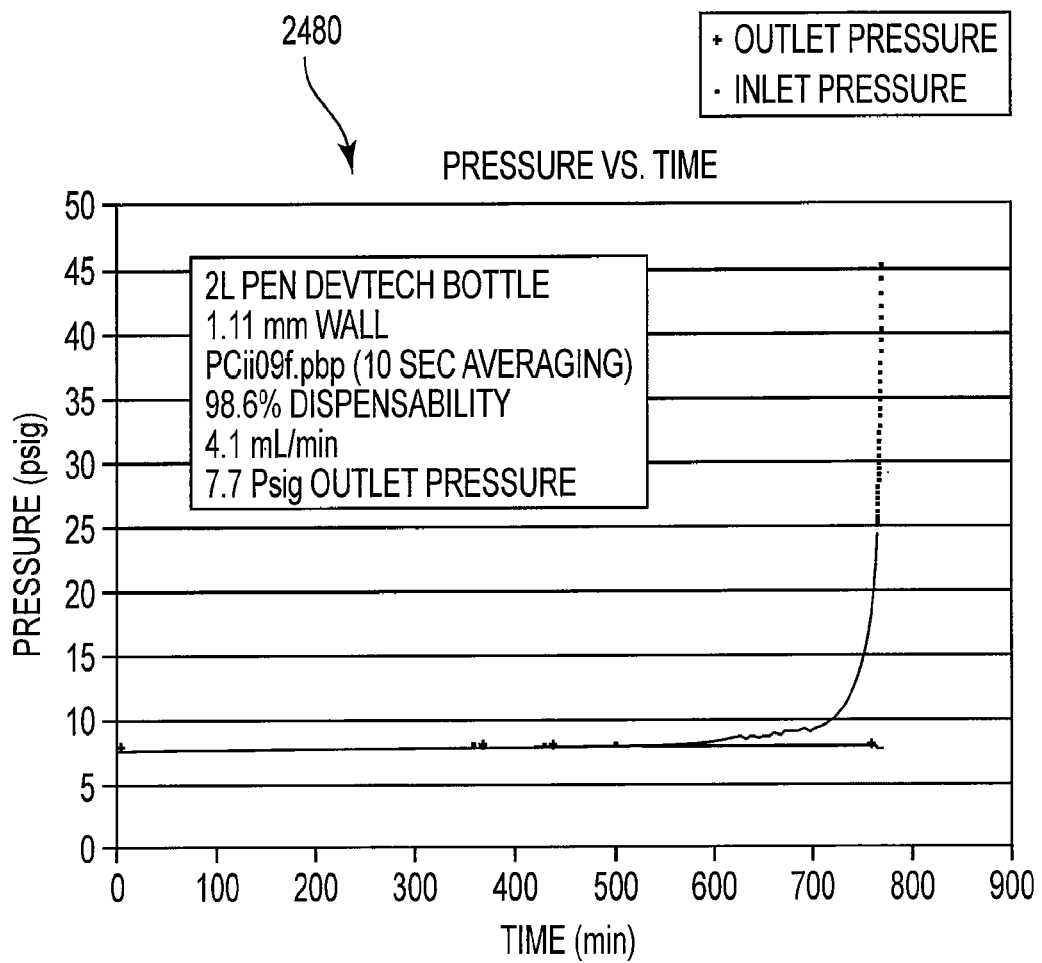
FIG. 24B is a graph plotting pressure vs. time that shows how the inlet gas pressure rises sharply as the contents of the liner are nearly empty.

At a certain point in the dispensing process, the amount of inlet gas pressure required to empty the liner can quickly become relatively high, as shown in the graph 2480 of FIG. 24B. In some embodiments, monitoring the rising inlet gas pressure throughout the dispensing process may be used to provide an empty detect mechanism. For example, in one embodiment, the inlet gas pressure may be monitored, and when the inlet pressure reaches a certain level, it may be determined that the liner is empty and the dispensing process is complete. An empty detect mechanism such as this may help save time and energy, and consequently money.

Figure 25:
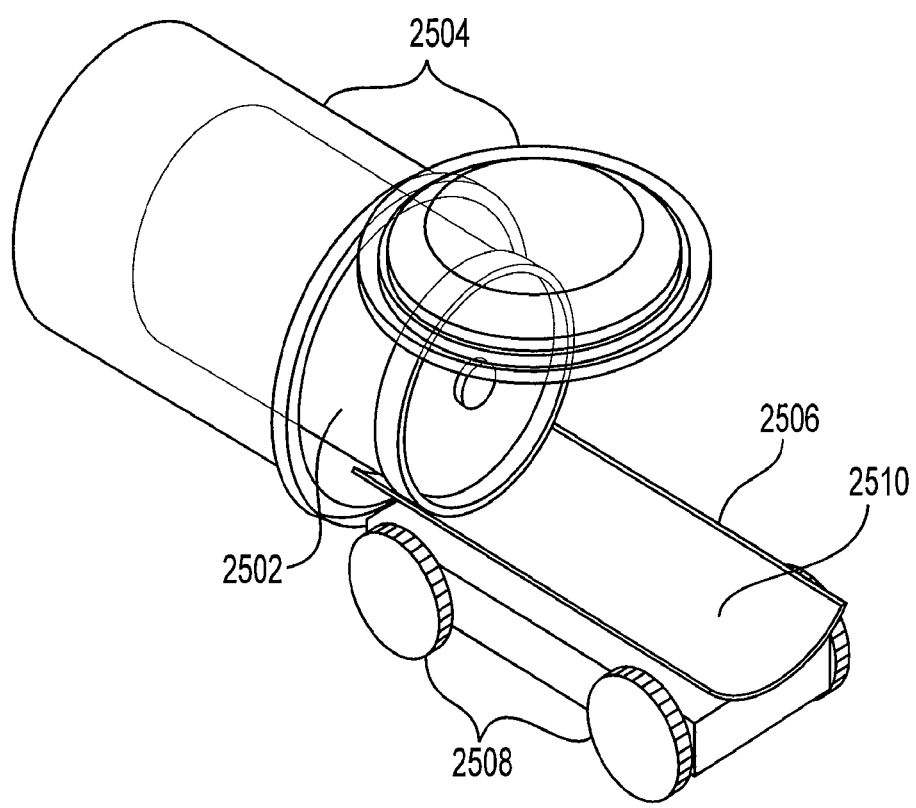
FIG. 25 is a perspective view showing a liner being loaded into a pressure vessel via a transport cart, according to one embodiment of the present disclosure.

In some cases, the size and associated weight of a liner, including metal collapsible liners as described above, storing a significant volume of contents (such as over 19 L) can make it difficult for one or two people to lift the filled liner into a standard pressure dispense vessel. Accordingly, in some embodiments, to make it generally easier to position the liner within a pressure dispense vessel, the rigid collapsible liner may be loaded for pressure dispense into the pressure vessel while it is substantially horizontally positioned, as shown in FIG. 25. Loading the liner 2502 into a horizontally positioned pressure vessel 2504 may be particularly advantageous for liners holding more than about 19 L of material.

Generally, a loading system may include a horizontally positioned pressure vessel 2504, a transport cart 2506, and a liner 2502. The horizontally positioned pressure vessel 2504 may be a customized or standard pressure vessel that may be horizontally positioned. In some embodiments, a horizontal pressure vessel may be supported on a table, cradle, or other surface at a height that is generally compatible with the height of a transport cart 2506. In still further embodiments, the pressure vessel 2504 may be placed on a table, cradle, or other surface that has wheels or rollers affixed to a bottom surface so as to permit a user to easily move the pressure vessel that is placed upon the table, cradle, etc. closer to a liner 2502 that may or may not be positioned on a transport cart 2506. In still other embodiments, a pressure vessel itself may have wheels or rollers detachably or fixedly attached to it so as to allow the pressure vessel 2504 to be easily moved about in a horizontal position. In some cases, the attached wheels may raise the pressure vessel to a height relative to the ground that is generally compatible with, i.e., of generally the same height as, or of a slightly greater height than the height of a transport cart. The number of wheels or rollers that may be attached to a pressure vessel or to a table, or cradle for holding a pressure vessel can vary from one wheel or roller to any suitable number of wheels or rollers. Wheels may be comprised of any known suitable material, such as, for instance, rubber, plastic, metal, or any suitable material or combination of materials. Additionally, in embodiments where a horizontally positioned pressure vessel has wheels or rollers, the pressure vessel may also include a wheel break or breaks or stoppers so that once the pressure vessel has been moved to a desired location, the pressure vessel may be generally safely and securely kept in that position. This may be particularly important during the process of loading the liner into the vessel. In such embodiments, there may be one or any other suitable number of breaks positioned on the pressure vessel. Similarly, a wheel break or breaks may also be added to the underside of a table, or cradle for holding a pressure vessel.

A transport cart 2506 in some embodiments may include a liner transport surface 2510 and wheels or rollers 2508. The transport surface 2510 itself may be comprised of metal, plastic, rubber, glass, or any other suitable material, or combination of materials. The surface 2510 may be textured in some embodiments such that the liner may remain in position when the transport cart 2506 is being moved. The texturing may also help to minimize the contact area with the inside of the pressure vessel, which could restrict the ability of the user to load the liner into the pressure vessel. In some embodiments, for example, the surface 2510 of the transport cart may have small raised circles thereupon to act as a gentle grip that may help secure the liner 2502 during transport. It is recognized that any type of texture may be applied to the surface of the transport cart, including any type of geometric shape or pattern, including for instance a random pattern. In some embodiments that include a textured surface, the texturing may not be so great as to impede a user from relatively easily moving or sliding the liner 2502 along the vertical distance of the surface 2510 of the transport cart in order to load the liner 2502 into a pressure vessel 2504. The support surface may include brackets, supports, moveable rails, etc.

In other embodiments, the transport surface 2510 may be configured to enhance the slidability of a liner 2502 across the transport surface. For instance, the surface may be configured to be slick and smooth. In such embodiments, the transport cart may include at least one lip or lock that may be detachably or moveably fixed on at least one end of the transport cart 2506. The at least one lip or lock may keep the liner 2502 from sliding off of the transport cart 2506 when the transport cart is being moved.

The liner transport surface 2510 may be generally shaped such that the transport surface 2510 may easily accommodates a rigid collapsible liner 2502, such as the liners described herein. In some embodiments, the transport surface 2510 may be generally curved across the horizontal length of the surface, thereby creating a cradle-like surface for a substantially rounded liner to be securely positioned upon. The degree of curvature of the transport surface may vary to accommodate liners of different sizes. In other embodiments, the degree of curvature may be such that liners of most sizes may be substantially safely and securely positioned on the transport cart 2506. In other embodiments, the transport surface 2510 may be customized to generally fit a specific shaped liner. In yet other embodiments, the transport surface 2510 may be substantially flat with relatively narrow elevated surfaces positioned along the vertical distance of each of the sides of the transport surface 2510 that may act as bumpers to keep a liner 2502 securely and safely positioned on the transport cart 2504. The raised surfaces, bumpers, or rails may be comprised of any suitable material, such as rubber, plastic, or any other suitable material or combination of materials.

The transport cart may also have wheels 2508 in some embodiments so as to allow for generally easy movement of the transport cart. The transport cart 2506 may have any suitable number of wheels, for example, 3 wheels or more. The wheels may be comprised of any known suitable material, such as, for instance, rubber, plastic, metal, or any suitable material or combination of materials.

In use, the liner 2502 may be shipped on a transport cart, or alternately a liner 2502 may be placed, either manually or by automation, on a transport cart when the liner arrives at its destination. Once the liner is placed on the transport cart 2506, the rollers 2508 on the transport cart may allow the cart with the liner to be moved about relatively easily, regardless of the size or weight of the liner 2502. The transport cart 2506 may be used to transport the liner 2502 to a horizontally positioned pressure vessel 2504. Alternately, in embodiments with a moveable pressure vessel, the pressure vessel may be transported to the transport cart. The transport cart with the loaded liner may be positioned generally end-to-end with the pressure vessel such that the liner may be slid along the transport surface 2510 of the transport cart 2506 and into the pressure vessel 2504 for dispense.

Figure 26A:
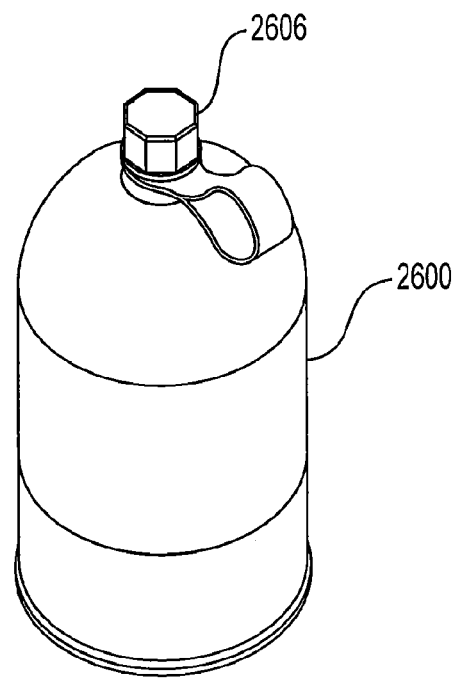
FIG. 26A is a perspective view of a substantially rigid collapsible liner or substantially rigid liner in accordance with an embodiment of the present disclosure including a cap.
Figure 26B:
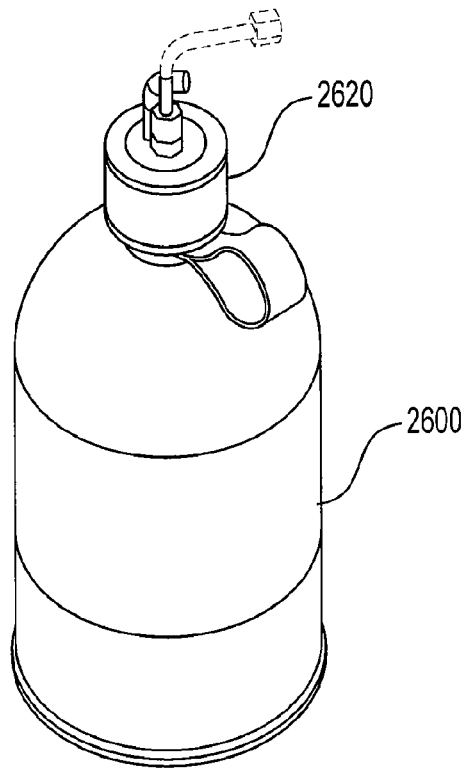
FIG. 26B is a perspective view of a substantially rigid collapsible liner or substantially rigid liner in accordance with an embodiment of the present disclosure with a connector.

In one embodiment, shown in FIG. 26A, the liner 2600 may include a cap 2606 of the type typically used with glass bottles, for which some embodiments of the present disclosure may be an alternative. The mouth of the liner 2600 may be threaded, or otherwise configured, so as to be compatible with existing glass bottle caps. The cap 2606 may be secured on the liner 2600 after filling the liner 2600, but before the contents are dispensed; for instance, the cap 2606 may be secured on the liner 2600 during storage or shipment of the liner 2600. In another embodiment, liner 2600 may include a connector 2620 of the type typically used with glass bottles, as is shown in FIG. 26B and as disclosed in U.S. Pat. Application No. 61/299,427, titled "Closure/Connector for Dispense Containers," which was filed on Jan. 29, 2010, the contents of which is hereby incorporated by reference in its entirety. Liner 2600 may be an advantageous alternative for a glass bottle for all of the reasons already discussed, in addition to the fact that liner 2600 may be compatible with existing glass bottle equipment, such as the connector 2620 of liner 2600. The connector 2620 may also be used with any of the other embodiments of liners disclosed herein, in some embodiments.

Figure 26C:
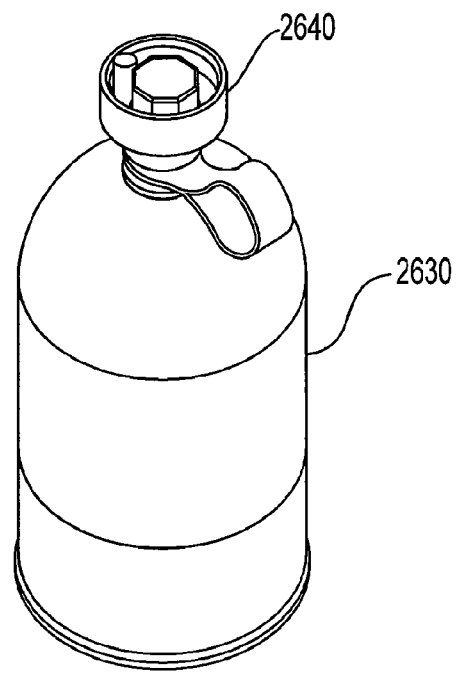
FIG. 26C is a perspective view of a substantially rigid collapsible liner or substantially rigid liner in accordance with an embodiment of the present disclosure with a misconnect prevention closure.
Figure 26D:
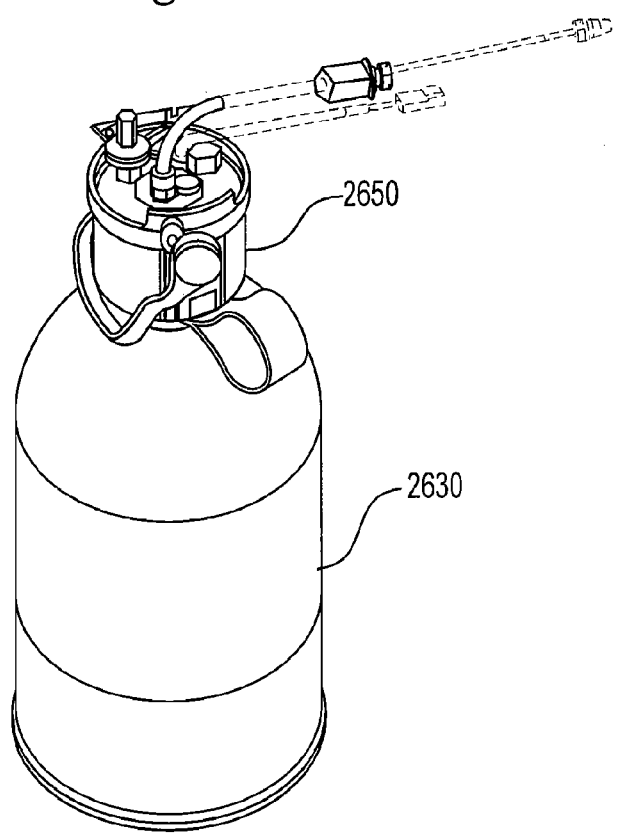
FIG. 26D is a perspective view of a substantially rigid collapsible liner or substantially rigid liner in accordance with an embodiment of the present disclosure with a misconnect prevention connector.

In yet another embodiment, shown in FIGS. 26C and 26D, the liner 2630 may include a misconnect prevention closure 2640 as well as a misconnect prevention connector 2650. The misconnect prevention closure 2640 and misconnect prevention connector 2650, in some embodiments, may be configured such that they are compatible with the NOW-Pak® dispense system, such as that disclosed in U.S. patent application Ser. No. 11/915,996, titled "Fluid Storage and Dispensing Systems and Processes," which was filed Jun. 5, 2006, the contents of which are hereby incorporated by reference in their entirety herein. A sample of the misconnect prevention connector 2650 may be that of ATMI of Danbury, Conn., or those disclosed in U.S. Patent Application No. 60/813,083 filed on Jun. 13, 2006; U.S. Patent Application No. 60/829,623 filed on Oct. 16, 2006; and U.S. Patent Application No. 60/887,194 filed on Jan. 30, 2007. Another embodiment of liner with a connector may include a connector that does not include a dip tube that extends into to the container, sometimes referred to as a "stubby probe." The misconnect closure 2640 and the misconnect prevention connector 2650 may be used with any of the embodiments of liners disclosed herein, in some embodiments.

Flexible Gusseted and Non-Gusseted Liners

As stated above, the present disclosure also relates to flexible gusseted or non-gusseted liners, which are scalable in size and may be used for storage of up to 200 L or more. Accordingly, the liner may be suitable for storage of high purity liquids that are used in the flat panel display industry, for example.

Figure 27A:
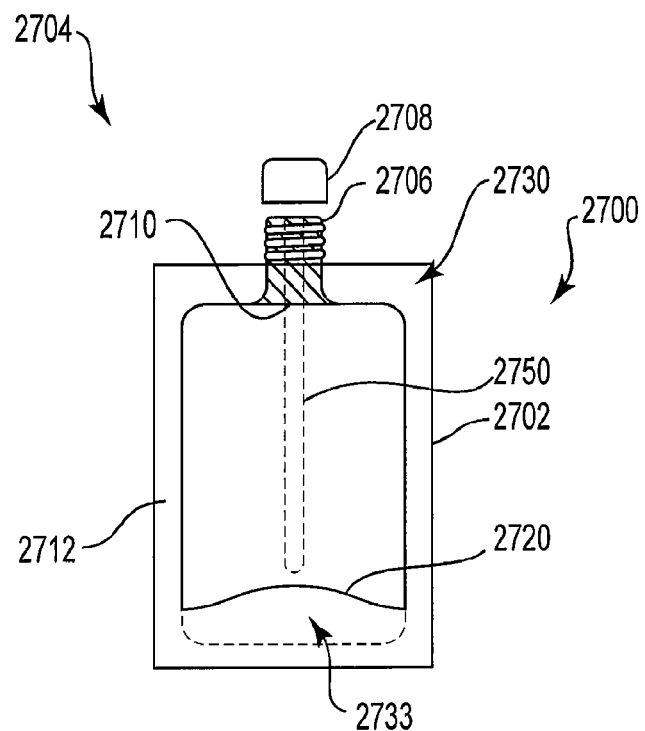
FIG. 27A is a front view of a 2D gusseted liner in accordance with an embodiment of the present disclosure.

FIG. 27A illustrates a cross-sectional view of one embodiment of a gusseted liner 2700 of the present disclosure. The cross-sectional shape of liner 2700 is not limiting and any suitable cross-sectional shape may be used. Generally, however, liner 2700 may fold substantially flat with a folded gusseted edge 2720, and as such may be referred to herein as a two-dimensional ("2D") gusseted liner. The term "two-dimensional" is used herein to assist in understanding of the various embodiments of the gusseted liner of the present disclosure and is not meant to be limiting. In some embodiments, the liner may be a pillow-type liner, of relatively simple shape, such as a bottle shape, or a pillow shape, or the like, comprised of two or more panels. In some embodiments, as described further below, two panels may be welded along substantially their entire perimeter, with no gusseting. In still other embodiments, a pillow-type liner may have more than two panels, with the additional panel or panels being gusseted panels. In other embodiments, the liner may be comprised of 3 or more panels, which form other shapes, such as cylinders, cubes, orbs, or any other shape. In some embodiments, liners of this type may comprise gusseted panels, while in other embodiments liners of this type may not be gusseted. In the example embodiment illustrated in FIG. 27A, gusseted edge 2720 may expand (FIG. 27B) from its folded, substantially flat state when liner 2700 is filled with liquid, such that liner 2700 expands to a generally three-dimensional ("3D") shape. The term "three-dimensional" is used herein to assist in understanding of the various embodiments of the gusseted liner of the present disclosure and is not meant to be limiting. When in its expanded 3D shape, liner 2700 may be substantially free of folds or wrinkles. Furthermore, liner 2700 may be free-standing.

Figure 27B:
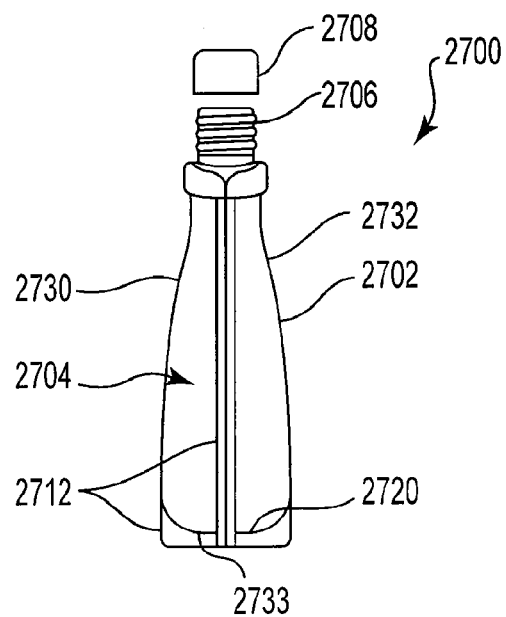
FIG. 27B is a side view of a 2D gusseted liner in accordance with an embodiment of the present disclosure.

In alternative embodiments, the liner 2700 may not be gusseted, but instead have a bottom that is substantially rounded, hemi-spherical, or other suitable shape. In such embodiments, liner 2700 may not be free-standing and may be supported by an overpack or outer container. Similarly, liner 2700 can be configured such that there are substantially no internal perpendicular joints, as shown in FIGS. 27A and 27B. Rather, the internal corners may be generally rounded. In this manner, liner 2700 may collapse upon pressure dispense or pump dispense with substantially no folds forming. Such a configuration can help reduce or minimize the quantity of liquid trapped in folds and can reduce the amount of pressure or vacuum required to fully collapse the liner. The shape of liner 2700 may also reduce creasing of liner 2700 during collapse, which could otherwise give rise to particle generation at the crease lines, thereby contaminating the liquid within the liner. Similarly, the configuration of liner 2700 can reduce or minimize the number of trapping points for bubbles.

Furthermore because liner 2700 may be substantially free of folds or wrinkles in its expanded 3D shape, an additional advantage of the various embodiments of the present disclosure includes a reduced amount of variable volume. That is, liner 2700 can be designed for a specific volume, and because there can be few or substantially no folds in substantially rigid liner wall 2702, when liner 2700 is filled with the specific volume, substantially no overflow should occur. As stated previously, liquids stored in such liners 2700 can be very expensive, for example about $2,500/L or more. Thus, even a small reduction of the amount of overflow can be desirable, particularly because, in many cases, the whole container of liquid will be discarded. Thus, reducing or eliminating the occurrence of overflow can lead to a significant reduction in overflow waste. In addition, as conventional liners for liner-based container systems increase in size, the number of folds increases, thereby increasing the amount of potential variable volume and overflow. Thus, because such liners 2700 may be scalable to large sizes, e.g., up to 200 L or more, the reduction in the amount of overflow for even less expensive liquids, e.g., approximately $17/L, can be significant.

In one embodiment, the gusseted edge 2720 may expand such that liner 2700 may be free-standing when filled with liquid and expanded to its 3D shape. In some embodiments, edge 2720 may expand to form a generally flat bottom. In other embodiments, edge 2720 may expand to form a generally rounded or hemi-spherical bottom. In some embodiments, because liner 2700 can be folded substantially flat, prior to filling with liquid, liner 2700 may be folded and positioned within an overpack or outer container and then filled and transported with liquid while in the overpack.

Liner 2700 may include a liner wall 2702, an interior cavity 2704, a mouth 2706, and welds 2712. In some embodiments, liner 2700 may be manufactured using one or more polymers, including plastics, nylons, EVOH, polyolefins, or other natural or synthetic polymers, including the materials described above or any other suitable blends of PE. In some embodiments, liner 2700 may comprise multiple layers. For example, in certain embodiments, liner 2700 may include an internal surface layer, a core layer, and an outer layer, or any other suitable number of layers. The multiple layers may comprise one or more different polymers or other suitable materials. For example, the internal surface layer may be manufactured using a fluoropolymer (e.g., PCTFE, PTFE, FEP, PFA, etc.) and the core layer may be a gas barrier layer manufactured using such materials as nylon, EVOH, polyethylene naphthalate (PEN), PCTFE, etc. The outer layer may also be manufactured using any variety of suitable materials and may depend on the materials selected for the internal surface layer and core layer.

Figure 2:
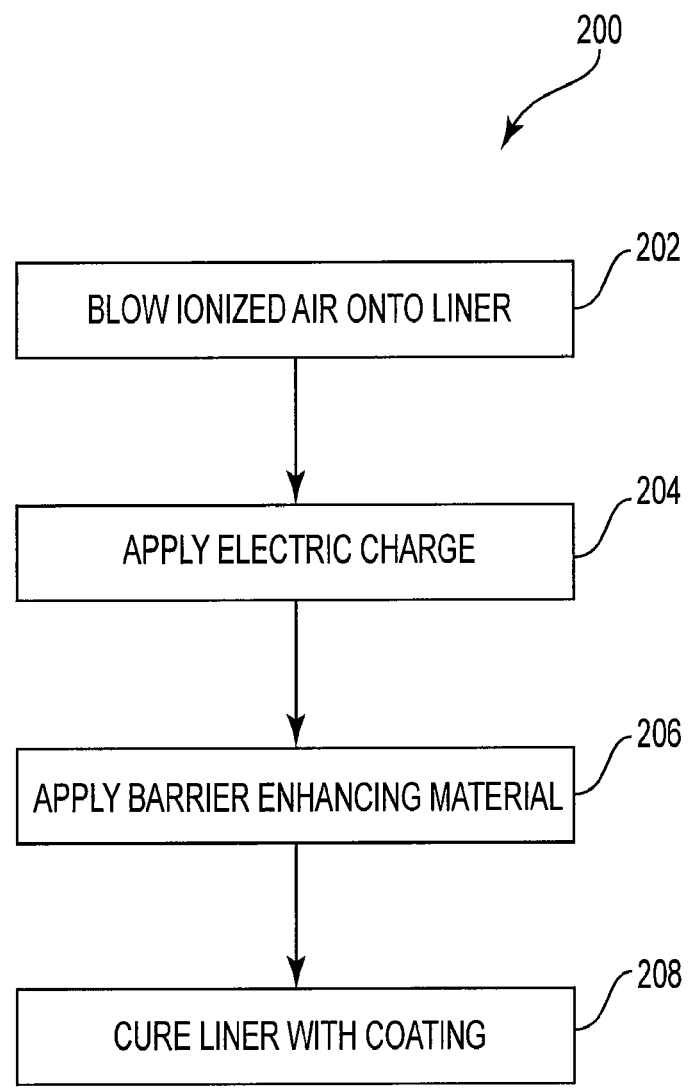
FIG. 2 is a flow diagram for a method of applying a barrier enhancing material to a liner in accordance with an embodiment of the present disclosure.

In some embodiments, the liner of the present disclosure may be coated with a barrier-enhancing coating, as described above with respect to the substantially rigid collapsible liners. In one embodiment, the barrier-enhancing coating may be applied as illustrated in FIG. 2 and described in detail above.

Figure 28A:
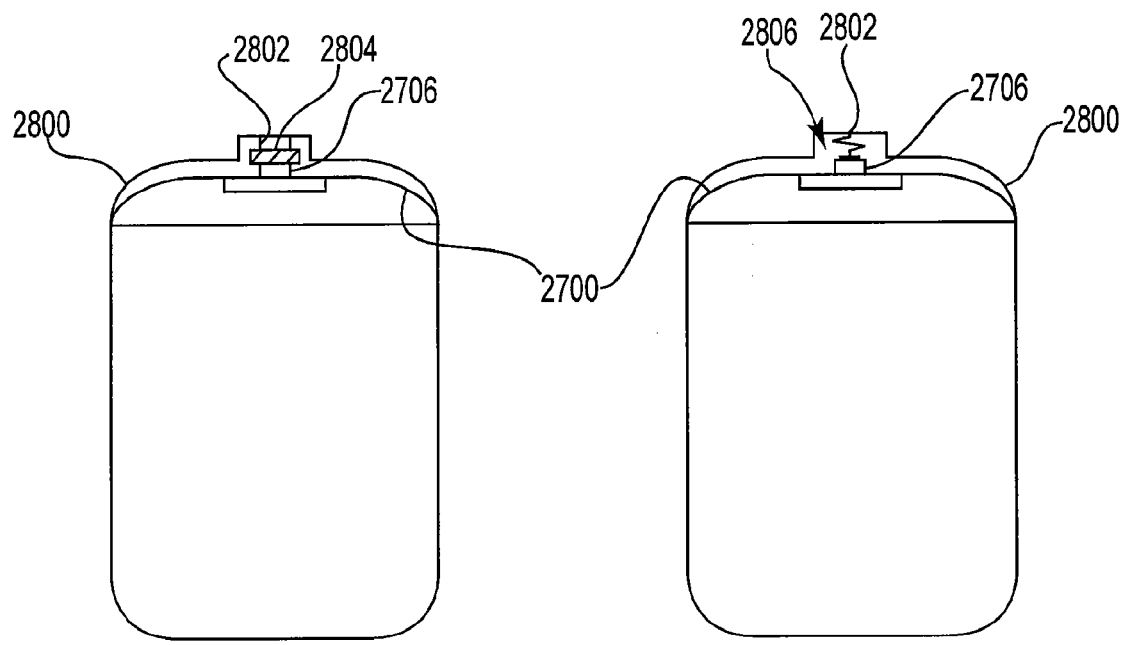
FIG. 28A is two side, cross-sectional views of a gusseted or non-gusseted weld liner in an overpack in accordance with an embodiment of the present disclosure, wherein one view illustrates the liner is connected with the overpack by bellows and the other view illustrates the liner is connected with the overpack by a flexible tether.
Figure 28B:
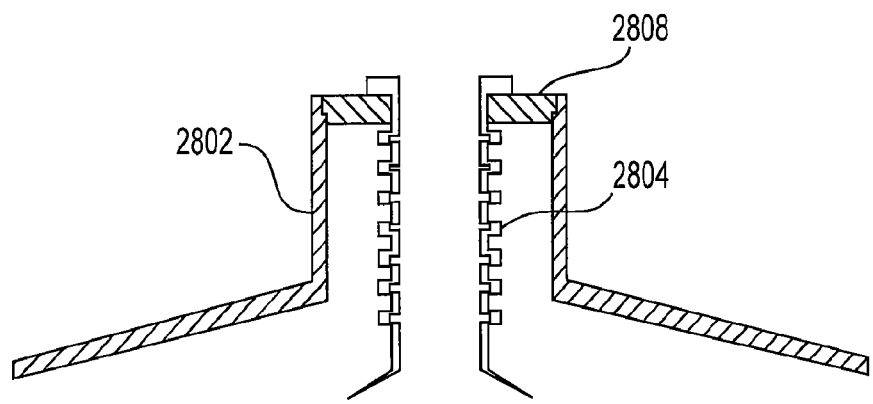
FIG. 28B is a close-up, cross-sectional view of the bellows of FIG. 28A according to one embodiment of the present disclosure.

Liner wall 2702 may generally be thicker than the liners in conventional collapsible liner-based systems. The increased thickness of liner wall 2702 increases the rigidity and strength of liner 2700. Because of the thickness, in one embodiment, liner 2700 may be free-standing. However, in many embodiments, liner 2700 will be substantially large in size, e.g., up to 200+ L, and will be placed within an overpack or outer container for support, as illustrated in FIGS. 28A and 28B. In embodiments that are configured to be free-standing, an outer container is not necessary for support of the liner as with liners in conventional collapsible liner-based systems. Accordingly, in some embodiments, liner 2700 may be a stand-alone container system. Such embodiments can reduce the overall cost of the container system by substantially eliminating the cost associated with the outer containers. Additionally, in some conventional collapsible liner-based systems, the liner and outer container are both typically non-reusable and need to be disposed. In various embodiments of the present disclosure, since an outer container is not necessary, waste can be substantially reduced or minimized because only the liner would be disposed. In one embodiment, liner wall 2702 may be from about 0.05 mm to about 3 mm thick, desirably from about 0.1 mm to about 1 mm thick, and more desirably from about 0.15 mm to about 0.6 mm thick. However, the thickness may vary depending on the volume of the liner as well as the material from which the liner is made. Generally, liner 2700 can be thick enough to substantially reduce or eliminate the occurrence of pinholes. Similarly, because liner wall 2702 can be thicker than liners of conventional collapsible liner-based systems, liner 2700 will have improved impermeability, which can avoid the introduction of gas to the interior cavity 2704 through the walls of the liner, for example.

Liner 2700 can include weld lines 2712 along its outer edges. However, unlike conventional collapsible liner-based systems, weld lines 2712 may be thicker and more robust to increase the strength of the weld lines 2712 and assist in avoiding tears in the welds and contamination of the liquid within interior cavity 2704.

Liner mouth 2706 may be generally rigid, and in some embodiments, more rigid than liner wall 2702. Mouth 2706 may be threaded or include a threaded fitment port, such that mouth 2706 may receive a cap 2708 that has been complimentarily threaded. It is recognized that any other suitable connection mechanism, such as bayonet, snap-fit, etc., may be used in place of, or in addition to, threads. Mouth 2706 may be generally rigid and may be centrally located along an upper edge of liner 2706. A centrally located mouth can increase the dispensability of liner 2700. In some embodiments, because the liner mouth 2706 may be more rigid than liner wall 2702, the area near the liner mouth may not collapse as much as liner wall 2702 when pressure is applied during dispensing. Thus, in some embodiments, during pressure dispense of the contents within the liner, liquid may be entrapped in a dead space where the area near the liner mouth has not fully collapsed. Accordingly, in some embodiments, a connector 2710 or connecting means, for connecting with a corresponding connector of a pressure dispensing system and output line, may substantially penetrate or fill the generally rigid area of the liner near the mouth. That is, the connector 2710 may substantially fill the dead space so that liquid is not entrapped during pressure dispense, thereby reducing or eliminating dead space waste.

As described above with regard to substantially rigid collapsible liners, in further embodiments, liner 2700 may be equipped with an internal hollow dip tube 2750 (e.g., illustrated in broken line in FIG. 27A) having an aperture at the lower or distal end thereof serving as a point of fluid egress from liner 2700. The hollow dip tube 2750 may be integral with, or separate from, connector 2710. In this regard, the contents within liner 2700 may be received directly from liner 2700 via the dip tube 2750. Although liner 2700 may be equipped with an optional dip tube 2750, liner 2700 according to various embodiments described herein is, in many cases, preferably devoid of any dip tube.

Figure 27C:
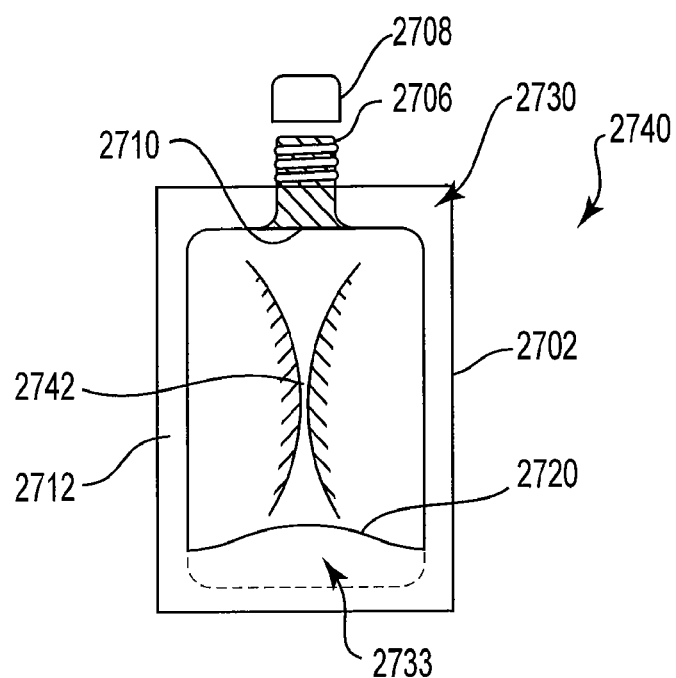
FIG. 27C is a front view of a 2D gusseted liner with a pleat in accordance with an embodiment of the present disclosure.
Figure 30A:
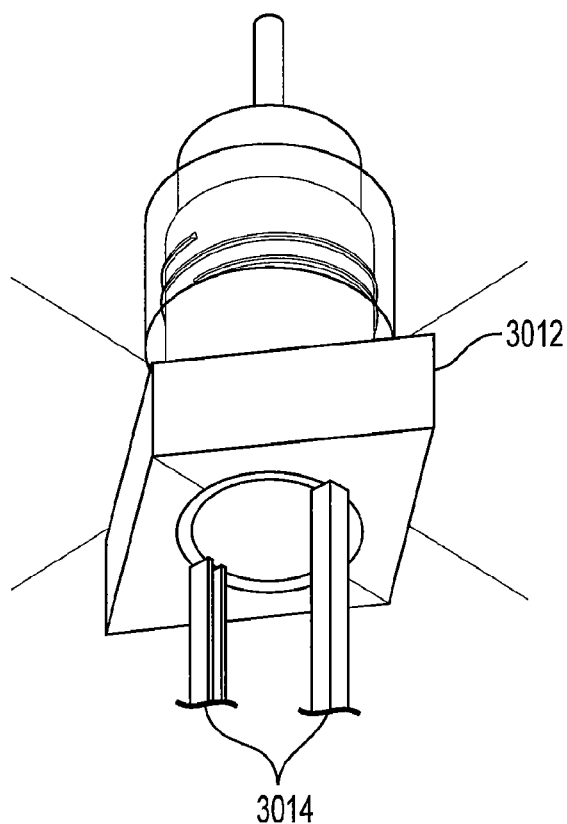
FIG. 30A is a view of a connector with two channels in accordance with an embodiment of the present disclosure.
Figure 30B:
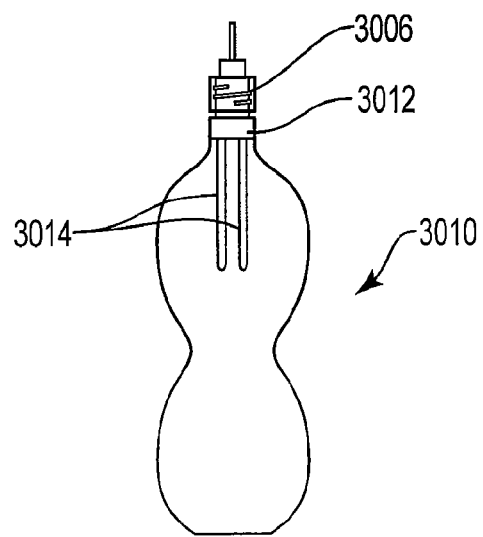
FIG. 30B is a side, cross-sectional view of a substantially rigid collapsible liner with a connector having two channels in accordance with an embodiment of the present disclosure.

Liner 2700 may have a relatively simplistic design with a generally smooth outer surface, or liner 2700 may have a relatively complicated design, including, for example, but not limited to, indentations and protrusions. In one embodiment, for example, liner 2700 may be textured to prevent choke-off. That is, liner 2700 may be textured to prevent the liner from collapsing in on itself in a manner that would trap liquid within the liner and preclude the liquid from being dispensed properly. As was described previously, a variety of ways of preventing or handling choke-off are described in PCT Application Number PCT/US08/52506, entitled, "Prevention Of Liner Choke-off In Liner-based Pressure Dispensation System," with an international filing date of Jan. 30, 2008, which was previously incorporated herein by reference in its entirety. In addition, in some embodiments, choke-off may be eliminated or reduced by providing a channel insert inside the liner, as shown in FIGS. 30A and 30B, which are discussed in greater detail below. In yet another embodiment, shown in FIG. 27C, choke-off may be ameliorated by welding a crimp, pleat, fold, or the like, or multiple crimps, pleats, folds, or the like in one or more sides of the liner. FIG. 27C shows a liner 2740 with one such crimp, pleat, fold, or the like 2742. The presence of the crimp, pleat, fold, or the like can make the sides incongruous or uneven with one another, which keeps them from fitting neatly to one another and trapping liquid in the liner.

Further, liner 2700 may be shaped to assist in dispensability of the liquid from within the interior cavity. The shape of liner 2700 may also reduce creasing of liner 2700 during collapse, which could otherwise give rise to particle generation at the crease lines, thereby contaminating the liquid within the liner. Similarly, the configuration of liner 2700 can reduce or minimize the number of trapping points for bubbles. Liner 2700 may also include a slanted portion near mouth 2706, which may assist in the smooth removal of headspace gas at the beginning of dispense.

In one embodiment, a liner may be configured such that the width of the liner in a generally unfilled or flattened state may be greater than the diameter of the overpack into which the liner may be placed. In one embodiment, the liner may also be relatively thick, for instance from about 0.1 to about 1 millimeter, or preferably from about 0.15 to about 0.3 millimeter, or more preferably about 0.25 millimeter thick. Because the liner may be thicker than typical liners that are used with an overpack, the liner may buckle from contact with the interior of the overpack. Such buckling may create fold areas that can help prevent choke-off during pressure dispense of the liner contents without the aid of a dip tube. In another embodiment, a dip tube can be used to further prevent choke-off.

FIG. 28A illustrates liner 2700 within an overpack or outer container 2800. In one embodiment, to reduce shock, for example during transportation, and therefore reduce the occurrence of pinholes and weld tears, mouth 2706 or cap 2708 or liner 2700 may be attached to a connector 2802 of overpack 2800 such that liner 2700 has variability in its movement within overpack 2800, thereby providing shock isolation or absorption. As shown in FIG. 28A, in one embodiment, liner 2700 may be attached to connector 2802 by means of a tether 2806 or flexible tubing. A tether 2806 may provide a more flexible connection from the liner to the overpack. Tether 2806 may further be stretchable and expand and contract with movement of the liner 2700. Alternatively, as also shown in FIG. 28A and also in close-up in FIG. 28B, liner 2700 may be attached to connector 2802 by means of a bellows 2804. In some embodiments, bellows 2804 may be captured by a retainer 2808 operably connecting bellows 2804 and connector 2802. Retainer 2808 may be sized and shaped to work with existing overpacks, so that new overpacks/connectors will not be required to use an embodiment of the present disclosure including bellows 2804. Bellows 2804 may add further relief from stress on the welds of liner 2700. Bellows 2804, as will be understood, stretch in length to provide flexibility for liner attachment.

In some embodiments, as shown in FIGS. 29A and 29B, 2D welded liners may generally have welds at the corners of a liner such that the 2D liner confirms to a 3D container to reduce folds or wrinkles in the liner and thus reduce gas that may get trapped in the corners of the liner. As shown in FIG. 29A, a pillow-type liner 2900, for example, may have a plurality of welds in the areas of the corners 2902 of the liner such that the liner 2900 expands to exclude right-angle corners. As can be seen in FIG. 29B, the corners of pillow-type liner 2900 are removed such as for example using weld line 2906 to form 3D cylindrical shape liners to fit into cylindrical shape containers to reduce folds or wrinkles in the liner and thus reduce gas that may get trapped in the corners of the liner.

Similar to the embodiments described above relating to rigid collapsible liners, the flexible liners of the present disclosure may, in some embodiments, include a sump as shown in FIG. 4 and described above.

Flexible liners of the present disclosure may also include folds or alternately weld lines as shown in FIGS. 16-22B and described above.

In some embodiments of the present disclosure, a flexible gusseted or non-gusseted liner may obtain above 90% dispensability, desirably above 97% dispensability, and more desirably up to 99.9% dispensability depending on the thickness of the liner wall, the material used for the liner, and the design of any gusseted edge.

Liner 2700 can be manufactured using any suitable manufacturing process, such as welding, heat sealing, or the like. With reference to FIGS. 27A and 27B, one example embodiment for manufacturing liner 2700 can include welding a first panel 2730, a second panel 2732, and a third, gusseted panel 2733 along their edges to form a generally pillow-like liner with the first and second panels forming front and back sides, respectively, and the third panel forming a gusseted edge 2720 at a bottom edge of liner 2700. A mouth or fitment port 2706 may be welded or bonded to the first and second panels along an upper edge of liner 2700.

In use, the liner 2700 may be filled with, or contain, an ultrapure liquid, such as an acid, solvent, base, photoresist, dopant, inorganic, organic, or biological solution, pharmaceutical, or radioactive chemical. It is also recognized that the liner 2700 may be filled with other products, such as but not limited to, soft drinks, cooking oils, agrochemicals, health and oral hygiene products, and toiletry products, etc. The contents may be sealed under pressure, if desired. When it is desired to dispense the contents of the liner 2700, the contents may be removed through the mouth 2706 of the liner, and the liner 2700 may fold substantially flat upon emptying of the contents. In some embodiments, including self-supporting flexible liners, the liner may be shipped without an overpack in some embodiments. The liner may be placed in a pressurizing vessel at the receiving facility in order to dispense the contents of the liner.

In one embodiment, to dispense liquid stored in liner 2700, liner 2700 may be placed in a dispensing canister, such as the canister 2400 illustrated in FIG. 24A and dispensed in substantially a similar manner as described above. Particularly, a gas inlet may be used to introduce gas into the canister to collapse liner 2700 and pressure dispense the liquid stored within liner 2700 inside canister 2400 through a liquid outlet. As also described previously, generally, the outlet liquid pressure may be a function of the inlet gas pressure. Typically, if the inlet gas pressure remains constant, the outlet liquid pressure may also be generally constant in the dispensing process but decreases near the end of dispense as the container nears empty. Means for controlling such dispense of fluid from the liner are described for example in U.S. Pat. No. 7,172,096, entitled "Liquid Dispensing System," issued Feb. 6, 2007 and PCT Application Number PCT/US07/70911, entitled "Liquid Dispensing Systems Encompassing Gas Removal," with an international filing date of Jun. 11, 2007, each of which was previously incorporated by reference.

In embodiments where inlet gas pressure is held generally constant, as further described in detail in PCT Application Number PCT/US07/70911, the outlet liquid pressure can be monitored. As the container or liner nears empty, the outlet liquid pressure decreases, or droops. Detecting or sensing such decrease or droop in outlet liquid pressure can be used as an indication that the container is near empty, thereby providing what may be referred to as droop empty detect.

In some embodiments, however, it can be desirable to control the outlet liquid pressure such that it is substantially constant throughout the entire dispensing process. In some embodiments, in order to hold the outlet liquid pressure substantially constant, the inlet gas pressure and outlet liquid pressures may be monitored, and the inlet gas pressure may be controlled and/or vented in order to hold the liquid outlet pressure constant. For instance, relatively low inlet gas pressure may be required during the dispensing process due to the relatively full nature of the liner, except when the liner is near empty. As the liner empties, higher inlet gas pressure may generally be required to further dispense the liquid at a constant outlet pressure. Accordingly, the outlet liquid dispensing pressure may be held substantially constant throughout the dispensing process by controlling the inlet gas pressure, as can be seen in FIG. 24B, which shows the inlet gas pressure increasing as the liner nears complete dispense.

At a certain point in the dispensing process, the amount of inlet gas pressure required to empty the liner can quickly become relatively high, as shown in the graph 2480 of FIG. 24B. In some embodiments, monitoring the rising inlet gas pressure throughout the dispensing process may be used to provide an empty detect mechanism. For example, in one embodiment, the inlet gas pressure may be monitored, and when the inlet pressure reaches a certain level, it may be determined that the liner is empty and the dispensing process is complete. An empty detect mechanism such as this may help save time and energy, and consequently money.

Choke-Off

As was noted above, choke-off may generally be described as what occurs when a liner necks and ultimately collapses on itself, or a structure internal to the liner, to form a choke point disposed above a substantial amount of liquid. When choke-off occurs, it may preclude complete utilization of the liquid disposed within the liner, which is a significant problem, as specialty chemical reagents utilized in industrial processes such as the manufacture of microelectronic device products can be extraordinarily expensive. A variety of ways of preventing or handling choke-off are described in PCT Application Number PCT/US08/52506, entitled, "Prevention Of Liner Choke-off In Liner-based Pressure Dispensation System," with an international filing date of Jan. 30, 2008, which is hereby incorporated herein by reference in its entirety. Several additional systems and methods of choke-off prevention means are herein provided. Some choke-off systems and methods may apply to rigid collapsible liners, while other methods may apply to flexible liners, and still other methods may apply to any type of liner disclosed herein, or otherwise known in the art.

In some embodiments, choke-off may be eliminated or reduced by providing a channel insert inside the liner, as shown in FIGS. 30A and 30B. Providing a channel insert, such as that shown and described, as well as other suitable embodiments of the channel insert, may help to keep the liner from collapsing in on itself. Because the channels create a passageway that keeps the walls from fully meeting with one another, an opening for fluid to flow out of the liner may be provided that would otherwise be trapped. Channel insert 3014 may be integral with a connector 3012, which may be positioned in the mouth 3006 of the liner 3010, as described previously. In other embodiments, channel insert 3014 may be detachably secured to the connector 3012. Channel insert 3014, in some embodiments, may have a cross-section that is generally U-shaped. However, it is recognized that in other embodiments, the channel insert may have a cross-section that is generally V-shaped, zig-zagged, curved, or any other suitable cross-sectional shape which creates a barrier to prevent the walls from fully meeting with one another and allows fluid, which would otherwise be trapped, to flow to the connector 3012. While the channel insert(s) shown in FIGS. 30A and 30B includes two channels, it will be appreciated by those skilled in the art that any other suitable number of channels, including but not limited to a single channel, is within the spirit and scope of the present disclosure. The channels may descend into the liner any distance sufficient to ameliorate the effects of choke-off, such as but not limited to, approximately ⅔ of the way down the liner, ½ of the way down the liner, ⅓ of the way down the liner, or any other suitable distance, which in some embodiments, may depend on the shape of the liner and/or the area or areas of the liner with the highest probability of being a choke-off area. In one embodiment, an advantage of using relatively shorter channel inserts is that they do not interfere so much with collapse of the liner, and thus may not greatly impede dispensation of fluid from the liner.

In an alternate embodiment to prevent choke-off during the delivery of material from a liner using pressure dispense, one or more high-purity polymer structures in the shape of a hollow sphere may be welded to the interior of the liner to prevent choke-off and increase dispense. Because the structure may be hollow, the contents of the liner may still flow through the liner of the hollow sphere, thereby preventing complete choke-off.

Figure 31:
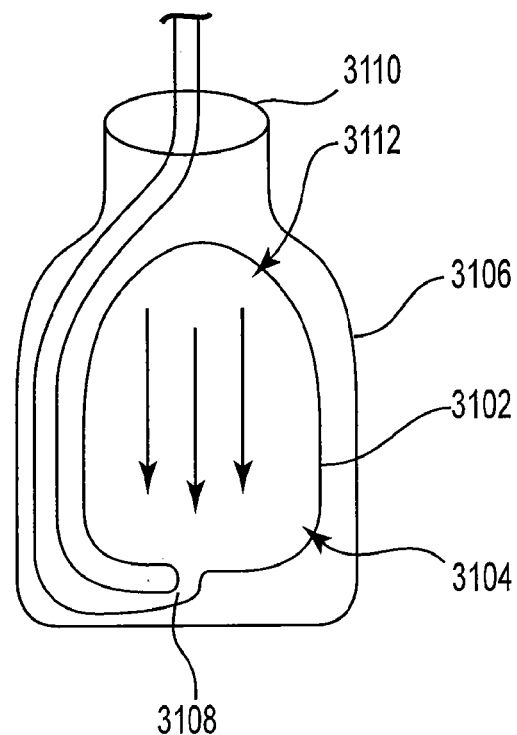
FIG. 31 shows a liner and overpack system, in accordance with one embodiment of the present disclosure.

In other embodiments gravity may be used to help dispense the contents of a liner. As shown in FIG. 31, a liner 3102 may be inserted into an overpack 3106. The liner may have a delivery tube that in some embodiments may be a rigid delivery tube 3108 made of, for example, any suitable plastic or other material or combination of materials. The liner may be positioned in the overpack 3106 such that the delivery tube end of the liner 3104 is positioned at the bottom of the overpack and the closed end of the liner 3112 is positioned toward the top of the overpack 3106 when the liner is filled. The delivery tube 3108 may extend from the delivery tube end of the liner 3104 to and through the mouth 3110 of the overpack 3106. Upon dispense, the contents of the liner will drain from the bottom of the liner 3112 first. During, for example, pressure or pump dispense, the liquid in the liner 3102 will move downward toward the dispense tube 3108. Due to the force of gravity, the liquid may dispense through the dispense tube 3108 without creating creases or folds that may trap the liquid.

In another embodiment, a liner and overpack system may use a dispense method that includes pumping a liquid that is heavier than the contents of the liner into the area between the overpack and the liner. The buoyancy of the contents of the liner created by the liquid outside of the liner being heavier may lift the liner and collapse the bottom of the liner which may help the dispense process.

Figure 32:
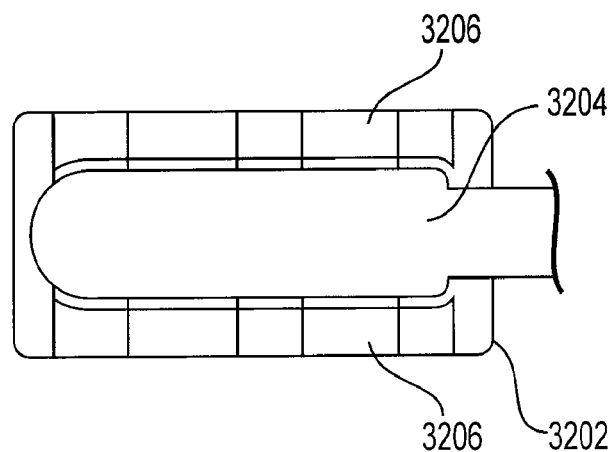
FIG. 32 shows a liner and overpack system including a bladder, in accordance with one embodiment of the present disclosure.

In yet another embodiment, as seen in FIG. 32, a liner 3204 may be inserted into an overpack 3202. The overpack 3202 may also contain one or more bladders 3206. The bladders 3206 may be made of an elastomeric material in some embodiments, while in other embodiments the bladders 3206 may be made of any suitable material. The bladders 3206 may be inflated by a pump for example such that when they inflate they press on the liner to uniformly collapse the liner. In some embodiments, the bladder 3206 may be a serpentine like bladder that inflates in a generally coil-like way to press the contents of the liner out. In other embodiments, the bladders 3206 may be coupled to an elastic or spring-like device to ensure that the bladders inflate at substantially the same rate.

Figure 33:
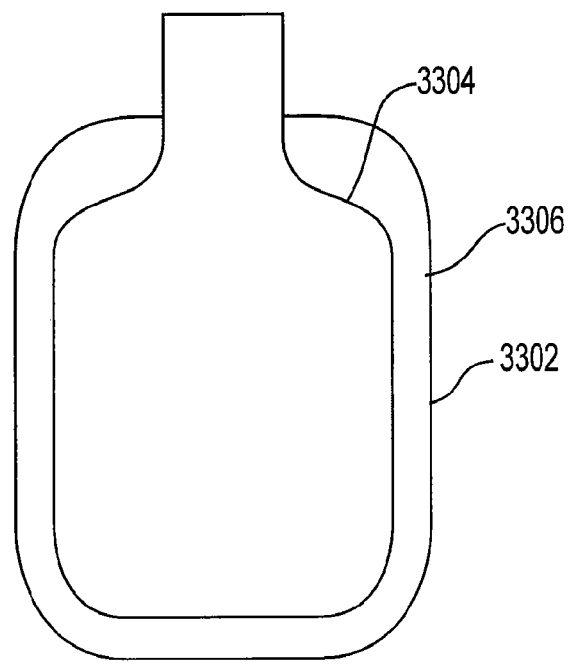
FIG. 33 shows a liner and overpack system, in accordance with another embodiment of the present disclosure.

In another embodiment shown in FIG. 33, a liner 3304 may be placed within an overpack 3302 that is comprised of an elastic balloon-like material. A relatively small amount of a lubricating fluid 3306, for example water or saline or any other suitable liquid may be included between the overpack 3302 wall and the liner 3304 wall. Upon pump dispense, for instance, the elastic overpack walls will collapse substantially evenly thereby helping to minimize creases or folds forming in the liner.

Figure 34:
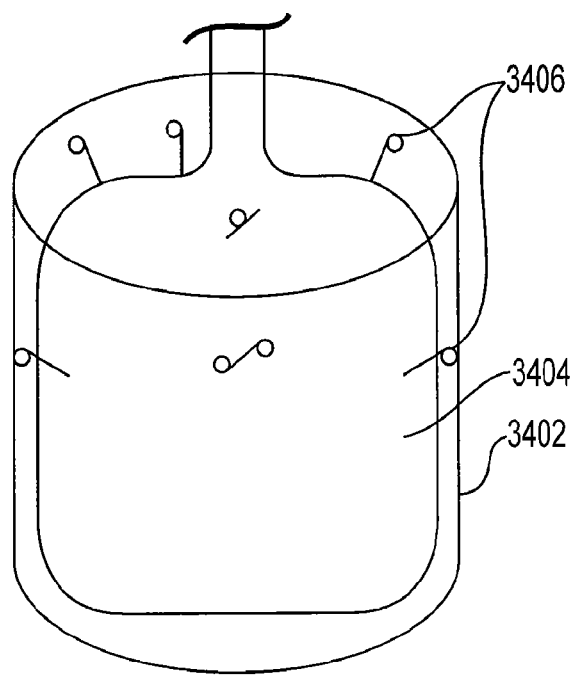
FIG. 34 shows a liner and overpack system that includes suspending the liner from the overpack, in accordance with one embodiment of the present disclosure.

In another embodiment shown in FIG. 34, a liner 3403 may be suspended in an overpack 3402. The liner may be suspended by any suitable means, such as by hooks or any other connective means 3406. Anchoring the top of the liner 3404 in such a manner to the top of the overpack 3402 at a plurality of points may limit how much the sides of the liner can collapse. The liner may be suspended by any number of points including one, two, three, four or more points.

Figure 35A:
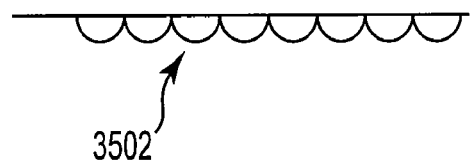
FIG. 35A shows the texture on the inside of a liner, in accordance with one embodiment of the present disclosure.
Figure 35B:
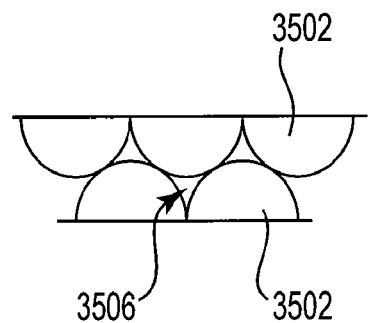
FIG. 35B shows two sides of a liner together according to the embodiment shown in FIG. 35A.

In another embodiment, the surface of the inside of the liner may be comprised of a textured surface 3502 as shown in FIGS. 35A and 35B. When the liner collapses, dispense channels 3506 may form between the textured surfaces 3502 of the liner such that liquid may still be able to flow through areas where the sides of the liner may have collapsed upon itself, thus increasing dispensability.

Figure 36:
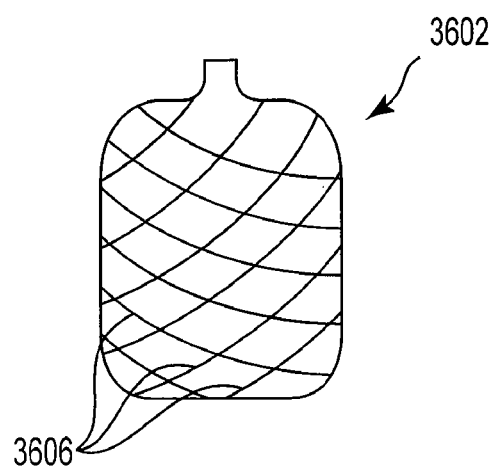
FIG. 36 shows a liner, in accordance with one embodiment of the present disclosure.

In still another embodiment, as shown in FIG. 36, a liner 3602 may comprise a number of folds formed in a criss-crossing-like manner such that when the liquid contents of the liner are dispensed, the liner may twist along the folds, thus increasing dispensability. The number of folds may be any appropriate number.

Figure 37A:
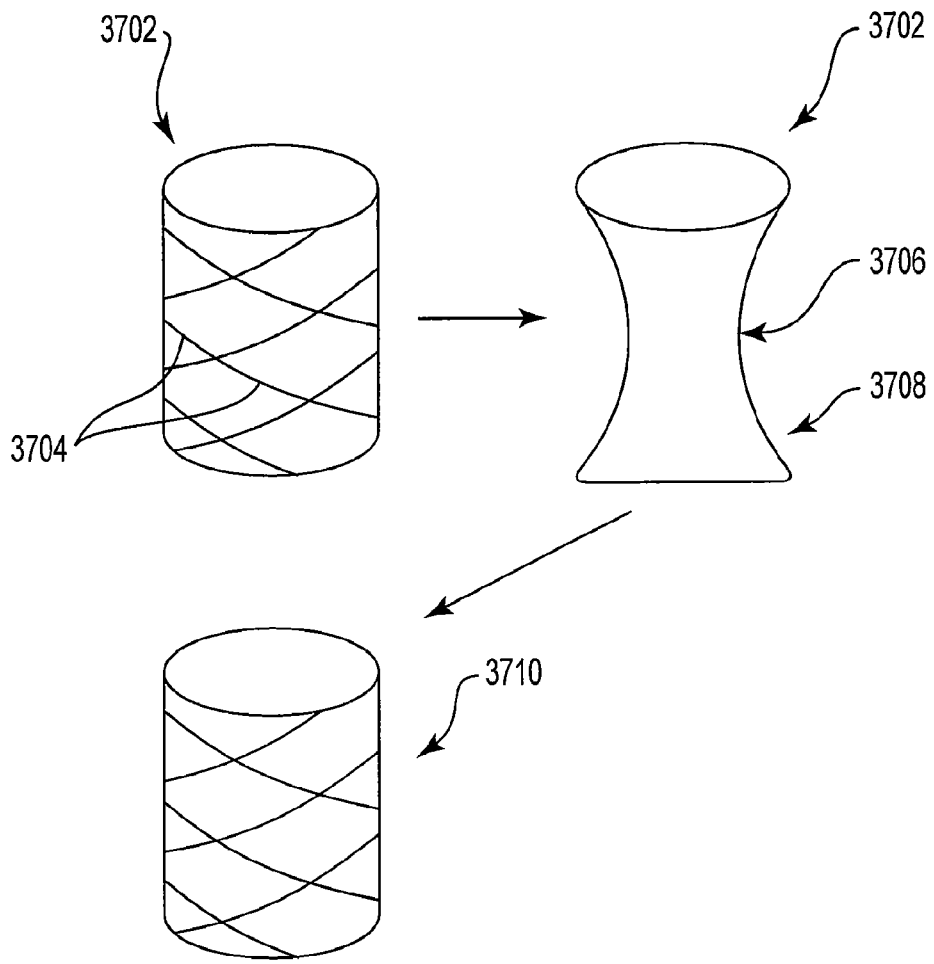
FIG. 37A shows a liner, in accordance with another embodiment of the present disclosure.
Figure 37B:
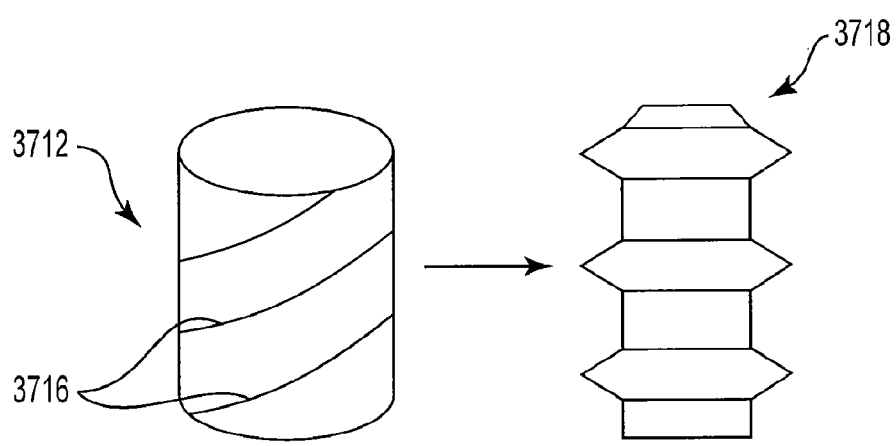
FIG. 37B shows another liner, in accordance with another embodiment of the present disclosure.

In another embodiment, as shown in FIGS. 37A and 37B, a liner 3702 may include an external elastomeric mesh 3704 that may help to adjust the collapse points of the liner 3702 upon dispense. As may be seen in FIG. 37A, in one embodiment, when the liner is subjected to either pump or pressure dispense the force of the elastomeric mesh 3704 on the liner 3702 may collapse the liner 3702 inward at different points 3706 due to the pressure applied by the dispensing action. The portions that are briefly pulled inward 3706 may cause the non-inward moving parts 3708 of the liner to stretch more. The liner 3702 will naturally become balanced again 3710 by the stretched parts of the liner returning to their relaxed state 3710. Such movement of the liner 3702 upon dispense may help the contents of the liner 3702 to be dispensed more quickly and/or more completely. FIG. 37B shows another embodiment of a liner 3712 using elastomeric mesh 3716, whereupon when pressure is applied during dispense, the liner 3712 may expand 3718 and contract in a substantially uniform manner.

Figure 38A:
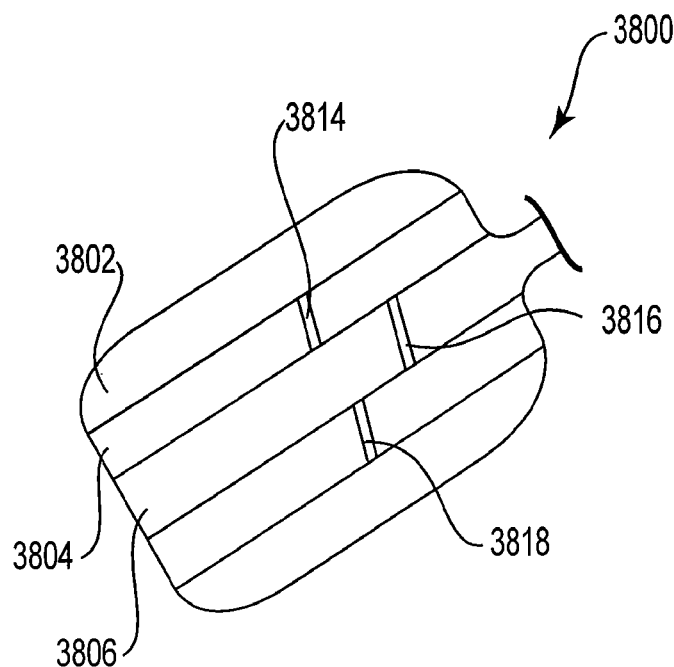
FIG. 38A shows a liner, in accordance with one embodiment of the present disclosure.
Figure 38B:
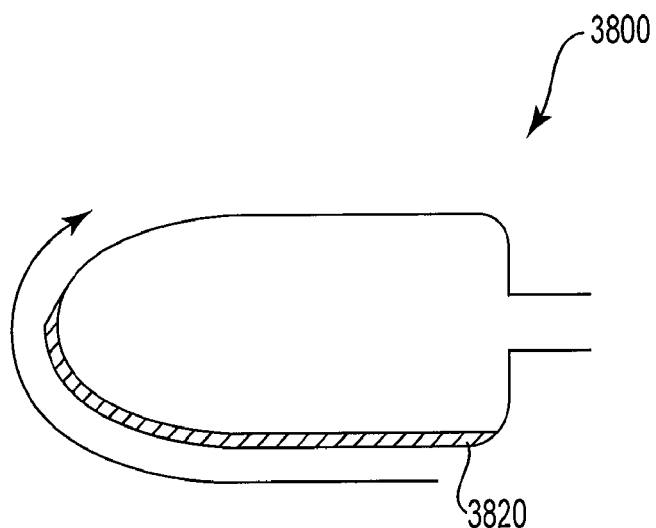
FIG. 38B shows the liner of FIG. 38A and the direction in which the liner will collapse, in accordance with one embodiment of the present disclosure.

In yet another embodiment, a shape memory polymer may be used to direct liner collapse upon dispense to help prevent choke-off, as may be seen in FIGS. 38A and 38B. For example, a shape memory polymer may be used as at least one side of the liner 3800 or attached to at least one side of the liner. The memory shape may be applied to the liner, for example, in strips 3802, 3804, 3806, in some embodiments. The strips 3802, 3804, 3806 may be kept separated by, for example, rigid spacers 3814, 3816, 3818. The shape memory polymer 3820 may cause the liner 3800 to coil up upon dispense, as shown in FIG. 38B, much like a party whistle curls up when a user blows air into it.

Figure 39A:
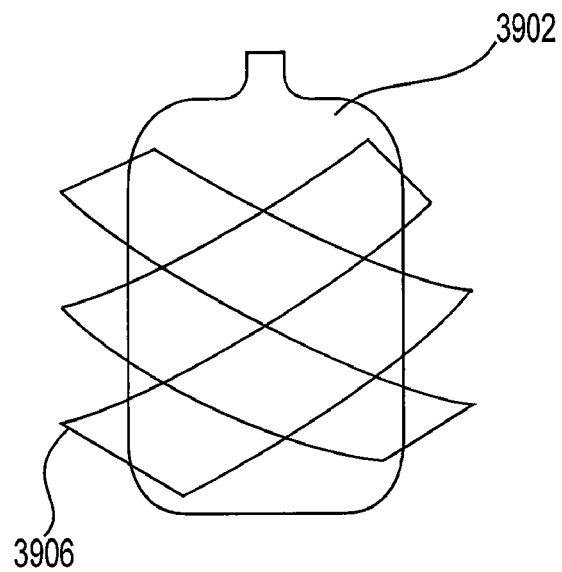
FIG. 39A shows a liner with a framework, in accordance with one embodiment of the present disclosure.
Figure 39B:
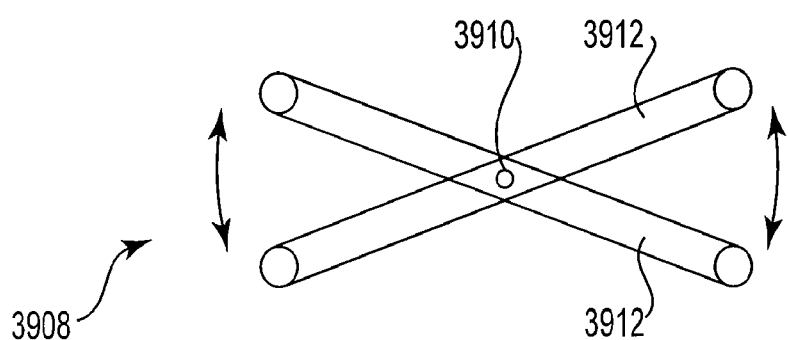
FIG. 39B shows a lattice of the framework of the liner shown in FIG. 36A, in accordance with one embodiment of the present disclosure.

In another embodiment, shown in FIG. 39A, an external framework, similar to a hoberman sphere, may be used to control the shape of the liner upon dispense in order to, for example, help prevent choke-off. A hoberman sphere is capable of folding down to a fraction of its normal size by the scissor-like action of its joints. Such a framework 3906 may help the liner 3902 collapse in a pre-determined way that avoids choke-off. As may be seen in FIG. 39B, each lattice 3908 of the framework 3906 may comprise a pivot 3910 that allows the arms 3912 of the lattice 3908 to move closer or further away from one another. In a framework 3906, the lattices may all work together, similar to a hoberman sphere to direct collapse during dispense. In some embodiments a flexible tether may also be used.

Figure 40:
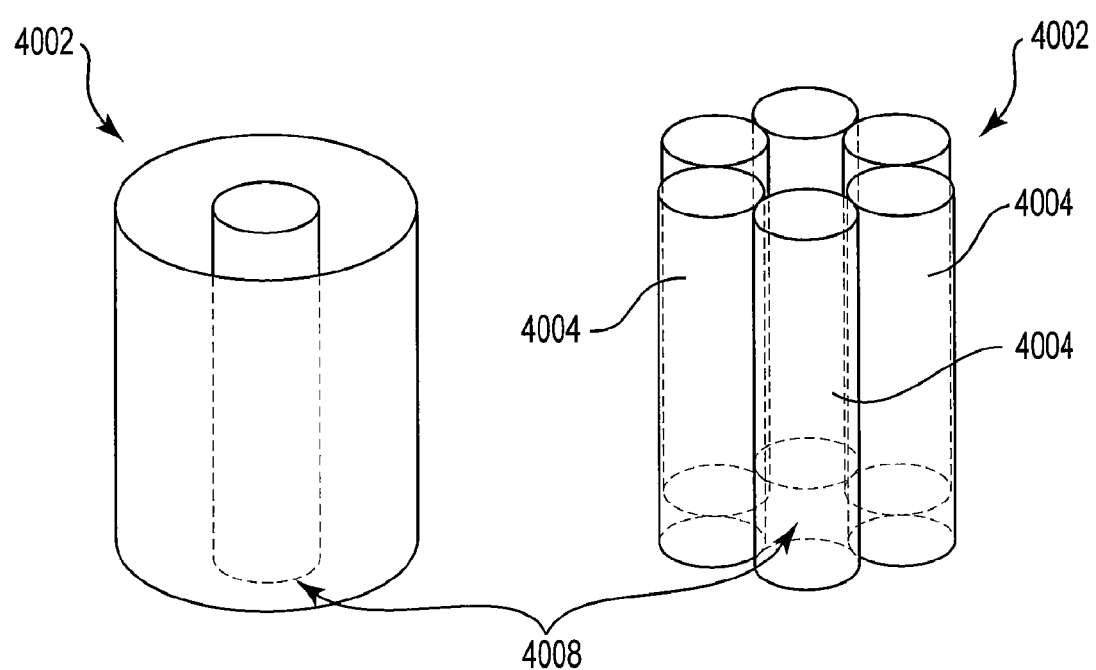
FIG. 40 shows a liner, in accordance with another embodiment of the present disclosure.

FIG. 40 shows another embodiment of a liner 4002 that may help limit or eliminate choke-off. As may be seen, the liner 4002 may comprise a plurality of interconnected tubes. The tubes 4004 may be connected in such a manner as to allow the contents of the liner to flow freely between the tubes 4004. The inner wall of the liner 4002, in some embodiments, may be comprised of an elastomere that may inflate during dispense. As shown, the center of the liner 4002 may be hollow. In some embodiments, the pressure applied to the liner 4002 during dispense may prevent the center hollow tube 4002 from deformation and thus help stabilize the liner 4002 from collapse and choke-off.

Figure 41A:
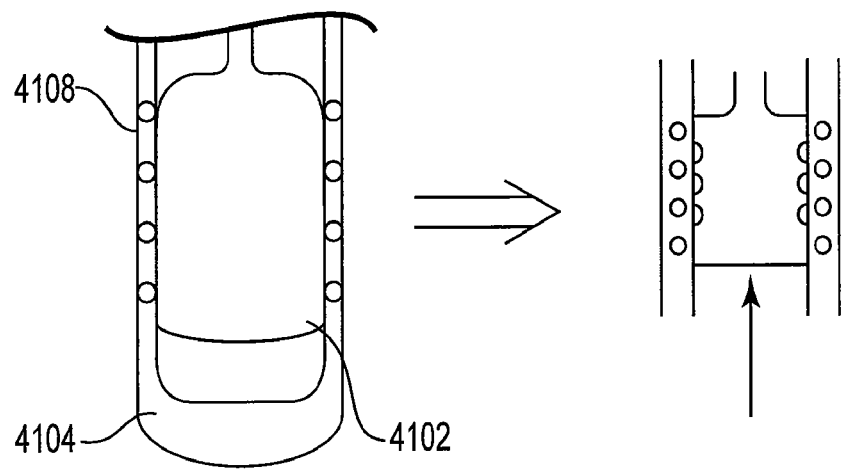
FIG. 41A shows a liner that connects to rails, in accordance with one embodiment of the present disclosure.
Figure 41B:
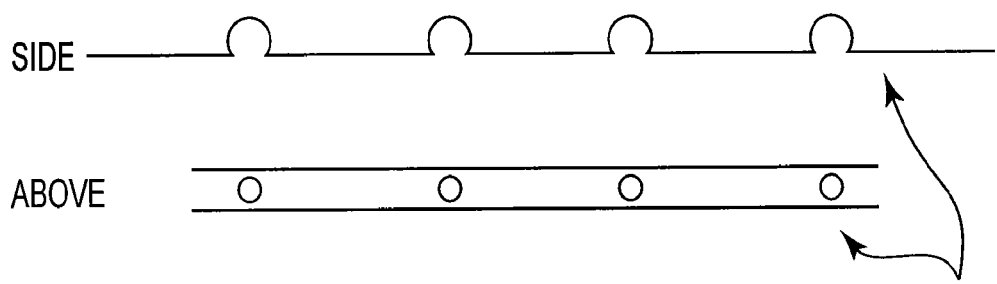
FIG. 41B shows the rails of the embodiment shown in FIG. 38A, in accordance with one embodiment of the present disclosure.

In another embodiment, shown in FIGS. 41A and 41B, slide point rails 4108 may be used to secure portions of the side of a liner 4102 to an overpack 4104, thereby keeping the liner 4102 from collapsing in upon itself during dispense. FIG. 41B shows a view of the slide point rails from the side and from above. The liner 4102 may have nubs that fit into channels in the rails 4108 of the overpack 4104. As the contents of the liner are dispensed the liner 4102 may be pushed upward, but the walls of the liner 4102 may stay attached to the walls of the overpack 4104.

Figure 42:
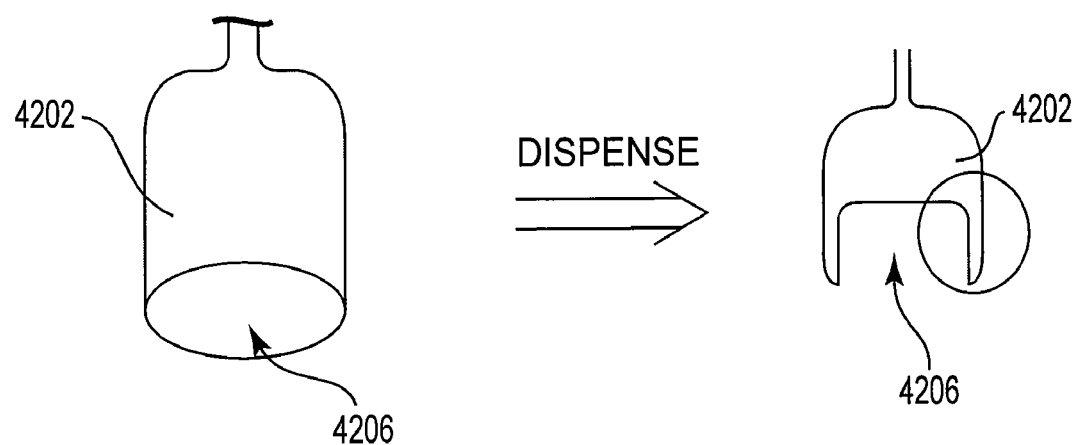
FIG. 42 shows a liner, in accordance with one embodiment of the present disclosure.

As may be seen in FIG. 42, another embodiment for helping to limit or eliminate choke-off may include an integrated piston. In such an embodiment, a liner 4202 may include a bottom 4206 that may be more rigid than the sides of the liner. Accordingly, upon dispense the liner walls may be prevented from collapsing toward one another because the rigidity of the bottom 4206 of the liner 4202 may act as a piston keeping the walls apart.

Although the present invention has been described with reference to preferred embodiments, persons skilled in the art will recognize that changes may be made in form and detail without departing from the spirit and scope of the invention.

We claim:

1. A liner-based storage system comprising:
an overpack;
a liner configured for containment and dispensation of an ultrapure liquid, the liner comprising a substantially rigid liner wall defining an interior cavity of the liner, the rigid liner wall comprising polyethylene naphthalate (PEN) having a thickness in the range of 0.1 mm to 1.0 mm, the liner being collapsible at a pressure in the range of 3 psi to about 20 psi to dispense fluid from within the interior cavity; and
a dip tube that extends into the interior cavity of the liner,
wherein the fluid is pressure dispensed from the interior cavity by applying a pressure between the overpack and the liner,
wherein a dispensability of the liner is greater than 90%, and
wherein the liner comprises one or more folds or indentations in the substantially rigid liner wall to control a collapsing pattern of the liner wall during dispense of fluid from within the interior cavity.

2. The liner-based storage system of claim 1, wherein the liner is blow-molded.

3. The liner-based storage system of claim 1, wherein one or more folds or indentations in the substantially rigid liner wall controls the collapsing of the liner such that the liner collapses in a predetermined pattern during dispense of fluid from within the interior cavity.

4. The liner-based storage system of claim 1, wherein the one or more folds or indentations in the substantially rigid liner wall control the collapsing pattern to provide a channel within the interior cavity for dispensing fluid from within the interior cavity to substantially eliminate choke-off.

5. The liner-based storage system of claim 1, further comprising a sump area generally at the bottom of the liner to increase dispensability.

6. The liner-based storage system of claim 1, wherein the liner further comprises choke-off prevention means.

7. The liner-based storage system of claim 1, wherein the liner wall comprises metal.

8. The liner-based storage system of claim 1, wherein the overpack comprises an ultraviolet (UV) blocker.

9. The liner-based storage system of claim 1, wherein the overpack is formed of two operably connectable parts.

10. The liner-based storage system of claim 9, wherein the two operably connectable parts are connected by snap-fit.

11. The liner-based storage system of claim 1, wherein the liner wall has a thickness of less than 3 mm.

12. The liner-based storage system of claim 1, wherein the liner wall comprises a layer of barrier enhancing material.

13. The liner-based storage system of claim 1, wherein the ultrapure liquid is a photoresist.

14. The liner-based storage system of claim 1, wherein the liner is a three-dimensional liner.

15. The liner-based storage system of claim 1, wherein the one or more folds or indentations is a plurality of folds or indentations, the plurality of folds or indentations crossing each other.

16. The liner-based storage system of claim 13, wherein the three-dimensional liner is blow-molded into a container having a negative image of the desired liner.

17. A liner-based storage system comprising:
an overpack;
a liner configured for containment and dispensation of an ultrapure liquid, the liner comprising a substantially rigid liner wall defining an interior cavity of the liner, the rigid liner wall comprising polyethylene naphthalate (PEN) having a thickness in the range of 0.1 mm to 1.0 mm, the liner being collapsible at a pressure in the range of 3 psi to about 20 psi to dispense fluid from within the interior cavity; and
a dip tube that extends into the interior cavity of the liner,
wherein the fluid is pressure dispensed from the interior cavity by applying a pressure between the overpack and the liner,
wherein a dispensability of the liner is greater than 90%, and
wherein the liner comprises one or more folds or indentations in the substantially rigid liner wall to deter random collapsing of the liner during dispense of fluid from within the interior cavity.

18. The liner-based storage system of claim 17, further comprising a sump area generally at the bottom of the liner to increase dispensability.

19. The liner-based storage system of claim 17, wherein the liner further comprises choke-off prevention means.

20. The liner-based storage system of claim 17, wherein the liner wall comprises metal.

21. The liner-based storage system of claim 17, wherein the overpack comprises an ultraviolet (UV) blocker.

22. The liner-based storage system of claim 17, wherein the liner wall has a thickness of less than 3 mm.

23. The liner-based storage system of claim 17, wherein the liner is a three-dimensional liner.

24. The liner-based storage system of claim 17, wherein the liner wall comprises a layer of barrier enhancing material.

25. The liner-based storage system of claim 17, wherein the ultrapure liquid is a photoresist.

26. The liner-based storage system of claim 17, wherein the one or more folds or indentations is a plurality of folds or indentations, the plurality of folds or indentations crossing each other.

\* \* \* \* \*